(12) United States Patent
Assa

(10) Patent No.: US 9,498,711 B2
(45) Date of Patent: Nov. 22, 2016

(54) MULTI-PLAYER, MULTI-SCREENS, ELECTRONIC GAMING PLATFORM AND SYSTEM

(71) Applicant: QUADO MEDIA INC., Sunnyvale, CA (US)

(72) Inventor: Shmuel Assa, Sunnyvale, CA (US)

(73) Assignee: QUADO MEDIA INC., Sunnyvale, CA (US)

(*) Notice: Subject to any disclaimer, the term of this patent is extended or adjusted under 35 U.S.C. 154(b) by 408 days.

(21) Appl. No.: 13/860,488

(22) Filed: Apr. 10, 2013

(65) Prior Publication Data

US 2013/0244784 A1 Sep. 19, 2013

Related U.S. Application Data

(60) Continuation-in-part of application No. 13/460,761, filed on Apr. 30, 2012, now Pat. No. 8,480,469, which is a division of application No. 12/612,637, filed on Nov. 4, 2009, now Pat. No. 8,226,476.

(Continued)

(51) Int. Cl.
*A63F 13/12* (2006.01)
*A63F 13/31* (2014.01)
(Continued)

(52) U.S. Cl.
CPC .............. *A63F 13/31* (2014.09); *A63F 13/26* (2014.09); *A63F 13/80* (2014.09); *G06F 1/1626* (2013.01);
(Continued)

(58) Field of Classification Search
USPC .............................................. 463/16, 30, 40
See application file for complete search history.

(56) References Cited

U.S. PATENT DOCUMENTS 4,285,517 A 8/1981 Morrison
4,359,220 A 11/1982 Morrison et al.
(Continued)

FOREIGN PATENT DOCUMENTS

| DE | 4127159 A1 | 2/1993 |
|---|---|---|
| JP | 7-222868 A | 8/1995 |
| KR | 2004-0101962 A | 12/2004 |
| WO | 2004/075428 A2 | 9/2004 |
| WO | 2008/154433 A1 | 12/2008 |
| WO | 2013/155228 A1 | 10/2013 |

OTHER PUBLICATIONS

Carsten Magerkurth, et al., "Towards the Next Generation of Tabletop Gaming Experiences," Proceedings of Graphics Interface 2004, ACM International Conference Proceeding Series; vol. 62, Ontario, Canada, May 17-19, 2004, pp. 73-80.
(Continued)

*Primary Examiner* — Pierre E Elisca
(74) *Attorney, Agent, or Firm* — Nixon Peabody LLP; Joseph Bach, Esq.

(57) ABSTRACT

A multi-player, multi-screens, electronic gaming platform and system is disclosed, having a game board having a main display screen for displaying a portion of the game layout that is shared by the plurality of players, and a plurality of personal game terminals, each personal game terminal assigned to a respective player and having an auxiliary display screen for displaying a portion of the game layout that is associated with the respective player. Communication between the main display and the terminals, and among terminals directly is enabled. Also enabled is seamless transfer of objects between the display screens as triggered by a game step or interactive inputs. Coded rules associated with the transferred objects can indicate where on the screen the digitized game object should appear, at what size should it be displayed, special animation or audio that should accompany the transfer of the digitized game object, etc.

20 Claims, 28 Drawing Sheets

Related U.S. Application Data

(60) Provisional application No. 61/193,189, filed on Nov. 4, 2008, provisional application No. 61/730,475, filed on Nov. 27, 2012, provisional application No. 61/622,472, filed on Apr. 10, 2012.

(51) Int. Cl.

| | | |
|---|---|---|
| *A63F 13/80* | (2014.01) | |
| *A63F 13/26* | (2014.01) | |
| *G06F 3/0488* | (2013.01) | |
| *G06F 1/16* | (2006.01) | |
| *G06F 3/041* | (2006.01) | |
| *A63F 9/24* | (2006.01) | |
| *A63F 3/00* | (2006.01) | |

(52) U.S. Cl.
CPC ............. *G06F 3/041* (2013.01); *G06F 3/0416* (2013.01); *G06F 3/0488* (2013.01); *A63F 3/00643* (2013.01); *A63F 2009/2433* (2013.01); *A63F 2009/2489* (2013.01); *A63F 2300/1075* (2013.01); *A63F 2300/209* (2013.01); *A63F 2300/5533* (2013.01)

(56) References Cited

U.S. PATENT DOCUMENTS

| | | | |
|---|---|---|---|
| 4,410,181 A | 10/1983 | Lapp et al. | |
| D324,400 S | 3/1992 | Furnas | |
| D342,289 S | 12/1993 | Hara | |
| 5,752,005 A * | 5/1998 | Jones | 703/22 |
| 5,790,371 A | 8/1998 | Latocha et al. | |
| 6,011,545 A | 1/2000 | Henderson et al. | |
| 6,222,507 B1 | 4/2001 | Gouko | |
| 6,377,228 B1 | 4/2002 | Jenkin et al. | |
| 6,476,733 B1 | 11/2002 | Amiri | |
| 6,484,309 B2 | 11/2002 | Nowlin, Jr. et al. | |
| D467,620 S | 12/2002 | Lin | |
| 6,982,728 B1 | 1/2006 | Nicolas et al. | |
| D514,628 S | 2/2006 | Luke et al. | |
| 7,008,316 B1 | 3/2006 | Pugh | |
| 7,028,305 B2 | 4/2006 | Schaefer | |
| D529,493 S | 10/2006 | Ogasawara | |
| D558,834 S | 1/2008 | Au Yeung | |
| 7,387,571 B2 | 6/2008 | Walker et al. | |
| 7,469,899 B1 | 12/2008 | Rogers et al. | |
| 7,771,286 B2 | 8/2010 | Campadore et al. | |
| D623,214 S | 9/2010 | Onoda | |
| D642,625 S | 8/2011 | Assa | |
| 8,016,681 B2 | 9/2011 | Yoshino et al. | |
| 8,121,642 B2 | 2/2012 | James et al. | |
| 8,226,476 B2 | 7/2012 | Haltovsky et al. | |
| 8,480,469 B2 | 7/2013 | Haltovsky et al. | |
| 8,485,883 B2 | 7/2013 | Haltovsky et al. | |
| 2002/0113751 A1 | 8/2002 | Knopf | |
| 2002/0183105 A1 | 12/2002 | Cannon et al. | |
| 2005/0017949 A1 | 1/2005 | Dunn et al. | |
| 2005/0093768 A1 | 5/2005 | Devos et al. | |
| 2005/0178034 A1 | 8/2005 | Schubert et al. | |
| 2006/0044286 A1 | 3/2006 | Kohlhaas et al. | |
| 2006/0068865 A1 | 3/2006 | White et al. | |
| 2006/0100021 A1 * | 5/2006 | Yoshino et al. | 463/45 |
| 2006/0172801 A1 | 8/2006 | Hussaini et al. | |
| 2007/0021185 A1 | 1/2007 | Walker et al. | |
| 2007/0077985 A1 | 4/2007 | Walker et al. | |
| 2007/0097016 A1 | 5/2007 | McGowan | |
| 2007/0123207 A1 | 5/2007 | Terlizzi | |
| 2007/0182663 A1 | 8/2007 | Biech | |
| 2007/0293292 A1 | 12/2007 | Gipp et al. | |
| 2008/0013265 A1 | 1/2008 | Kim | |
| 2008/0085768 A1 * | 4/2008 | Park | G07F 17/3223 463/40 |
| 2008/0216064 A1 * | 9/2008 | Braswell | 717/149 |
| 2009/0051114 A1 * | 2/2009 | Robbers | A63F 1/00 273/293 |
| 2009/0054124 A1 * | 2/2009 | Robbers | A63F 1/00 463/9 |
| 2010/0113148 A1 | 5/2010 | Haltovsky et al. | |
| 2010/0271458 A1 | 10/2010 | Shethia et al. | |
| 2011/0207525 A1 | 8/2011 | Allen et al. | |
| 2012/0220355 A1 | 8/2012 | Haltovsky et al. | |
| 2013/0116020 A1 * | 5/2013 | Barney | G06F 3/0487 463/3 |
| 2013/0116051 A1 * | 5/2013 | Barney | A63F 13/219 463/37 |

OTHER PUBLICATIONS

Tara Whalen, "Playing Well with Others: Applying Board Game Design to Tabletop Display Interfaces," UIST 2003, Vancouver, Nov. 2-5, 2003.

Sebastian Pape, et al., "Single Display Gaming: Examing Collaborative Games for Multi-User Tabletops," Workshop on Gaming Applications in Pervasive Computing Environments at Pervasive '04, Vienna, Austria, 2004.

Edward Tse, et al., "Multimodal Multiplayer Tabletop Gaming," Proceedings Third International Workshop on Pervasive Gaming Applications (PerGames '06) in conjunction with 4th International Conference of Pervasive Computing, May 7 Dublin, Ireland, pp. 139-148.

Carsten Magerkurth, et al., "STARS—A Ubiquitous Computing for Computer Augmented Tabletop Games," Video Track and Adjunct Proceedings of the 5th International Conference on Ubiquitous Computing (UBICOMP'03), Seattle, Washington, USA, Oct. 12-15, 2003.

James Ransom-Wiley, "Philips Entertaible melds video gaming with traditional board gaming," Engadget, http://www.engadget.com/2006/01/04/philips-entertaible-melds-video-gaming-with-traditional-board-ga/.

Clim J. de Boer, et al., "Electronic Augmentation of Traditional Board Games," Leiden Institute for Advanced Computer Science, Leiden University, pp. 441-444, 2004.

Regan L. Mandryk, et al., "False Prophets: Exploring Hybrid Board/Video Games," Computing Science, Simon Fraser University, pp. 640-641, 2002.

Garth B. D. Shoemaker, et al., "Single Display Privacyware: Augmenting Public Displays with Private Information," EDGE Lab. School of Computing Science, Simon Fraser University, pp. 522-529, 2001.

International Search Report and Written Opinion for PCT Application No. PCT/US2009/063312 dated Jan. 6, 2010.

International Search Report and Written Opinion for PCT Application No. PCT/US2013/036037 dated Jul. 11, 2013.

Notice of Allowance issued in U.S. Appl. No. 29/362,984 dated Mar. 18, 2011.

Office Action issued in U.S. Appl. No. 12/612,637 dated Nov. 2, 2011.

Notice of Allowance issued in U.S. Appl. No. 12/612,637 dated May 17, 2012.

Office Action issued in U.S. Appl. No. 13/460,768 dated Oct. 18, 2012.

Office Action issued in U.S. Appl. No. 13/460,761 dated Nov. 16, 2012.

Notice of Allowance issued in U.S. Appl. No. 13/460,761 dated Mar. 8, 2013.

Notice of Allowance issued in U.S. Appl. No. 13/460,768 dated Mar. 14, 2013.

Office Action issued in U.S. Appl. No. 13/460,775 dated Mar. 21, 2013.

Office Action issued in U.S. Appl. No. 13/460,775 dated Oct. 29, 2013.

* cited by examiner

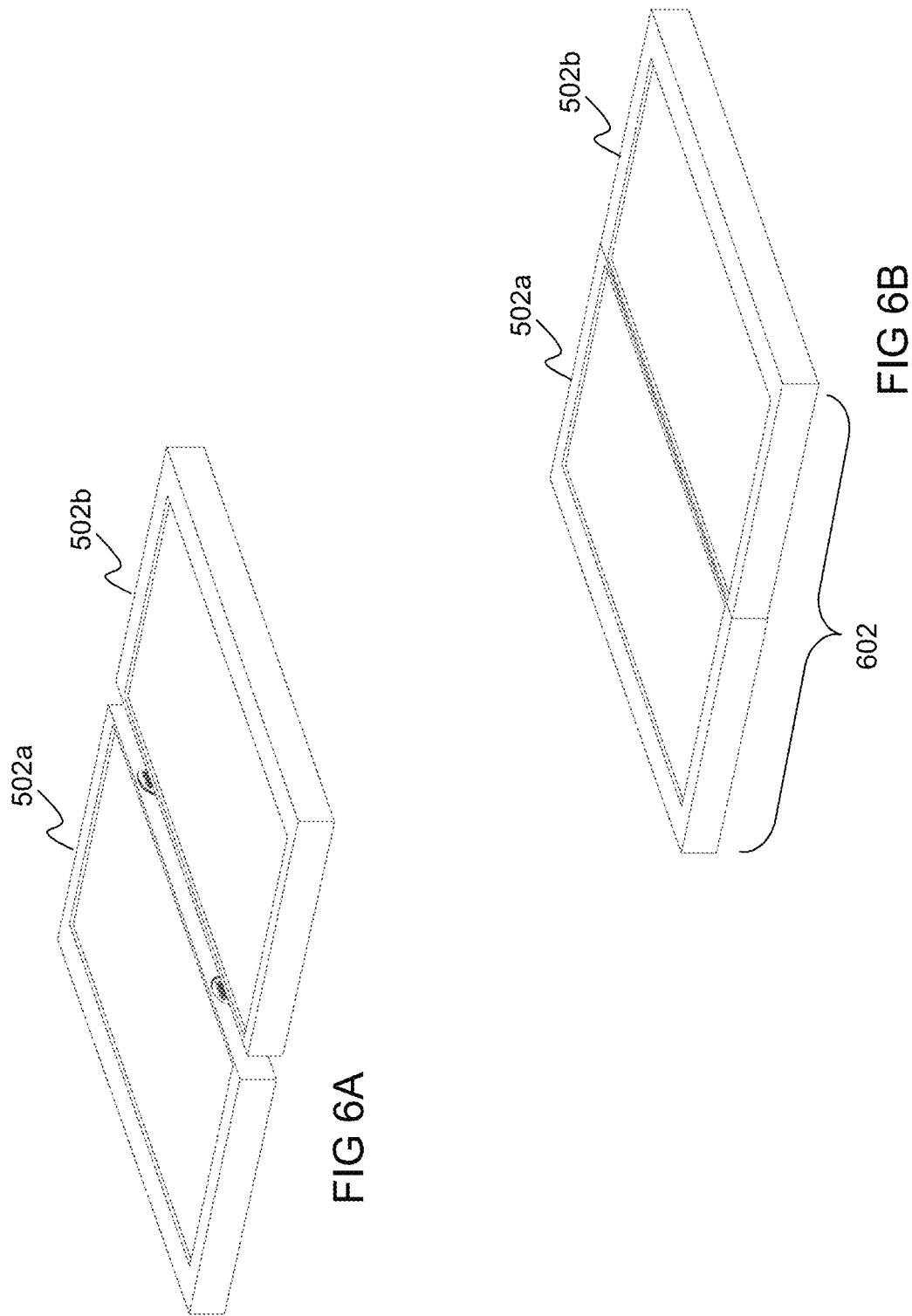

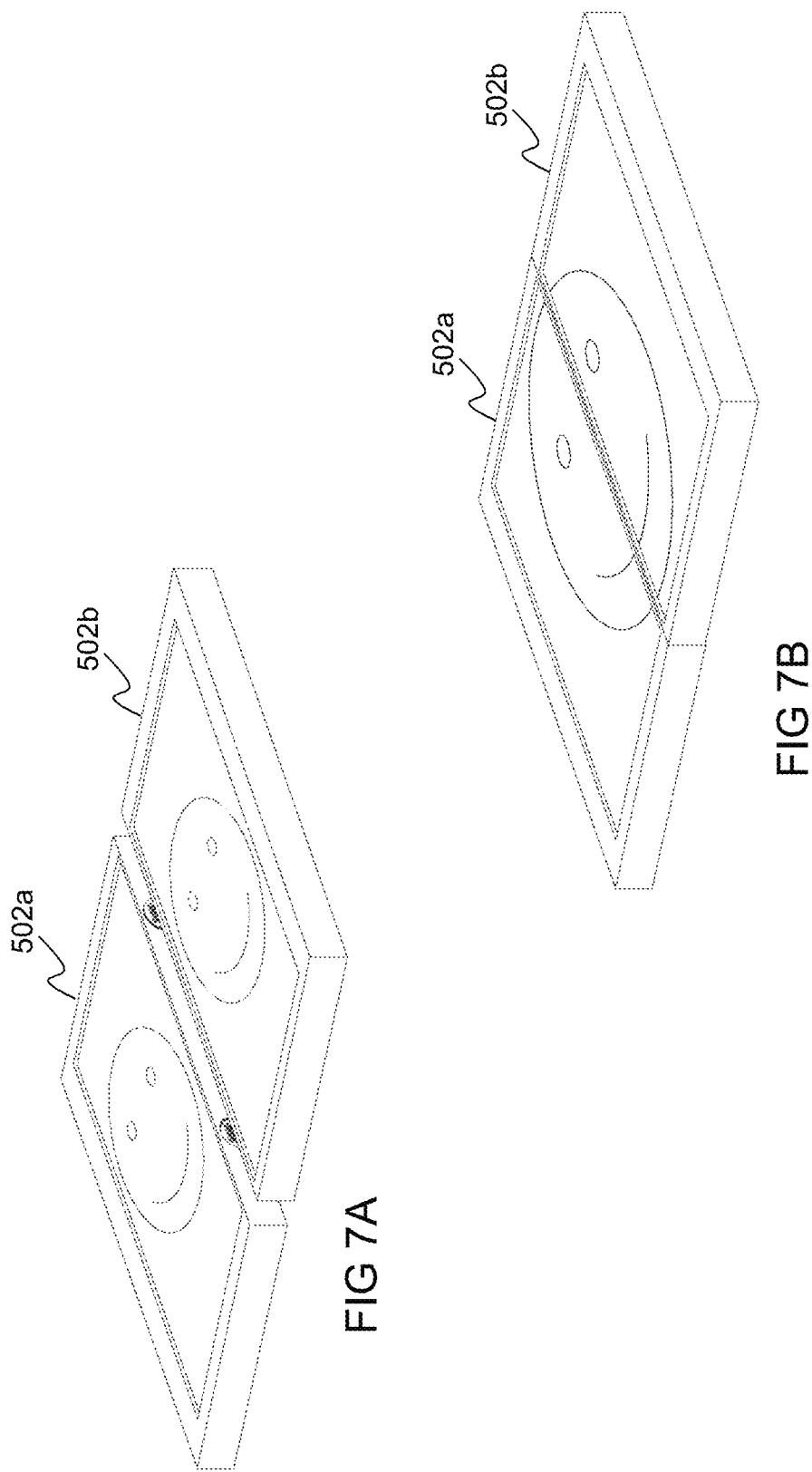

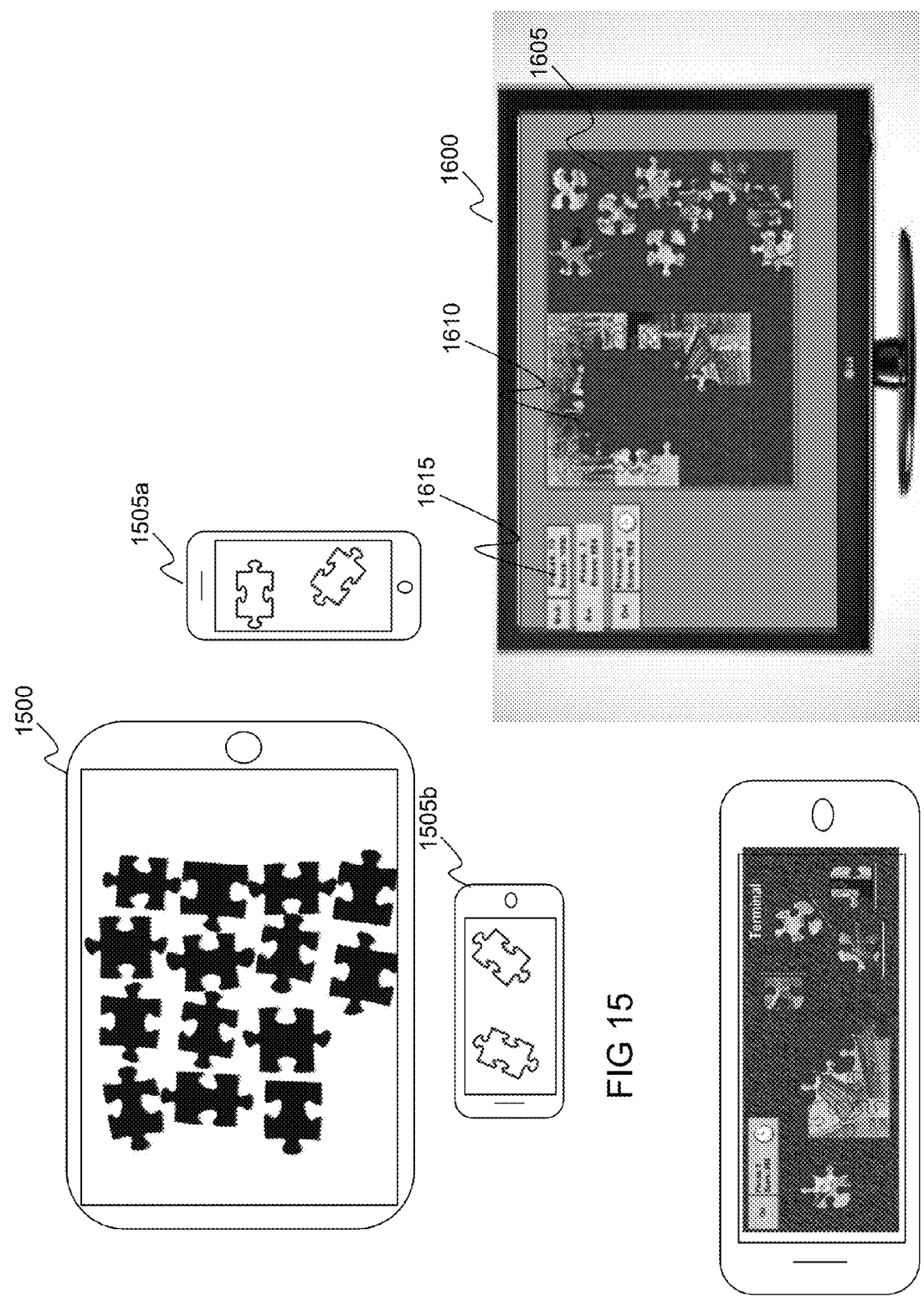

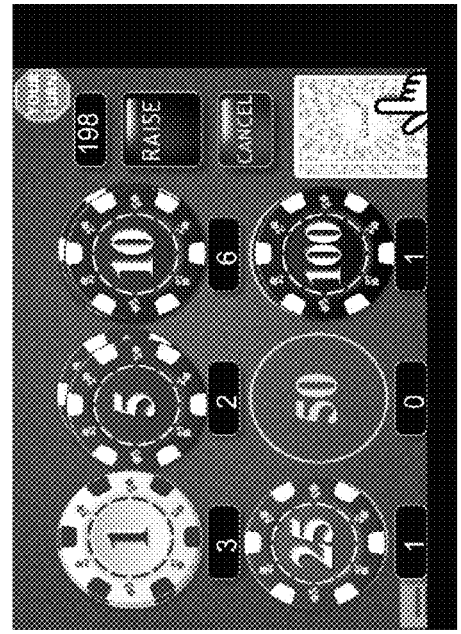
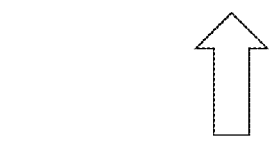
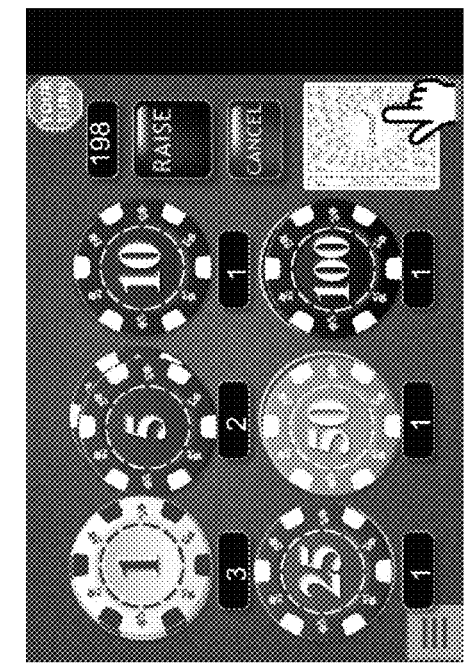
FIG 20
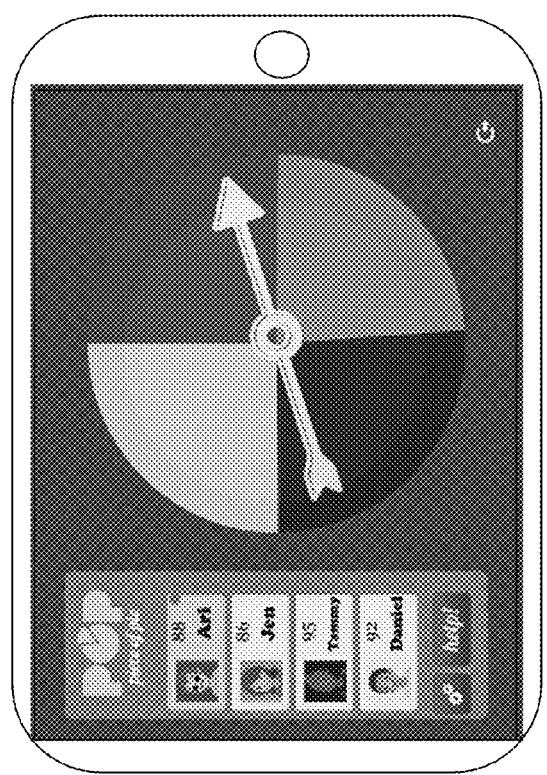
FIG 18
FIG 19

MULTI-PLAYER, MULTI-SCREENS, ELECTRONIC GAMING PLATFORM AND SYSTEM

RELATED APPLICATIONS

This application claims priority benefit from U.S. Provisional Application Ser. No. 61/622,472, filed Apr. 10, 2012 and from U.S. Provisional Application Ser. No. 61/730,475, filed Nov. 27, 2012. This application is also a continuation-in-part of U.S. patent application Ser. No. 13/460,761, filed on Apr. 30, 2012 (now U.S. Pat. No. 8,480,469), which is a divisional of U.S. patent application Ser. No. 12/612,637, filed on Nov. 4, 2009 (now U.S. Pat. No. 8,226,476), which claims priority benefit from U.S. Provisional Application Ser. No. 61/193,189, filed on Nov. 4, 2008, the disclosures of which are incorporated herein by reference in their entireties.

BACKGROUND

1. Field of the Invention

This invention relates generally to a multi-player, multi-screens digital gaming platform for enabling digitally playing a multi-player social games in multiple screens possibly running on different hardware platforms.

The use of "social games" refers to inter personal social games including digital versions of traditional and new board, card, dice, and similar games.

2. Related Arts

Electronic augmentation of traditional board games has been an active area of research and product development, as electronic board games offer certain additional advantages without affecting, and often enhancing, the fundamental enjoyment factors of the traditional games. Some of the advantages include enhanced player interaction support, compact board footprint for playing and storing the game, ability to load multiple games on the same board, no loose game-pieces to be lost, easy on-demand access to digitally stored information regarding game rules and strategy suggestions, real-time game status updates, etc. These advantages are applicable to both single-player board games, and multi-player board games.

Traditional multi-player board and card games, such as, Scrabble, Monopoly, Risk, Chess, Texas Hold'em etc., and more recent designer board games, such as, Settlers of Catan, Apples to Apples, Uno etc., promote live social interaction among two or more players. The social interaction experience is different from the experience of playing computer or electronic games designed to enable a single player to interact with a machine and/or Internet players. Often a collaborative/competitive multi-player board game experience is more desired by the players than the isolation typically associated with a computer/electronic game.

Therefore, what is needed is a crossover gaming platform that offers the merits of conventional games, while adding digital features that enrich the game-playing experience, as well as provide practical conveniences, such as versatility and ease of storage.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

The present application discloses recommended processes and systems for the implementation of multi players, multi screens gaming system. The gaming system is suitable for playing locally traditional and new board, card, dice, and similar social games, but it can be applied for other type of games and social applications.

Various embodiments of the gaming system involve hardware and software implementations. The hardware implementation includes board and terminal components, which may be proprietary or conventional. The software implementation includes board and terminal subsystems. The software implementation may also include dedicated user interface and software development services. The software implementation is transparent to the hardware deployments; therefore the software implementation requires OS specific adaptation.

Hardware

"Board"

The purpose of the gaming system "Board" is to display the shared part of the game (e.g. the Monopoly board). The "Board" can be horizontal and controlled by touch gestures (similar to Tablet) or vertical/frontal and controlled by custom controller. Multiple boards can be assembled together physically or logically by the "gaming system software" (see description below) to provide bigger shared area. The "Board" can be proprietary or conventional horizontal or frontal display including tablet, pc monitor, TV monitor, etc. In case the "Board" hardware is "TV", it requires attached processing unit that can run standard OS and wireless connectivity to the internet and locally to communicate with the players terminals. Such processing unit can be PC, Media Center (e.g. Apple TV™), Game Console (e.g. Sony PlayStation™, Microsoft XBOX™, or Nintendo Wii™), Set top box (e.g. Tivo™), or embedded unit on the TV itself.

"Terminal"

The purpose of the gaming system "Terminal" is to display private parts of the game (e.g. the Scrabble tiles or Texas Hold'em cards), to perform private activities (e.g. consulting English dictionary in Scrabble, taking notes in the Clue game, or Simulate few chess moves), and to control frontal "Boards". The scope of the invention is not limited by the number of game terminals. Also, any type of smart personal device with a display, such as, a smart phone (e.g. iPhone™), a PDA (e.g. iPod Touch™), a personal media player (e.g. Nintendo DS™), etc., may be used as the game terminal, as long as the device is running the "Terminal subsystem software" (sometimes also referred to as "augmentation layer") that is described below.

Dedicated Hardware Design

The purpose of dedicated hardware is to provide optimized experience of digital board and user terminals in dimensions and usability. The dedicated hardware is portable and packages together in compact way at least 1 board and 4 terminals. The dedicated hardware may include few boards and physical connectors to attach them. The physical connectors may be used to exchange data and power. In case of multiple boards, some of the boards may be dumb, used for surface extension (both display and inputs), and are fully controlled by their hosting board. The dedicated hardware supports single charging point of all the system components.

Special Purpose Hardware Gadgets

The gaming system may include special purpose hardware gadgets that can communicate their outcome over wireless communication and impact the game play. Examples of such gadgets are physical dice, game pieces, sand clock, or "live" avatar that has unique role in the game.

Software

The "gaming system software" is in essence abstract operating system that consists of "Board subsystem" and "Terminal subsystem", runs on variety of hardware platforms, and implements hardware agnostic gaming services.

Objects Exchange

The "gaming system software" provides seamless movement of digital objects between the system screens, including board-to-board, board-to-terminal, terminal-to-board, and terminal-to-terminal. The objects exchange depends on the game play rules. Objects can move as is (e.g. Monopoly money) or follow some transformation rule (e.g. flip Scrabble tile, show Poker card). Objects exchange can trigger some game rule (e.g. decide on the winner in Card games). Object exchange can create unique experience like dice shake on the "Terminal" (using the accelerometer) that virtually continues on the "Board" taking into account the magnitude and direction of force applied by the user action. Example of game objects are tiles, cards, chips, money, drawings, avatars, etc.

"Board Subsystem"

The "Board subsystem" provides system administration, players management, and game management services. The "Board subsystem" loads games from local and web game repositories. The "Board subsystem" enforces the user rights to the games and manages the accounting between the user and games providers. The "Board subsystem" manages intelligent cache of game assets and automatic updates of game features. The "Board subsystem" displays the shared part of the games and handles the game play. The "Board subsystem" provides set of gestures and features to enrich the game play, including drag-and-drop, flip an object, spin an object, rotates the board to the user side (may be applied automatically as part of the game play), etc. The "Board subsystem" utilizes the full screen for the game play and enables to access the system navigation and configuration functions through floating dashboard that can be launched anytime from pre-defined hot key (e.g. <Esc>) or hot spot on the game board, e.g. the bottom left corner. The "Board subsystem" handles the communication and assets exchange with the players' terminals and optionally with additional boards. The "Board subsystem" manages list of permanents and ad-hoc players including personal preferences (name, avatar, color, etc.), favorite games, and statistics (for each game: # of plays, wins, looses, points, etc.). The player personalized information may be imported automatically in case of ad-hoc players with smart phones and PDAs. The "Board subsystem" publishes its availability and therefore can be discovered by other "Board subsystems" and "Terminal subsystems". The other "party" requests to join the board (in case of "Terminal") or share the board display (in case of other "Board"), and the board user needs to approve it. That process is necessary in case of multiple boards' environment like video arcades, game board Café', etc.

The "Board subsystem" is the center of the game system and provides software services to its satellites "Terminal subsystems" including necessary game assets (the "Terminal subsystem" is not dealing with games downloads or licensing), list of known players (for the link of player to terminal), list of available colors (as part of the player personalization or game setup process), list of other terminals (to enable terminal-to-terminal communication) etc.

Multiple Boards

The "Board subsystem" discovers automatically other "Board subsystems" that it can utilizes their display area. The "Board subsystem" requires the approval of the other "Board subsystems" to utilize their display area. In case that multiple "Board subsystems" agree to share resources, the "Board subsystem" that starts a game, take control on others and handle the game flow.

Multiple "Board subsystems" can work in few configurations, 1) create bigger view of the same skin where each "Board subsystem" display and get inputs on part of the display, 2) enable multiple boards' games, e.g. playing few Monopoly boards and create expanded game play, 3) enable peer-to-peer boards games, where each player enjoy full board experience in games like Battleships or Stratego, 4) create exact duplication of the game board to support many players experience, maybe in different locations, etc.

Positioning Process

The "Board subsystem" manages the players' position on the board. The process may start with the collection of players with terminals or the definition of current players on the board (e.g. in case of Chess the terminal is not mandatory). Players positioning view shows a "symbol" for each player and let the users drag their symbols to their preferred side on the board. The process supports any number of players that can share the same side. The above process defines the area in which the player objects will be exchanged with the board, e.g. when he/she drop tiles from his terminal to the board, or drags cards from the board to his terminal.

In many games, the "Board subsystem" manages the turn of the players. When the turn is well defined, multiple players can share the entire side for drag-and-drop actions (vs. using fraction of the side depends on the number of players).

The above process is necessary before any game starts and can be altered during the game. The defined positions and drag-and-drop areas may be viewed during the game as names, colors, avatars, and/or players pictures as additional "players' layer" on top of the board area and may have different variants on different games.

In some games, when it's important that all players will know each other assets/status (e.g. chips in Poker, cash in Monopoly, or score in many games), the "players' layer" may show in addition to their names, colors etc., their assets/status.

Alternatively, the above players' details can be defined as "players' box" that can be dragged to any area in the board and thereafter used as the players' "gate" to the board (e.g. in Poker it makes more sense to position the "players' box" adjacent to the table vs. the frame of the display).

"Terminal Subsystem"

The "Terminal subsystem" searches for available "Boards" in the area and enables the user to connect to one or few of them. The "Terminal subsystem" enables the user to personalize his name, symbol, color, and position on the "Board". The "Terminal subsystem" receives the game assets from the "Board subsystem". The "Terminal subsystem" displays the player private data (e.g. Tiles in Scrabble or Poker Cards). The "Terminal subsystem" provides private actions like browsing electronic dictionary, game rules, or potential game strategies. For example, it enables the user to take private notes related to the game (e.g. in the Clue game). In another example, it enables the user to simulate privately potential game steps (e.g. in Chess) without the steps being implemented on the actual game played. As the game progresses, the user may activate one or more of the simulated moves, so that they are actually performed in the game played. Alternatively, the user may change the simulated moves according to new moves that were actually enacted in the game played. The simulated moves can be saved in the memory, e.g., RAM, and the processor can enable the user to switch between "real" game view and "simulated" game view. The "Terminal subsystem" exchanges game objects with the board or other terminals. The "Terminal subsystem" enables in some games to share private information with other players' terminals, either by sharing the entire view or exchanging individual objects and widgets. The "Terminal subsystem" supports touch gestures and hand writing; the hand writing drawings and lists can be exchanged as other game objects.

Remote Control

The "Terminal subsystem" may include remote mouse and custom controller of the board view. The custom controller can be generic by sharing the entire view (like Webex™) or game oriented by exchanging the game gestures and actions (e.g. moving a tile on the controller will send "move tile action" to move the same tile on the shared board). To complete the experience, the "Board subsystem" needs to inform the "Terminal subsystem" about changes on the physical board, and the "Terminal subsystem" in exchange should update its user miniature view of the board. The custom controller support zoom and board shift to access easily any part of the bigger board. The terminal controller supports zoom and board shift to easily access any part of the main board. It also supports store and forward function that enables the user to prepare the next move privately before sending it to the main board. When the terminal is set for a view of the main board, its processor may constantly synchronize the user miniature view of the main board with the main board subsystem.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIGS. 6A-6B and 7A-7B illustrate how a plurality of game board display units can be coupled together to extend game playing surface, according to embodiments of the present invention.

FIGS. 15-17 illustrate embodiments of jigsaw puzzle games, wherein FIG. 16 illustrates a display on a main monitor, such as a TV, and FIG. 17 illustrates an embodiment wherein the user can select a small section of the puzzle (i.e., zoom in), and as the user builds that area, the corresponding area on the TV screen displays the same actions.

FIG. 18 illustrates a screenshot of a device showing a trivia game according to one embodiment.

FIG. 20 illustrates a snapshot of Poker bank view according to one embodiment.

DETAIL DESCRIPTION

Figure 1:
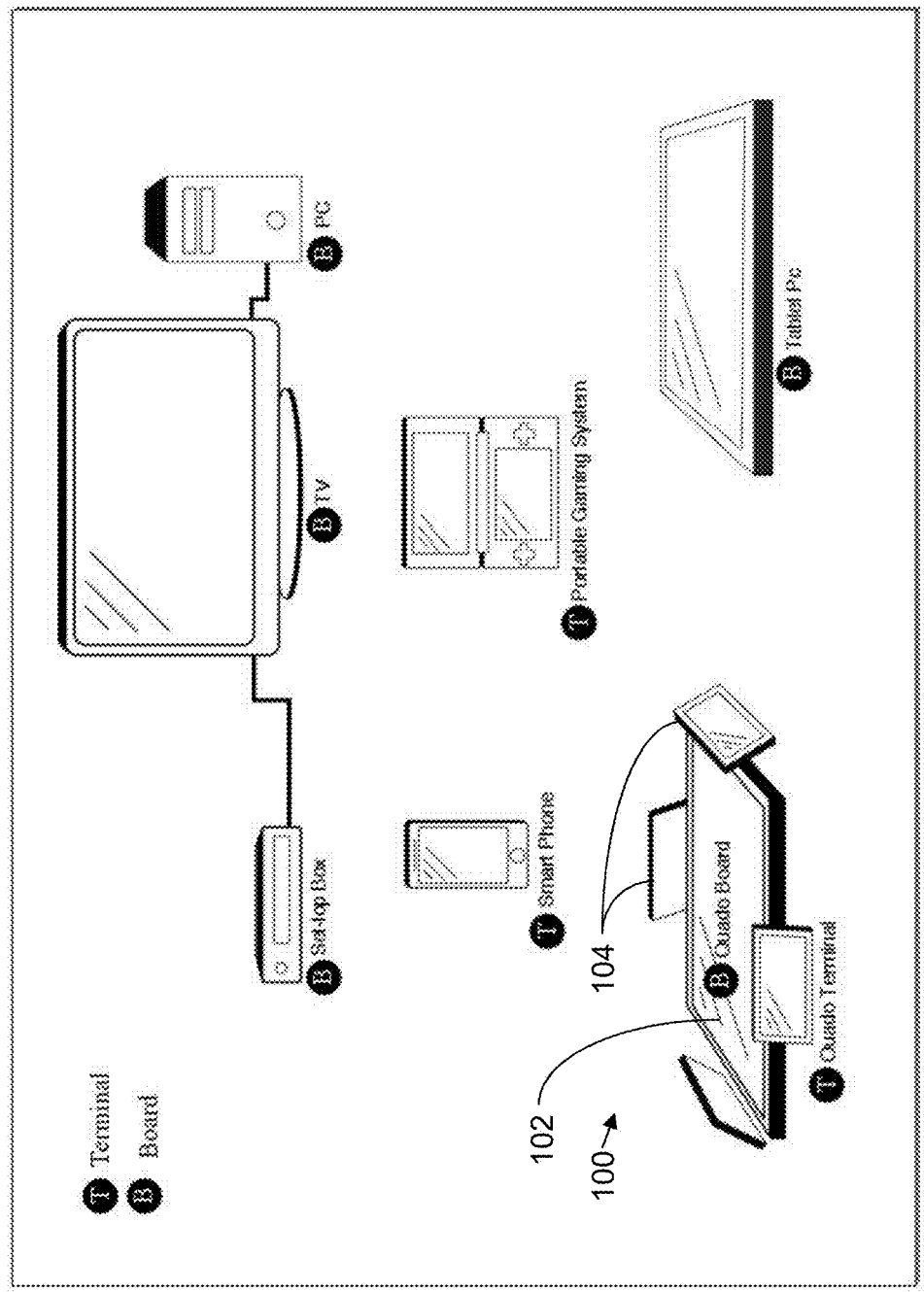
FIG. 1 illustrates various possible implementations of the inventive multi-screen, multi-player gaming system.

Various embodiments of electronic gaming systems, including the relevant hardware and software, are disclosed. In general, the disclosed system can be implemented on dedicated, specifically designed hardware, on commonly available hardware, or on mixture of dedicated and commonly available hardware. In this sense, the invention provides an orchestration system that manages communications and processes among the various hardware pieces which form the multi-screens aspect of the multi-player gaming system. The orchestration system can be implemented purely in software running on, e.g., general purpose computers, video game consoles, PDA's etc., (when no dedicated hardware is used), or in combination of software and dedicated hardware. The inventive system introduces an augmentation layer that enables required transactions among the various screen units. Therefore, the inventive system can be conceptualized as an augmentation layer running on top of the native OS, and a game application running on top of the augmentation layer. In this respect, the augmentation layer may be generic and indifferent to the specific game being played. In addition to features described in details herein, this implementation also enables the system to operate on various platforms, wherein each platform is running a different operating systems (OS). Also, in certain implementation a generic core enables certain generic actions required for all games. Once a player selects a game, the core takes appropriate actions to load elements required for the specifically selected game.

According to certain aspects of the invention, the system may be implemented as a portable electronic gaming system allowing a plurality of players to play a game on a plurality of screens. When the system is implemented as a dedicated hardware, the system comprises a game board having a main display screen for displaying a portion of the game layout that is shared by the plurality of players, and a plurality of personal game terminals, each personal game terminal assigned to a respective player and having an auxiliary display screen for displaying a portion of the game layout that is associated with the respective player. The system enables communication between the main display and the personal game terminals, and optionally also among the game terminals directly. The system also enables seamlessly transferring digitized game objects between the respective auxiliary display screens and the main display screen, or among the auxiliary display screens, as triggered by, e.g., a game step or in response to touch-based interactive inputs received from the plurality of players. The system may also transfer or initiate coded rules associated with the transferred digitized game objects. For example, the rules can indicate where on the screen the digitized game object should appear, at what size should it be displayed, special animation that should accompany the transfer of the digitized game object, etc.

According to another aspect of the invention, the electronic gaming system can also communicate with and implement a game using conventional hardware. For example, iPod™, iPhones™, PDA's, smart phones, etc., (generally referred to herein as "smart device") can serve as the personal game terminals and communicate with the dedicated hardware or other types of conventional hardware (e.g., Wii™, X-Box™, etc.). This is enabled, at least in part, by the inventive augmentation layer that enables transactions among hardware running on different platforms, and by the game application operating over the augmentation layer. As before, this arrangement allows for digitized game objects to move seamlessly among the plurality of personal game terminals and the main board in response to game rules/steps or interactive inputs received from the individual players.

According to yet another aspect of the invention, the gaming system may utilize a conventional display, such as a plasma or LCD television or monitor as the main screen, and utilizes dedicate, conventional, or a mix of dedicated and conventional personal game terminals.

FIG. 1 illustrates various possible implementations of the inventive multi-screen, multi-player gaming system. Elements that can function as a user terminal are indicated by (T), while elements that can function as the main board or console are indicated by (B). Shown at 100 is a system that is made of dedicated hardware, i.e., dedicated gaming board 102 and dedicated terminals 104. The board 102 and terminals 102 can function as a complete gaming system and are capable of communicating among each other. On the other hand, a conventional smart phone or a portable gaming system can also be used as user terminals and communicate with any of the boards shown in FIG. 1, provided that these terminals run the software modules described below. Similarly, a conventional PC, Tablet PC, set-top box, or a TV (either a "smart" TV or a regular TV functioning as a monitor and coupled to a set-top box, PC, conventional gaming console, etc.), may function as the main board, provided that these terminals run the software modules described below. Communication can be provided between and among any of the terminals and main board shown in FIG. 1.

Other embodiments and advantages of the present invention are discussed in the subsequent detailed description section.

Overview

The present application discloses a novel digitally-enhanced gaming platform for playing existing and new social games. A typical gaming system comprises a main game display module and may have one or more personal game terminals having auxiliary game display modules and communicating with the main game display module. The personal game terminals may also communicate with each other. Various personal game terminals are enabled to exchange game-related information with other modules and to seamlessly move digitized game-specific pieces/objects (e.g., cards, tokens, tiles etc.) to other modules or to the main game display.

In certain embodiments, games can be played with shared public information displayed on the main game display module, and individual public/private information displayed on the auxiliary game display modules. In other embodiments, there is no main game display module, but a plurality of inter-communicating auxiliary game display modules are assigned to individual players.

The personal game terminals may be handheld devices, such as, smart phones, personal digital assistants (PDA), or dedicated personal game terminals assigned to individual players. The main game display module may be a portable dedicated digital game board, or may be part of an existing appliance, such as, a television screen or computer monitor coupled to a computer or game console (such as Nintendo Wii or Microsoft Xbox game consoles) running an appropriate gaming software. The main game display module may have other configurations, such as, a touch-screen-enabled tablet PC, or a laptop computer with a keypad, touchpad, trackball, etc. The digital board may be designed to be folded for portability and ease of storage. The main game display module may be a combination of one or more existing appliances and a dedicated digital game board.

The main game display module may be a single display unit, or a plurality of display units that can be coupled to each other. Coupling a plurality of display units to form the main game display module has the additional advantage of creating increased shared playing area that can accommodate more visual information related to the game. The plurality of display units may be physically pre-attached to each other by some fastening mechanism, such as, a hinge, a flexible backing tape, etc., or they may be removably attachable to each other, as required. When the plurality of display units are aligned together, the system automatically identifies the new structure and applies the game layout over the combined display units, forming a larger unified game surface. In one embodiment, a plurality of removably attachable display units can be used in at least the following ways: 1) two or more display units are used for public display, wherein digital game pieces can be seamlessly moved from one public screen to another, e.g., player finishes the game track on one public screens and continues to play on a second public screen, 2) one or more display units are combined to form a bigger display module displaying the shared playing area; 3) one or more display units are used individually as auxiliary game display modules, where the game does not necessarily need a shared playing area; 4) two or more screens that are duplicate of each other—this is especially beneficial for games played in teams, wherein each team receives one public screen having the same graphics as on the other public screens; 5) two or more screens that are calculated-duplicate of each other, i.e., part is duplicate and part is not according to certain game rules—this, for example, can be implemented for playing Submarines, where part of the screen is duplicated, but other part is hidden; etc.

A processor within the main display unit can implement a positioning process. According to this process, the processor of the main unit maps the physical location of every game unit, i.e., public and personal game units, with respect to the main unit and other units. To illustrate, the processor can utilize a North-South, East-West grid centered at the center of the main public screen. If four players with four personal game units are seated around the main screen, then the processor identifies each personal unit and maps them according to the North-South, East-West grid. To enable this mapping, the processor establishes a communication protocol to recognize each personalized game unit and to approve-disapprove its joining the game. If the personal unit was approved to join the game, the unit establishes a physical location for that unit. For example, the processor may display a symbol identifying this unit at a certain coordinate on the main screen. When the user of that unit is actually seated in a different location or would like to move to a different location, the user can "drag" the symbol on the main screen to a different location.

The above process is not limited to 4 players and supports the allocation of few players to the same side with virtual separation between them (e.g. Half-Half). Furthermore, the same process is applicable without physical game units, in case the entire game play is happening on the same board (e.g. Chess). In such case, virtual image/avatar of each player is used to define his/her position around the board.

As mentioned above, digital game pieces can be seamlessly moved among the various private and public screens. For example, a user may move a game piece, e.g., a card, from his personal unit to the main unit using, e.g., an assigned button, softkey, or hand gesture. In this respect, the digital game pieces can be grouped into two type of digital game pieces: "dumb" game pieces, i.e., digital game pieces that have basically only graphical representation but no function, e.g., cards, chess game pieces, etc., and active or "intelligent" pieces, which have internal function, akin to a widget or applet, e.g., die, warrior, etc. Additionally, when a game piece is transferred from one terminal to another, whether personal or public, a rule set is implemented to that specific transfer. The rule set may include, for example, the location for displaying the object on the transferee screen (for example, at an indicated place on the public main game board, at a location closest to the player transferring the piece, etc.), the size of the object to display (for example, enlarge or reduce depending if moving from a small to large screen or vice versa), any motion of the piece (e.g., if moving a covered card from main screen to private screen, flip the card to reveal its face), enact action per game rule, (e.g., when moving money in Monopoly from private screen to bank at public screen, action can be activated, e.g., game piece goes out of jail if payment was made to get out of jail), activate audio corresponding to the game piece, etc.

Combining the positioning concept with the seamless motion of game pieces, according to one embodiment, during the positioning process the processor displays "gates" on the main screen for each player. The gates may be displayed graphically in any shape or form, as long as each gate is identified as corresponding to a personal unit or player participating in the game. Then, when a digital game piece is moved from the public screen to a personal screen, it is graphically moved on the public screen towards the gate corresponding to that specific personal unit. The reverse is also true: when a user moves a game piece from a personal unit onto the public screen, the game piece "enters" the public screen through the gate associated with that particular personal unit.

Combining the above with the natural game turns enables the players to use their entire side to exchange objects with the board, as compared with sharing the side with other players wherein each player gets a smaller defined gate.

Various Playing Configurations

The gaming system components can be used in different playing configurations allowing the player(s) to play different type of games.

Examples of different playing configurations are discussed below with specific game examples for each. In these examples, without limiting the scope of the invention, a dedicated digital game board is recited as the main game display module, and dedicated game terminals are recited as the auxiliary game display modules, for illustrative purposes.

Single-Unit or Multi-Unit Game Board with No Personal Game Terminal

In this configuration, the game is played using only one game board, where one or more players play a game using a touch screen (or keypad, trackball, joystick, touchpad etc.) on the game board. The game board displays shared "public" playing area. The game board may be a single display unit. Alternatively, as discussed before, two or more display units may be combined together to expand the display area of the game board. Examples for games suitable for this configuration are Snakes and Ladders, Memory game, Chess etc.

In an extension of this configuration, multiple shared "public" game boards may be used. Examples of this configuration are strategy games like "the Settlers of Catan". Since a large public playing surface is often required, a multi-unit game board is often suitable for this configuration and game pieces may be moved seamlessly from one main board on one display unit to another main board on a second display unit.

Single-Unit or Multi-Unit Game Board with Personal Game Terminals

In this typical configuration, the single-unit or multi-unit game board is used for the game's shared "public" playing area, which all the players can see and use, and the personal game terminals are used for each player's personal playing area. The "personal" playing area may be "public", i.e., visible to other players, or may be "private", i.e., exposed only to a specific player and hidden from the other players. Personal "private" playing area may be selectively accessible by collaborators, but not by the competitors. The personal game terminals exchange information with the game board.

Examples for games suitable for this configuration are Monopoly, where the terminals are visible to all the players, yet hold the respective player's properties information (such as the money stack of a player), and Scrabble, where the terminals hold the respective player's letter tiles and this information is hidden from the rest of the players, and many card games, where the terminals hold the respective player's private cards.

Personal game terminals may be used for a variety of functions, including, but not limited to, privately browsing game rules, consulting game strategies from available suggestions, consulting references (e.g., looking up a dictionary in a Scrabble game), taking private notes (e.g. in the Clue game), planning privately the next game steps, and optionally, for remotely controlling the game-specific pieces/objects on the main board.

Multiple Game Boards Used as Personal Game Terminals

In this configuration, there are a plurality of single-unit or multi-unit game boards. The game boards exchange information with one another. Personal game terminal functionalities may be available in each of the game boards, when each player holds his/her own board, and there is no separate main display module. In this configuration, the "public" playing area is displayed in all the single-unit or multi-unit game boards acting as personal game terminals, and the "private" playing area, if any, is superimposed or co-located with the public playing area.

Examples for games suitable for this configuration are Battleships. In the Battleship game, the public playing area is the main grid of the game, which is seen by all the participating players in their "Terminals". But, on top of that, individual players see their "private" game-related information hidden from the other players. Stratego is another example game suitable for this configuration.

Example Gaming System

Figure 1A:
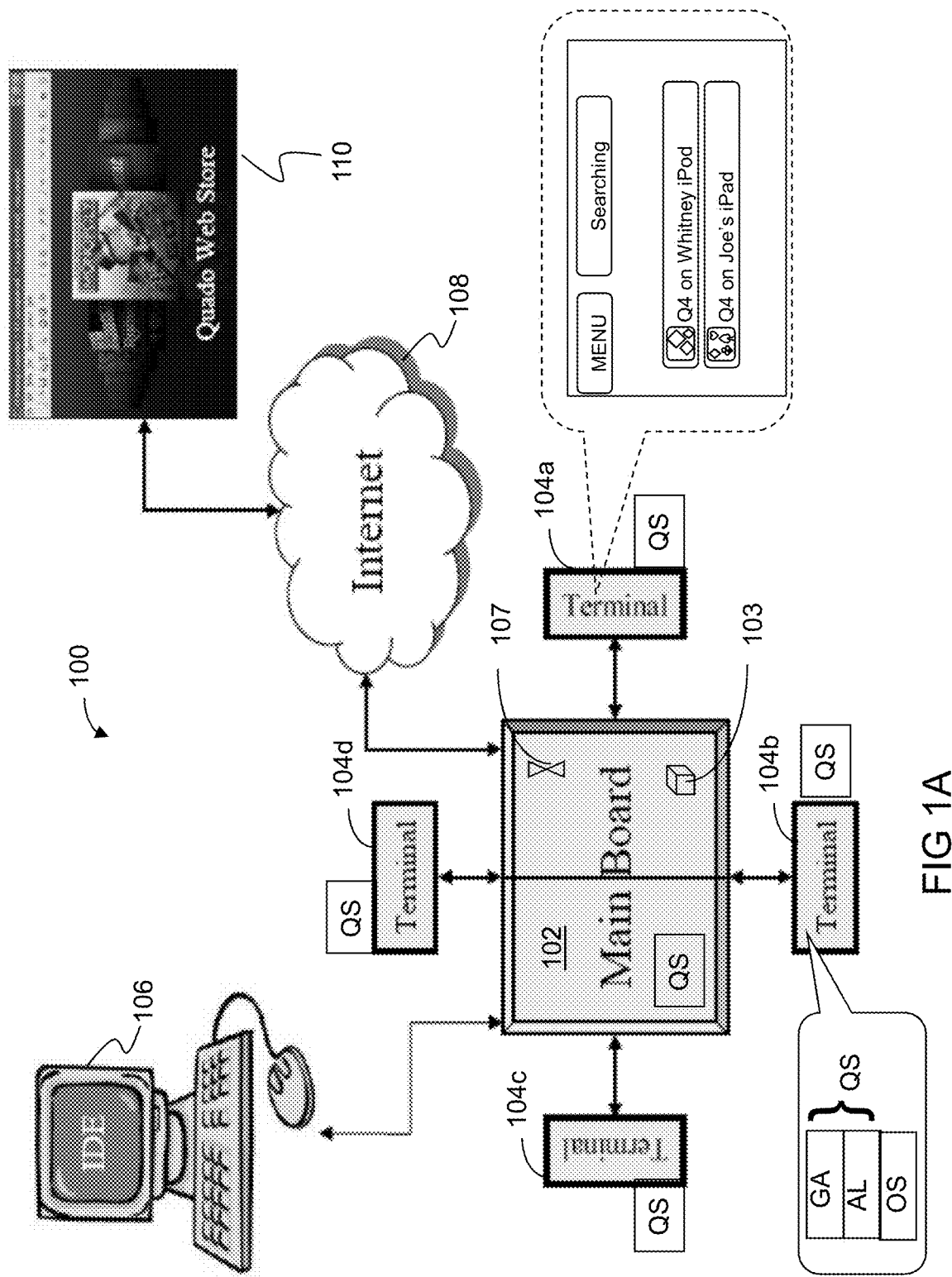
FIG. 1A illustrates components of an example game system with a main game board and multiple game terminals, according to an embodiment of the present invention.

FIG. 1A shows one example of a gaming system 100, according to an embodiment of the present invention. In this embodiment, the system comprises a main board 102 and several personal game terminals, here four are shown, 104a-104d. Each of the main board 102 and terminals 104a-104d runs a piece of software, indicated as QS, that enables execution and orchestration of various games, as selected by the users. In some circumstances, a general device, such as a PDA, smartphone, etc., can be used as a personal game terminal. In such a case, as shown in the callout of terminal 104b, an augmentation layer AS runs on the native OS, and a game application GA runs on the augmentation layer. The augmentation layer and game application can be conceptualized as the QS software.

In one example for implementing the system of FIG. 1A, the main game display module is a dedicated digital game board 102. Board 102 is used for displaying the game layout, such as, the grid in a Scrabble game, and for enabling 'public' game related activities, such as, moving publicly visible Scrabble tiles and composing words on the game grid. Board 102 may be a TFT-LCD (Thin film transistor-liquid crystal display) or LED panel digitally emulating a printed game board. Game objects or game-specific pieces (dices, tokens, cards etc.) are emulated by digital graphic images. The game board 102 may be placed horizontally allowing several players to sit around it and play just like they would have done when playing with the paper-printed version of the board game. The board 102 may comprise more than one display units. Each display unit is capable of being coupled to another unit even if no other unit is physically connected to it at a given time instance. When the multiple display units are physically or logically aligned and coupled together, the system automatically identifies the new expanded available display structure and applies the game layout over the combined display units, forming a larger unified playing surface, duplicating the main image, partly-duplicating the main image, etc.

The game terminals 104a-d are used by each player for 'private' game activities, such as, privately viewing his/her current set of tiles in a Scrabble game or Cards in Texas Holdem. Though four terminals are shown in FIG. 1A, the scope of the invention is not limited by the number of game terminals. Also, any type of smart personal device with a display, such as, a smart phone, a PDA, a personal media player, etc., may be used as the game terminal 104, as long as the device is running the QS software so as to be configured to communicate with the game board 102.

Players may interact with the system modules by using finger gestures (or a stylus) on the touch-screen on one or both of the game board 102 and the terminals 104. Alternatively, a keypad, a set of buttons, a joystick, a trackball etc., may be used to receive player input. The movement of game specific pieces, known collectively as game objects, between the game board 102 and the game terminals 104 should be seamless. For example, a Scrabble tile's digital image may be 'dragged' from a game terminal 104 and placed on the main Scrabble grid on the game board 102 using, e.g., a hand gesture on the touch screen of terminal 104.

According to one embodiment, movement of physical object can also be incorporated into the game. For example, a dice 103 is equipped with a transmitted device, such as Bluetooth or other transmission protocols or methods. Once the dice lands, it transmits the value shown by the dice. The main board 102 includes a receiver that receives the transmission from the dice and uses the information to advance the game. A similar implementation may be made with, e.g., sand clock 107, game pieces, etc.

In an alternative embodiment, a role of a dice is implemented using transmission from the personal terminal 104 to the main board 102. In such an implementation, an accelerometer may be embedded within the personal terminal 104, so that when the user shakes the terminal it simulates shaking of the dice. Then, when a user makes a motion as if to "spill" the dice onto the main board game 102 (this can be sensed using, e.g., an inclinometer embedded in the terminal), the personal terminal 104 transmits to the main board 102 a transfer command that may include an identification of the dice, its speed of role, the strength of the user's motion, etc, whereby the personal terminal 104 shows a graphic of the dice falling off, while the main board 102 uses the data transmitted from the terminal 104 to show graphics of the dice rolling onto the main board 102 at the appropriate force and direction. The dice may also roll from one board to another, when more than one board are used for the main display.

In one example, when the main board is implemented as a television or remote monitor, the personal units operate in two modes: game mode and control mode. In game mode, the personal unit displays the personal screen of the game, and command entries of the user affect his/her personal terminal. For example, in card game the unit will display the personal cards of the player and the player may reorient the order of the cards shown on his/her personal display, add/remove cards from his/her personal display, etc. In control mode the unit is used to control the objects displayed on the main screen, e.g. to shuffle the card stack on the main board and distribute cards to the various players.

Each one of the game modules, i.e., main board 102 and personal terminals 104, communicates with the other modules using either wireless or wired communication or shared memory interface to exchange game related information, timing information, and control information.

The gaming system 100 may have a games repository (shown in FIG. 2), so that the same hardware can be used to play a variety of games. Games repository may be coupled to a web-based game repository 110 accessible via the Internet 108, allowing players to download games into the system. Games repository may also reside on local permanent storage media (e.g., a hard drive), or removable storage media (e.g., a CD, an SD memory card, a USB flash memory device etc.) configured to load games into the gaming system 100. The removable storage media insertion slot (shown as input slot 212 in FIG. 2) may be built into the board 102, or may be on an external work station 106 coupled to the board 102. Work station 106 may also serve as the gateway to the Internet connectivity for game download, if the board 102 itself is not Internet-enabled. Work station 106 may also serve as the platform for developing and testing new games, or adding/modifying several features of existing games, managing individual player profiles, etc. All the activities that require for the ongoing usage of the system including players management, users' favorites, handling terminals positioning and the merchandise of games content are available directly from the game board user interface.

The above configuration tasks are hidden during the game play and available through floating dashboard that can be launched anytime from pre defined key (e.g. <Esc>) or hot spot on the board (e.g. bottom left corner).

Figure 1B:
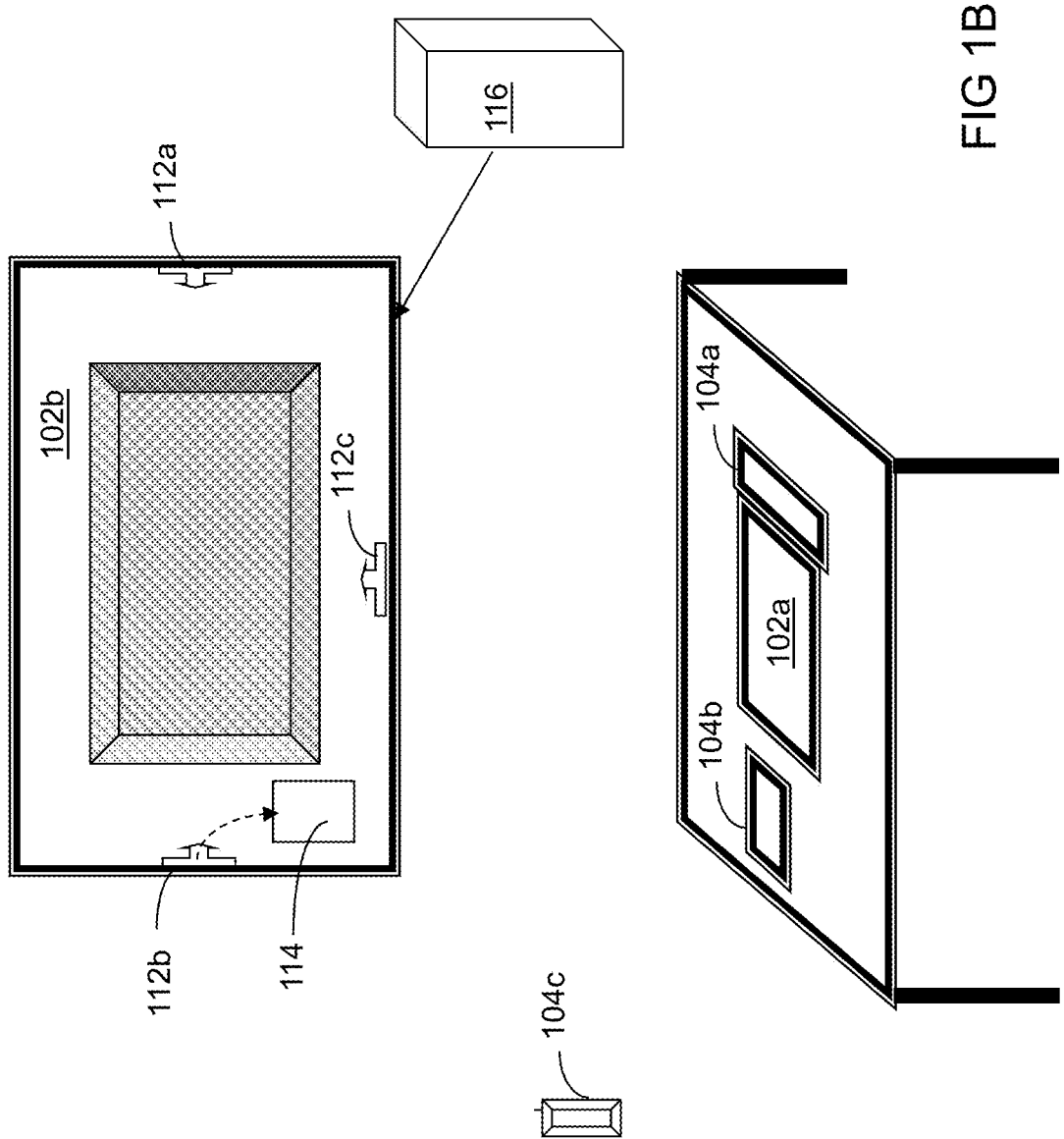
FIG. 1B illustrates components of an example game system with two main game boards (one on the table and one mounting to the wall) and multiple personal game terminals, according to an embodiment of the present invention.

For a further illustration, FIG. 1B depicts an example of a set-up wherein a first main board 102a is a dedicated hardware placed on a table, and a TV set 102b is used as the second main board. Two personal units are used in this example, unit 104a being a dedicated hardware—here attached to the main board 102a so as to receive power for charging its batteries—and unit 104b being a standard PDA, smartphone, etc., running the QS software and communicating with main board 102a wirelessly. Alternatively, the TV set may be connected to intelligent processing unit 116, which may be a pc, a media center, a game console, a set-top box, or embedded in the TV appliance. In such a case, the main board 102a function is replaced by the processing unit 116 running the QS software. The personal units 104 may communicate with the board processing unit 116 wirelessly.

System Initiation

When the game is initiated, for example, from main board 102a, the processor of main board 102a publishes/broadcasts its existence and activates its receiver to recognize any other main boards or personal units in its neighborhood. For example, in the embodiment of FIG. 1B, the main board recognizes the presence of the second main screen 102b and may prompt the users to select whether they wish to extend the main board display to unit 102b. If so, the processor may prompt the users or use internal rules to determine how to extend the main screen into unit 102b. That is, depending on the game selected by the users, unit 102b can be used to duplicate the screenshot of unit 102a, to extend part of the screenshot to unit 102b, to "smartly-duplicate" to unit 102b, etc. Conversely, the main board may receive requests form other main boards to serve as a secondary board. Upon receiving such a request the main board may prompt the user for approval. The main board also loads the game from local or remote sources.

Figure 1C:
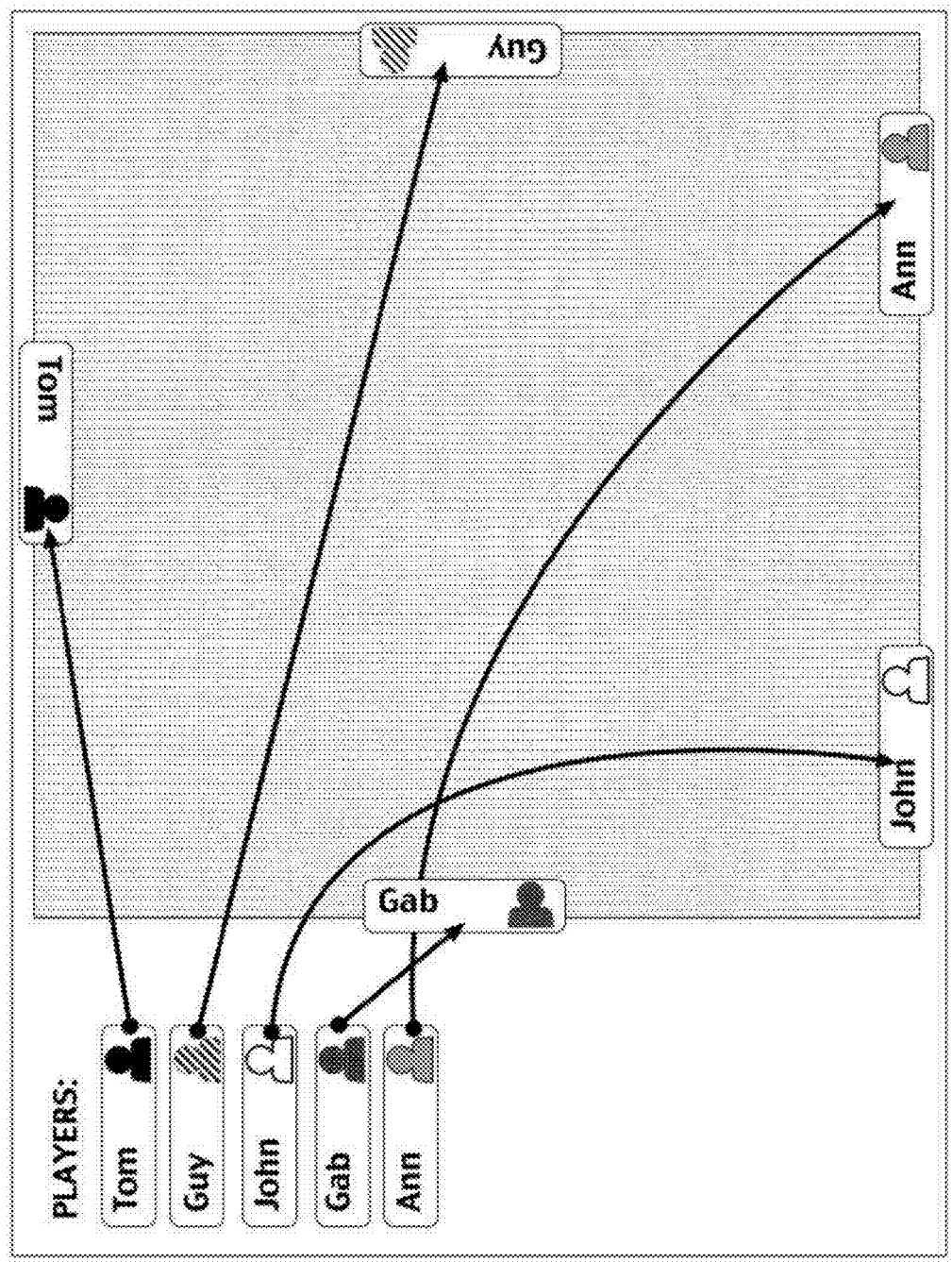
FIGS. 1C-1E illustrate the player positioning feature according to embodiments of the invention.
Figure 1D:
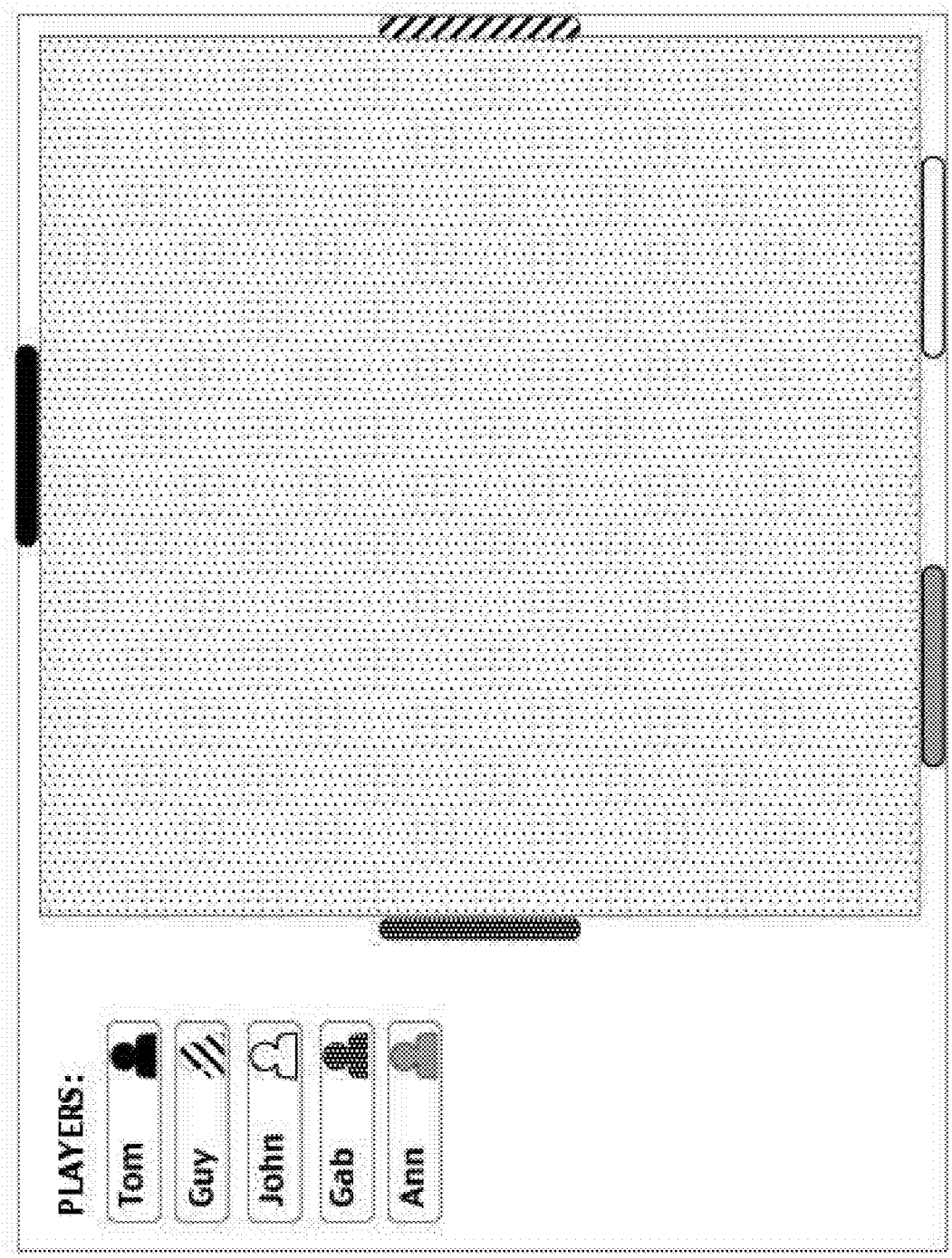
Figure 1E:
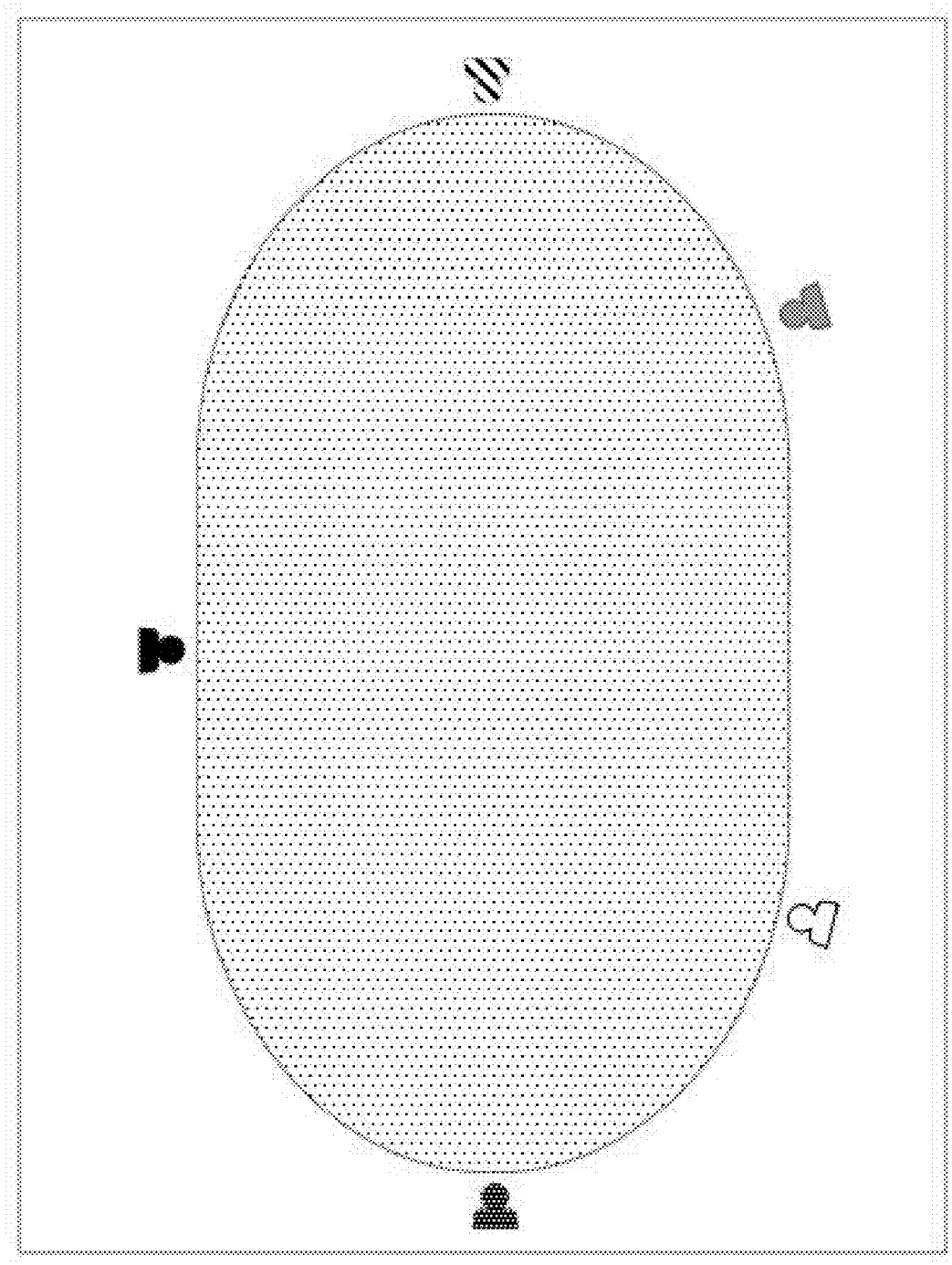

When the main processor detects that wired unit 104a is connected to the main board 102a, it may prompt the user whether to accept the unit 104a as a player. If so, the main processor may display a gate or other graphical indication 112a associated with unit 104a. If the location of graphics 112a does not correspond to the physical layout of the players with respect to main board 102a, the users may "drag" the gate to a different location on the main boards 102a and 102b. FIGS. 1C-1E illustrate the player positioning feature according to embodiments of the invention. The "Board subsystem" manages the players' position on the board. The process may start with the collection of players with terminals or the definition of current players on the board (e.g. in case of Chess the terminal is not mandatory). Players positioning view shows a "symbol" for each player and let the users drag their symbols to their preferred side on the board. The process supports any number of players that can share the same side. For example, in FIG. 1C five players participate in the game, and each is depicted using a defined player's name and an image, which may be, e.g., a player's picture, an avatar, etc. In FIG. 1D, each player is assigned a different color, so that they can e differentiated. FIG. 1E shows each player using a colored or shaded image. The above process may also define the area in which the player objects will be exchanged with the board, e.g. when he/she drop tiles from his terminal to the board, or drags cards from the board to his terminal.

In many games, the "Board subsystem" manages the turn of the players. When the turn is well defined, multiple players can share the entire side for drag-and-drop actions (vs. the case of using fraction of the side depends on the number of players).

The above process may be performed before any game starts and can be altered during the game. The defined positions and drag-and-drop areas may be viewed during the game as names, colors, avatars, and/or players pictures as additional "players' layer" on top of the board area, as exemplified in FIGS. 1C-1E.

In some games, when it's important that all players will know each other assets/status (e.g. chips in Poker, cash in Monopoly, or score in many games), the "players' layer" may show in addition to their names, colors etc., their assets/status.

Alternatively, the above players' details can be defined as "players' box" that can be dragged to any area in the board and thereafter used as the players' "gate" to the board (e.g. in Poker it makes more sense to position the "players' box" adjacent to the table vs. the frame of the display, as illustrated in FIG. 1E). If the personal units are wireless, e.g., unit 104b is wireless, they attempt to detect the main board and request to join its space, if approved, the same positioning process apply.

If the personal units are hosted on smart devices, it's the QS software role to follow the same protocol, e.g. discover the board, request to join, and participate in the positioning process. It should be noted that this "discovery and acceptance" process is especially important in locations where many main boards are operating, such as in video arcades, etc. In such situations, many smart devices may try to communicate with many available main boards. In order to ensure that communication from each personal unit is directed to the proper main board, the unit must be "discovered and approved" by the main board. Once approval is granted, the personal unit can participate in a game on that accepting board, and communications from that personal unit will not affect any other main boards in the neighborhood. Additionally, during the discovery process, various actions germane to the game being played may be executed. For example, if the main board determines that the particular personal unit has already participated in this game in the past, it may interrogate the unit or its own memory for assets remaining (e.g., weapons, lives, etc.) from the previous game and make a note of the list of assets and may send an update to the terminal unit. Conversely, if the unit has not previously participated, the main board may issue initial set of assets to the unit.

Figure 1F:
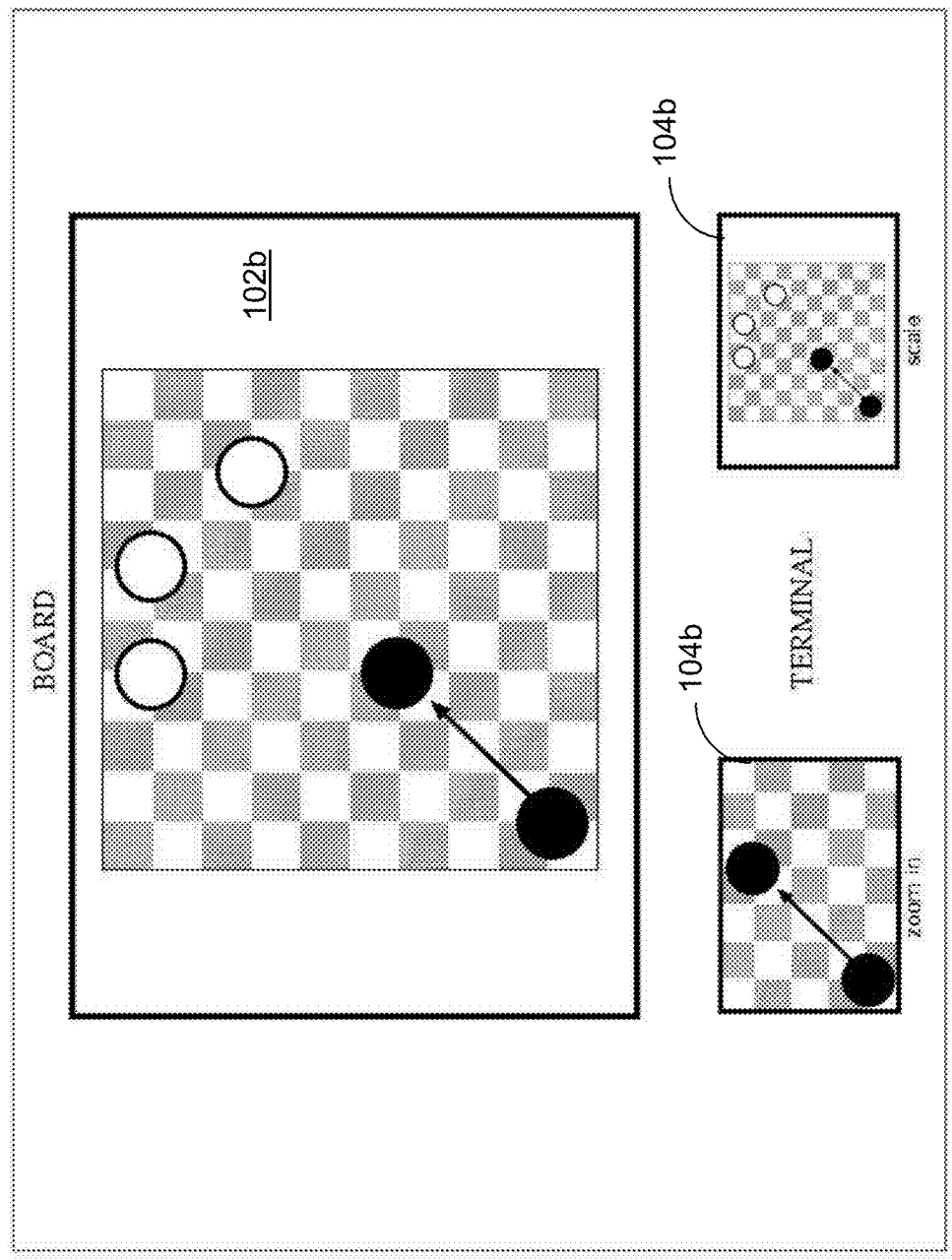
FIG. 1F illustrates a control mode feature of the personal terminal unit.

Once communication is established and a personal unit is accepted to the game, the user can utilize the personal unit to control his/her actions in the game, as described more fully below. Additionally, when the game board is displayed on the TV monitor 102b, and a user wishes to take an action on that board, e.g., move a game piece, it may be inconvenient to require the user to get up and walk to the TV, or using the TV remote control to perform the action. If the main board displayed on 102b is a duplicate of what is displayed on 102a, then the user may simply drag the game piece on board 102a. However, if it is not duplicate, then according to a feature of the invention, the user may switch his/her personal unit to operate in a control mode, wherein action on the personal units affect the TV monitor 102b. This feature is illustrated in FIG. 1F. To help the user, the display of the TV monitor 102b may be replicated on his personal terminal unit 104b. Additionally, the user may be able to "zoom in" on selected areas of the TV monitor that is displayed on his/her personal unit (shown in the left-hand zoom-in drawing), so as to make it easier to select a game piece. In this mode the personal unit may also function as a wireless mouse or other such wireless input device. When the user returns the personal unit to terminal mode, action on his/her personal unit affects the game in the normal manner as described herein.

When a personal unit has been accepted to the game and has communication channel established with the main board, it may request from the main board a list of all other connected personal units and their relevant data. It may also be used be to communicate directly with other connected or unconnected personal units, for example to exchange game pieces, to share views, etc. If a communication is established with a personal unit that is not connected to the game/main board, the personal unit may send an invitation to the non-connected unit to join the game.

According to aspects of the invention, game pieces are moved seamlessly between each personal unit and the main boards, and optionally between two or more personal units. When such an action takes place, transfer rules are implemented. The rules may include instructions regarding the display of the transferred piece, instructions regarding actions to be taken upon transfer of the piece, etc. For example, when moving a card from unit 104b to main board 102b, the rules may include displaying animation on unit 102b, showing the card entering from gate 112b and moving to stack 114, as illustrate by the broken-line arrow in FIG. 1B. The action to be performed may include sounding an audio clip, playing a video clip, issuing another card from the stack, calculating score, etc.

According to another feature of the invention, main board 102a also serves as a charging hub. That is, when personal units 104 operate on rechargeable batteries, charging several units would requires the same number of wall outlets or a multi-outlet cable. Instead, according to a feature of the invention, main unit 102a includes a charging controller coupled to several outlets, so that each personal unit 104 may be connected to the main unit 102a for charging.

Working Modes for the Gaming System

The gaming system may support different working modes, controlled by the game's underlying software, as will be described below. Some example working modes are discussed here.

Single Board Mode

In this mode only one main game display unit comprises the game board 102, and is used to display game layout and to receive player input.

Master-Dumb Mode

In this mode more than one display units comprise a game board 102. Each display unit displays a portion of the game layout and provides input means with respective touch panels. A main display unit is fully equipped with a full set of controls. The other display units may also be fully equipped with controls, or include only respective display screen and touch screen modules. The other display units are physically connected to the main display unit and serve only as display extension, where the main display unit supplies both power and display distribution data.

Master-Slave Mode

In this mode more than one display units comprise a game board 102 and all the display units are fully equipped with controls. One of the display units is assigned to serve as the "master" and the other display units are assigned as slaves. The roles for each display unit are automatically negotiated between the units themselves and are confirmed by each unit. The participating units are coupled to each other in two-dimension forming a large display structure and communicate with each other in order to exchange control and application related information.

Distributed Software Engine

Figure 2:
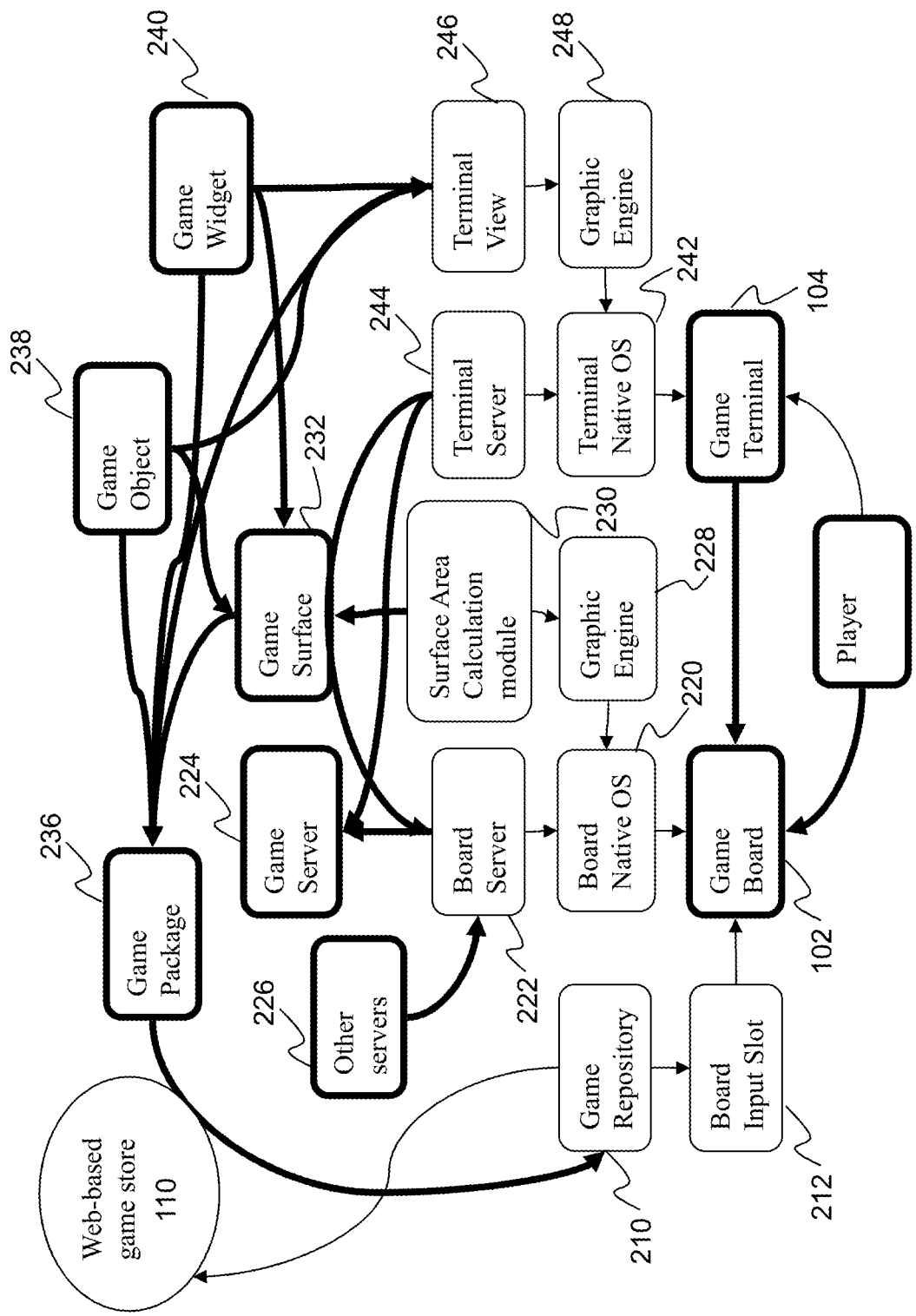
FIG. 2 illustrates interrelationship between various hardware and software components of a game system, according to an embodiment of the present invention.

The gaming system according to embodiments of the present invention is powered by a software engine distributed across the system hardware components, such as, the components shown in FIG. 2. The distributed software engine comprises several software packages, each of which handles different levels of the system, including the game board(s) and terminals, the game development environment and the web services.

Figure 1G:
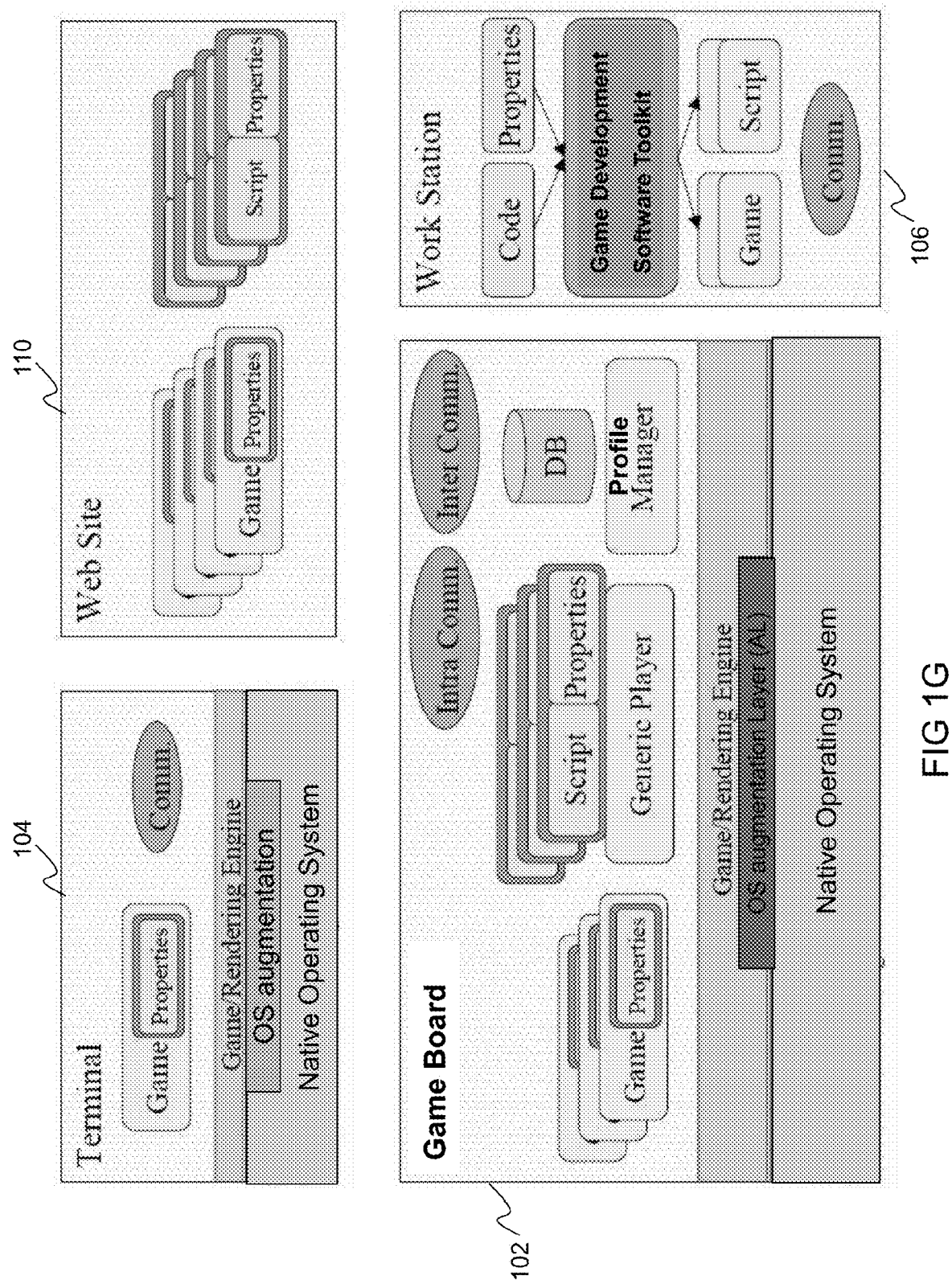
FIG. 1G illustrates a high-level schematic representation of a distributed software engine enabling the digital board games, according to an embodiment of the present invention.

FIG. 1G shows a high-level schematic representation of the distributed software engine, where the software engine components are distributed between the game board 102, terminal 104, web-based game repository 110, and work station 106. Persons skilled in the art will appreciate that the distributed software engine automatically controls many of the features of the gaming system, while letting some other features (related to a specific game or a specific player profile) to be customized by the players so that they can enjoy a rich user-experience while playing (e.g. personalizing the pictures in the Memory game).

Customization can be done at the web-based game repository 110, at the work station 106 (by the game developers), or locally at the game board 102, as shown in FIG. 1G. Players have the option to use predetermined game properties loaded as default options at the board 102, at the game terminal 104, at the work station 106, and at the web-based game repository 110, or customize the properties according to their preference. Some of the game properties may not be changed, for example, some fixed game rules are recommended to be left intact. Work station 106 may be used by game developers for creating new games or new features of an existing game using a game development software toolkit. Proprietary or standard communication protocols (indicated by the "comm." functional blocks in the work station 106, game board 102, and game terminal 104) are used between gaming system components to exchange game-related information. Game board 102 may have intra-module communication protocol to identify and communicate with multiple display units in one main game board or multiple main game boards, and inter-module communication protocol for identifying and communicating with game terminals 104.

A game board 102 may offer a generic player profile to the players, which can be customized by the players using profile manager software module, and the customized profile is saved in persistent database DB.

The web-based game repository 110 may provide various customer service options, such as, game download support (from server or from users using peer-to-peer services), subscription and billing management, new feature suggestion, user feedback collection, etc.

System and Application Software Packages

The two main software packages included in the distributed software engine are: the "System" package, which handles the platform dependent functionality, and the "Application" package, that handles the game related activities. The System package is responsible for managing and controlling different hardware elements (e.g., game-boards 102 and game-terminals 104) and their communication, and is responsible to provide all the services required by the Application package to execute and control any desired game independently of the actual hardware setup.

System Software Package

The system package of the distributed software engine may interpose an intermediate augmentation layer to work with an existing native operating system on various system components, so as to create an application-specific environment. Alternatively, the distributed software engine may also include a full-fledged stand-alone application-specific operating system, rather than interposing an intermediate augmentation layer coupling an application layer with a native operating system. When the system package is in the form of an augmentation layer, it provides two essential services: i. translating controls between the application software and the native OS, and ii. providing game-related services not provided by the native OS. Providing the translation services by the augmentation layer provides game developers with the freedom to develop games without regards to the OS the game will be played upon. It also enables playing a game with several units, each running a different native OS. The function of providing game-related services makes it easier for game developers to develop games by simply inserting calls to the augmentation layer when needing a service. For example, the augmentation layer may provide services such as, rolling a dice, shuffling a deck of cards (e.g., using random number generator), generating hectic sensation (e.g., by activating vibration in the handheld unit), etc.

The system package associated with the board 102 is referred to as a game board system package. The game board system package is responsible for identifying the working mode of the game, examples of which are discussed above. Upon game initialization, the main display unit of the game board 102 looks for the presence of other display units. As long as no additional display unit is detected, the board 102's working mode remains "Single-Board mode". In this mode, the board 102's CPU (central processing unit) sends all the display information to its screen. In case another display unit was physically detected, the main display unit validates the other unit characteristics over the physical connection and moves to "Master-Dumb mode" or "Master-Slave mode" accordingly. In case of "Master-Slave" mode, all the display units negotiate in order to determine which board is taking the Master role.

In addition to communicating between the video controllers of the various display units to display the game surface properly, player input is also managed by the board system package according to the working mode. In Single Board working mode, the only source for player input is the board's touch panel or key pad (or trackball, joystick, buttons, etc.) going to the board's CPU. In Master-Dumb mode, both the master and dumb touch panels or key pads (or alternative tracking mechanisms) are connected to the main board CPU which identifies the input source and translates its position in reference with the entire displayed area. In Master-Slave mode, each board's CPU receives the player input from its own touch panel. Once received, each CPU immediately sends the input information to the other boards through the communication channel. In this mode, each CPU works independently and acts as if it is the one entity that manages the whole application (i.e. the application/game is simultaneously being executed on each one of the connected boards) but displays only the portion assigned previously by the master board.

Game board system package also handles low-level communication between the main game-board and the game-terminals by implementing a data transfer protocol to be used by the application package. The Game board system package also may establish communication with web-based game repository, for example Q-store by Quado Media.

The system package associated with the game terminal 104 is referred to as a game terminal system package. The game terminal system package is responsible for the display management in the terminals 104, player input management in the terminal 104, and the low-level communication between the terminals 104 and the game board 102 by implementing a data transfer protocol to be used by the application package.

Application Software Package

The Application software package is responsible of handling the interaction with the players and any related game functionalities. The package includes a 2D and/or 3D graphic engine and the implementation of different board games for the game platform.

The game board application package initializes the application software modules, and displays the main menu (home page) allowing a player to select any available game or sub-menu. Once a game is selected, the game board application package loads and displays the game layout and all the relevant game objects. The player may, by means of fingers gestures over the touch-screen, or pressing keys, or moving a joystick, move any game objects and position them in any desired location. Some game objects, upon movement and interaction with other game objects, may be configured to launch a set of pre-defined animation video clips and sounds. A game object may be moved by the player from the game-board 102 screen to be displayed on a game-terminal 104 screen and from the game-terminal 104 screen to the game-board 102 screen.

The application package uses the communication services that are provided by the system package to exchange game objects between the terminals 104 and the boards 102 as well as for sending game-related control messages.

Other functionalities controlled by the application software may include displaying the game instructions upon player request (e.g., when the player accesses the Help menu), saving game status for restoring session in future, indicating playing turns in a multi-player game, adding/removing players, changing game levels, adjusting audio and/or display, changing game skin, etc. In case a removable storage media is inserted, the application software may automatically launch the game stored on the storage media, or a game menu to choose from.

The game terminal application package initializes all the application software modules, and manages seamless visual transition of game objects between the game terminals and the main game board screen. In addition, the terminal application package displays game related controls and information, such as, the player's points or status. The application uses the communication protocols that are provided by the system package to exchange signals for transitioning game objects between the game terminals and the game boards as well as for sending game-related control messages.

Components of Distributed Software Engine

FIG. 2 shows a high-level representation of some of the components of an example distributed software engine with respect to the hardware components of the gaming system and associated functionalities in one embodiment. The broad purpose of the distributed software engine is to enable one or more players to play games interactively. Players interact with the game board 102 (which may also be an existing appliance with a display, such as a TV, a computer, a tablet PC, etc., running corresponding parts of the distributed software engine). Each player may have a corresponding personal game terminal 104 (which may also be a cell phone, a PDA, a remote control device, a game console etc., running corresponding parts of the distributed software engine as discussed before). One of the tasks of the distributed software engine is to manage the players' profile for a specific game or a host of games supported by the gaming system. Another task is to enable seamless transfer of digital game pieces between and among the terminals and the board or boards.

In FIG. 2, the thick arrows indicate many to one communication, and the thin arrows indicate one to one communication.

The game board 102 displays the shared public region of the game surface 232. Game board 102 may have an input slot 212, through which a specific game is loaded from a game repository 210. Game repository 210 may be configured to download games from a web-based game store 110, as discussed with respect to FIG. 1A, or it could be local.

Game board 102 may or may not have a native operating system 220 (such as, Linux or Windows XP etc.). If a native operating system 220 exists in the board 102, then the distributed software engine's augmentation layer comes into play to associate application-specific software components with the board's native operating system 220. A portion of the distributed software engine associated with the board 102 controls the functions of a graphic engine 228. Graphic engine 228 is configured to control the display of a game surface 232, either spread across several display units constituting the board 102, or displayed on just a single display unit constituting the board 102. Graphic engine 228 may or may not dynamically change orientation of the game surface 232 based on player's viewing preference (which may be linked with the player's sitting position). Graphic engine 228 may also launch a game's fundamental layout, and starting position, e.g., laying out the grid in a Scrabble game, and organizing the cards in the players hand in card games.

Board server 222 is the "brain" of the distributed software engine for the board 102. Note that the word "server" encompasses both the hardware and the software associated with performing a specific function of the gaming system. However, in the context of the description of the distributed software engine, the term "server" is used primarily to mean the software component. Board server 222 is implemented on top of an existing native operating system 220, or board server 222 may include an application-specific operating system. The board server 222 detects and registers itself on the local network, communicates with other distributed software engine components, schedule games and manage licensing and caching functions of various games.

Board server 222 may implement other servers 226 for specific purposes. For example, a communication server may handle the communication and negotiation between various software engine servers (such as the board server 222 and a terminal server 244), a cache server may handle the caching of games content, a licensing server may enforce the games licensing policy, and so on.

Game server 224 is the active game "brain" that is spawned by the board server 222 when the players select a new game to start. Game server 224 records and updates the game status (e.g., maintains a list of current players, each player's scores etc.), manages the game flow, communicates with the game repository 210 for additional game-related information, and communicates with other servers (e.g. cache management communication with a cache server).

Game package 236 includes the code, graphical objects, logic, and essential licensing information that the distributed software engine understands and executes. Game packages 236 are available at the game repository 110 on the web, or on removable storage device that can be inserted or plugged in to the board 102. Game package may also be loaded in the local hard drive of the game board 102. Game package 236 is the part of the distributed software associated with the hardware described as the game repository 210.

Game surface 232 is the graphic layout of the game. The game surface 232 can be defined on a single board 102 (with one or more display units), or on multiple boards 102 (each board 102 having one or more display units). The equivalent of game surface 232 that is extended to terminals 104 is called a terminal view 246. Game widgets 240 and game objects 238 associated with the game are moved between different portions of the game surface 232 (and the terminal view 246) displayed on different modules. A component of game surface 232 is a surface area calculation engine 230, which computes which portion of the game surface 232 is going to be rendered on which display unit, in the case of a multi-unit game board 102.

A portion of the distributed software engine, called a terminal server 244, resides on each terminal 104, and helps associate individual players to corresponding terminals 104. It may be possible to accept/reject players or terminals on the fly during an active game, and to associate players' or terminals' positions around the board 102. Terminal server 244 is the "brain" on the corresponding terminal 104. Terminal server 244 is typically implemented on top of the terminal's native operating system 242. For example, a dedicated game terminal may have a Linux-based application-specific native operating system. On the other hand, a smart phone used as a terminal 104, such as an iPhone, may have a native operating system (e.g., OSX) installed in it. Terminal server 244 acts as an application server that communicates with the native operating system 242 via an intermediate augmentation layer. Terminal server 244 communicates with the board server 222 and the game server 224 and manages player interaction.

A graphic engine 248 for the terminal 104 interacts with terminal native operating system 242 (possibly via the augmentation layer), and controls terminal view 246, i.e. the portion of the game surface 232 that is displayed on the terminal 104. Terminal view 246 usually includes a few game widgets 240, game objects 238, and other utilities that are used by individual players during the game play.

Game widgets 240 are special digital widget that are necessary for particular games. Examples of game widgets 240 are Scrabble bag, dictionary, dice tray, etc. Game widgets 240 have special function in the game flow and usually special location on the game surface 232 and/or terminal view 246.

Game objects 238 comprise movable objects of the game, such as, tiles, cards, tokens, etc. Game objects 238 have a starting location on the game surface 232 or terminal view 246, and associated moving rules, visual rules, impact rules, etc. Players typically move game objects 238 on the game surface 232 and to/from the terminal view 246. The movement of game object 246 is seamless. For example, as soon as a game object 238 is 'dragged' out of a terminal view 246, it appears on the game surface 232 on the game board 102, so that a player can continue to use the same game object 238 on the game surface 232.

Physical Components of an Example Gaming System

Figure 3:
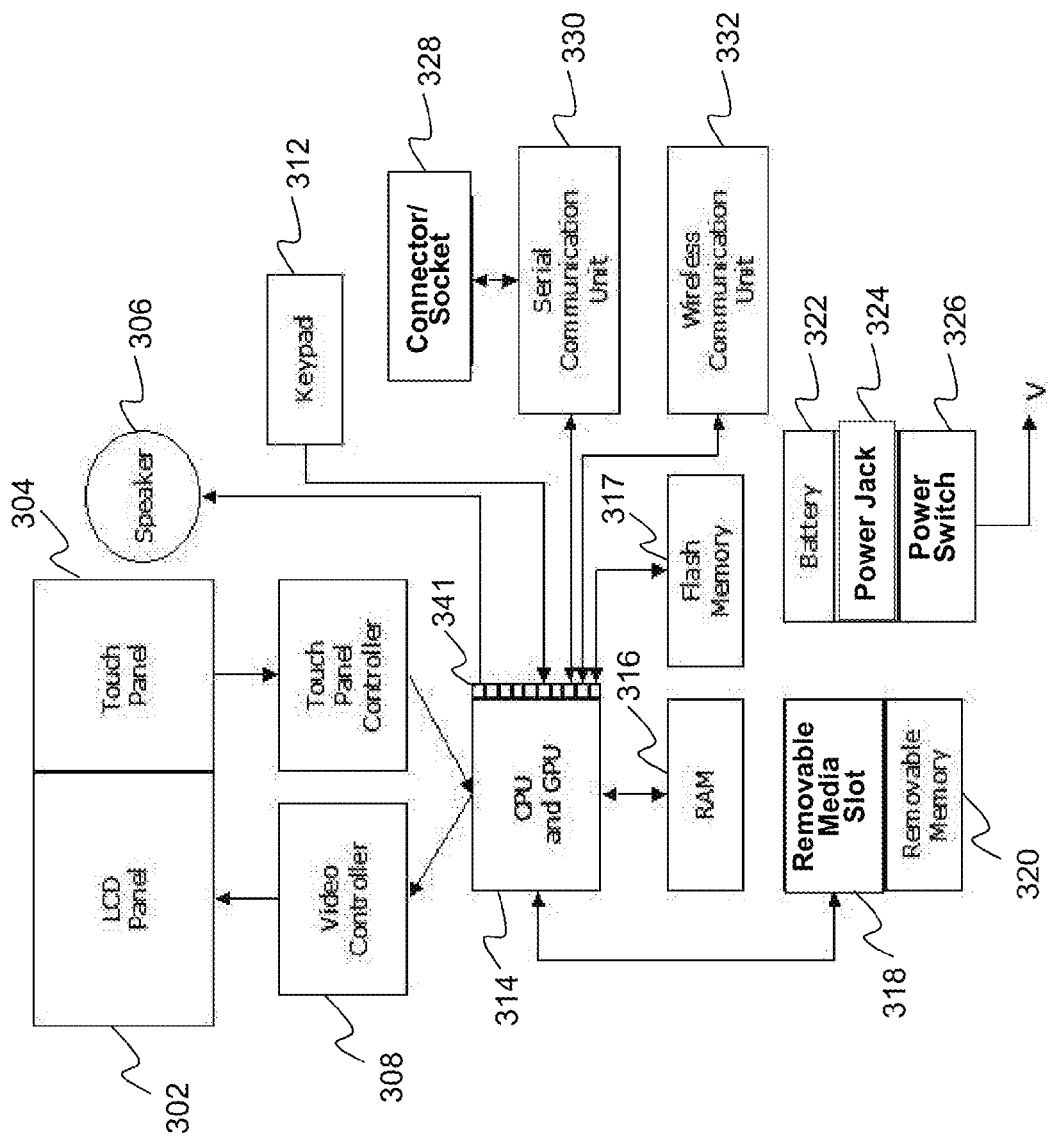
FIG. 3 illustrates a schematic diagram of some of the hardware components of a main game board, according to an embodiment of the present invention.

The gaming system according to one embodiment of the present invention comprises a main digital game board 102 and one or more game terminals 104. The game board 102 acts as the shared public playing surface of the board game. As shown in FIG. 3, game board 102 comprises a display screen 302 (e.g., TFT-LCD panel, Organic light emitting diode (OLED) display or electronic paper or any other type of flat-panel display) for displaying a game board layout, and different game objects and graphic elements. A touch panel 304 may cover all or most of the display screen 302's surface, providing input means to the players. Other components of the game board include a speaker 306, a keypad 312, a video controller unit 308, a touch panel controller 310, a central processing unit 314 (which may include a graphic processing unit GPU), random access memory (RAM) 316, flash memory 317, a removable media/memory insertion slot 318 (e.g., a SD card socket), removable memory 320, a battery pack 322, a power jack 324, a power switch 326, a wireless communication unit 332, a wired communication unit 330, one or more magnetic and/or mechanical connectors/sockets 328 (to couple one board unit with other similar units, and to connect game terminals 104), etc. Other optional/additional components not specifically shown in FIG. 3 may include a microphone (for voice recognition interface), a vibrator for associating haptic feedback with the touch panel 304, etc. Persons skilled in the art will recognize that not all of the above components are necessary in all embodiments, and there may be additional components in certain embodiments, but the scope of the invention is not limited by the cited example components.

The game board battery pack 322 may comprise non-rechargeable use-and-throw batteries or may be configured to be charged from an external power supply unit, which is connected to the electricity outlet via power jack 324.

Figure 3A:
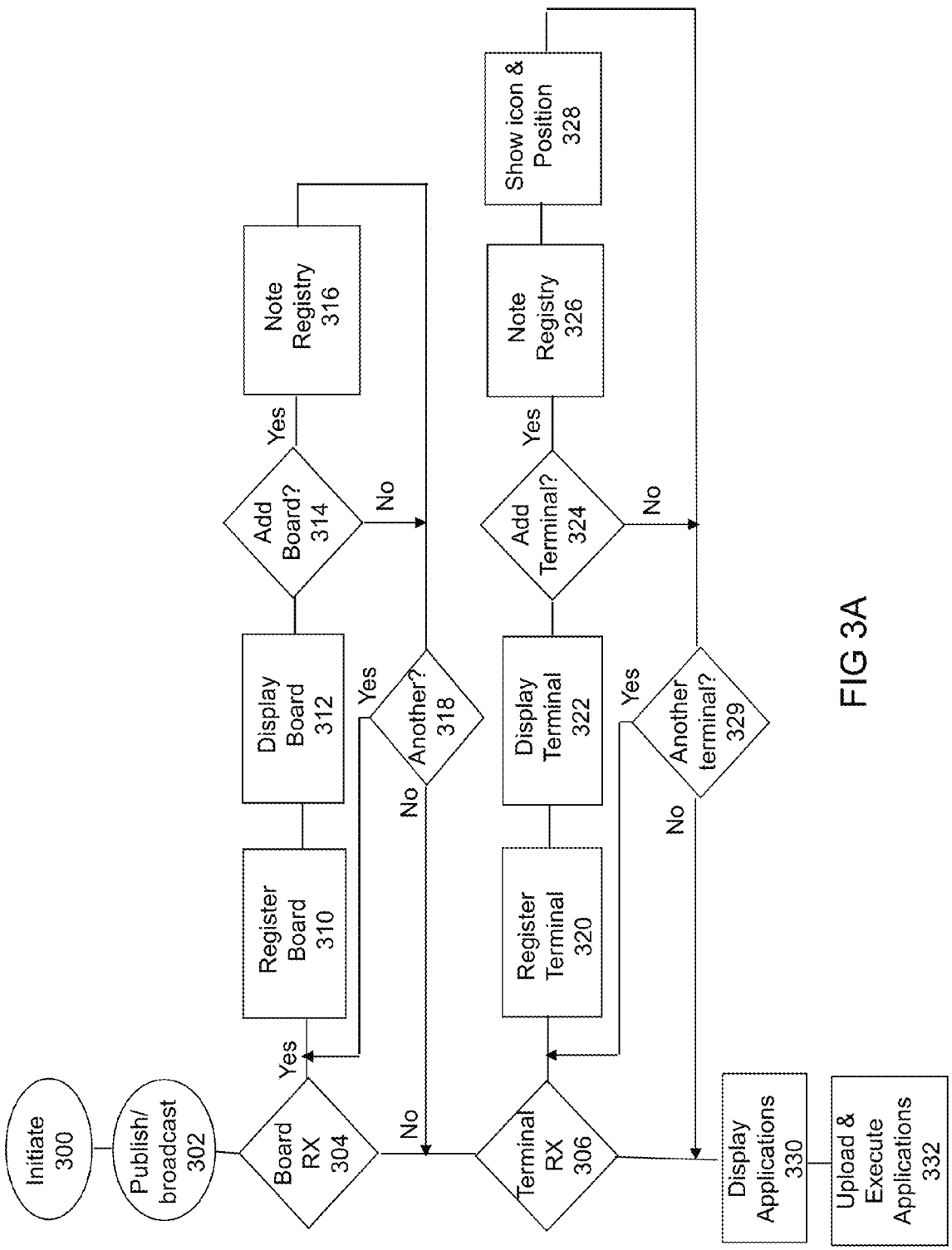
FIG. 3A illustrates an example of a process executed by the CPU.

The game application runs on the CPU 314 via the OS and augmentation layer, so as to make the CPU 314 execute various operations in conjunction with the other elements of the board. The communication may be made over a bus 341, such that the CPU can send or receive communication from connection sockets, wireless and wired units 328, 330 and 332, receive input from the keypad 312, and send sounds to the speaker 306, etc. FIG. 3A illustrates an example of a process executed by the CPU 314 for initiating a game session. The process initiates at Step 300 and at Step 302 the CPU publishes its existence by, for example, broadcasting a signal over the wireless unit 332. At Step 304 the board checks whether the wireless unit 332 received any communication from another board and, if so, it continues to sub-routine at Step 310 by registering the properties of the second board in its memory, e.g., RAM 316. At Step 312 the board displays the properties of the second board on the display 302 and query the user whether to add the second board to the session. If at Step 314 the user indicates to include the second board in the session, the CPU updates a registry at Step 316 to indicate that game applications can be displayed using both boards. At Step 318 the CPU checks to see whether another board is available to join and, if so, reverts to Step 310. Otherwise, it continues to Step 306, where it checks whether any terminals have transmitted a request to join the session. If so, it executes a subroutine starting at Step 320 where the CPU registers the terminal's properties in its memory, e.g., RAM 316. At Step 322 the board displays the properties of the terminal on the display 302 and query the user whether to add the terminal to the session. If at Step 324 the user indicates to include the terminal in the session, the CPU updates a registry at Step 326 to indicate that the terminal may participate in the session. At Step 328 the CPU displays an icon (e.g., digital game piece, avatar, etc.) corresponding to the terminal and shows its position on the board (as noted elsewhere, the position may be changed by the user, and this can be handled using an interrupt subroutine). At step 329 the CPU checks to see whether another terminal is available to join and, if so, reverts to Step 320. Otherwise, it continues to Step 330 and displays the game applications available. Once a user selects a game form the displayed application, the CPU uploads and executes the game application at Step 332.

Figure 4:
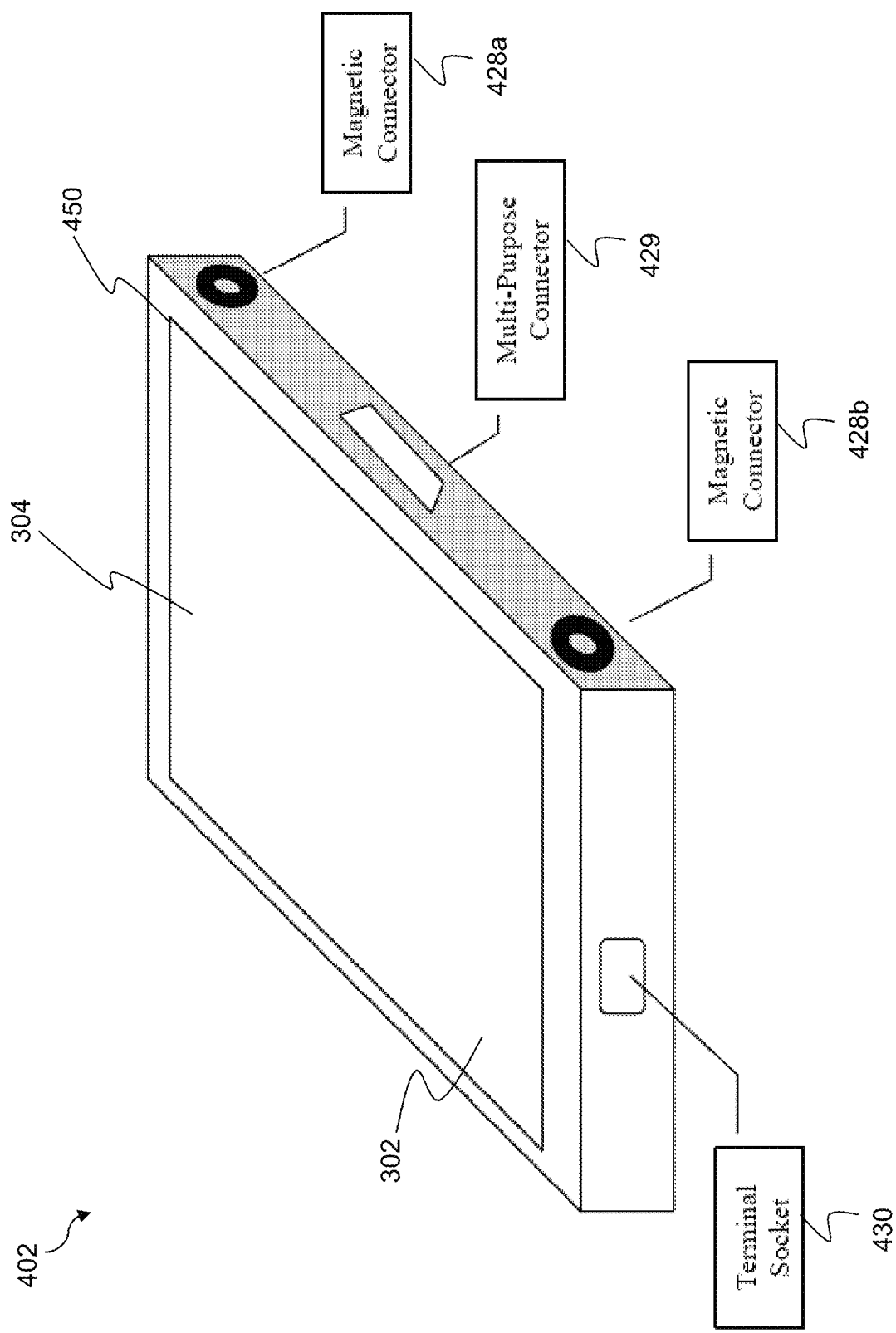
FIG. 4-5 illustrate various external looks of a game board display unit that can be removably coupled to other game board display units, according to embodiments of the present invention.
Figure 9:
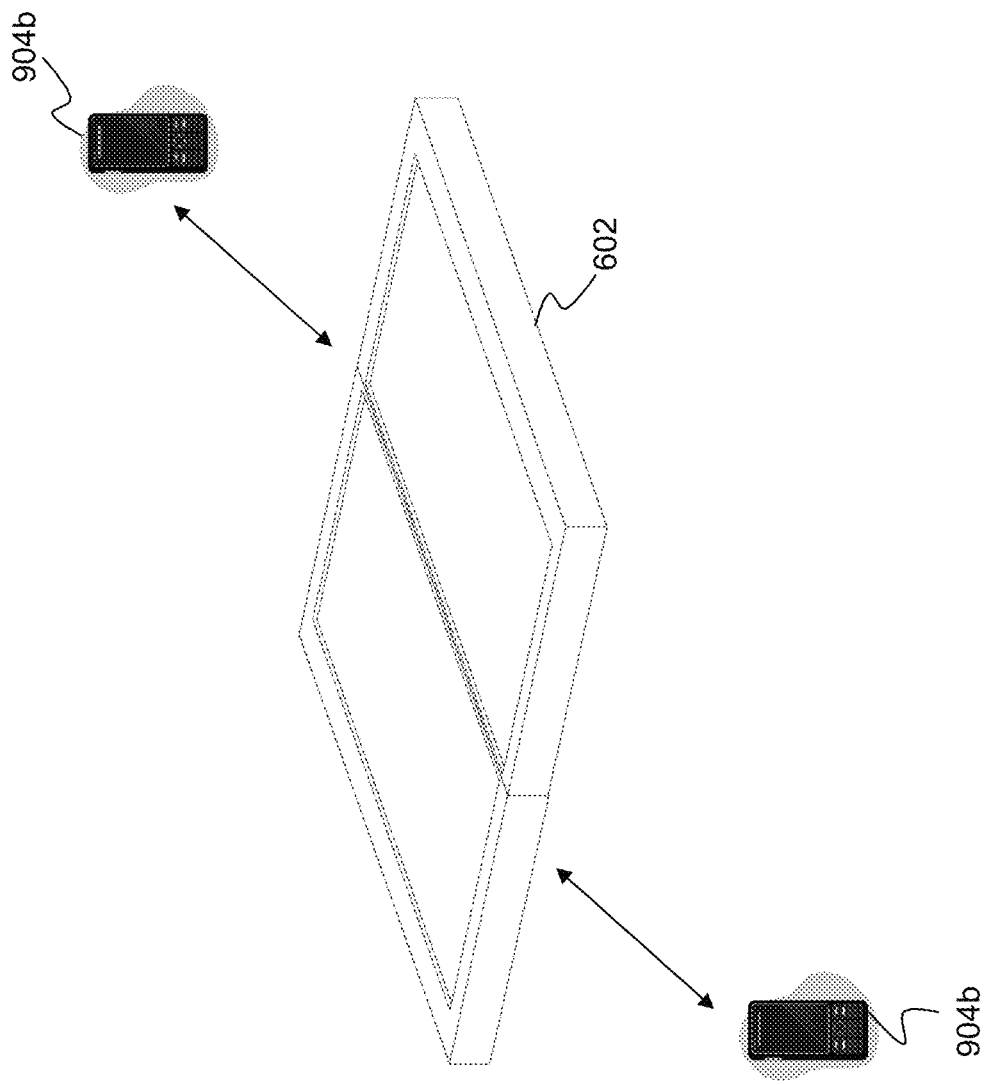
FIG. 9 illustrates an example gaming system where a main multi-unit game board communicates with a plurality of mobile devices, according to an embodiment of the present invention.

A single display unit 402 of game board 102, as seen externally, is shown in FIG. 4, showing a display screen 302 and a touch panel 304 encased in a housing 450. Housing 450 may be metallic or made of plastic or other materials. In this example embodiment, one or more sockets 430 located on the side(s) of the rectangular housing are used to connect the game board 102 to corresponding game terminals 104 (not shown) using specific cables. The connecting cables may feed power to the terminals 104 from the board 102's power supply, if the terminals don't have their own power source or for charging the terminal's batteries. The connecting cables may also serve as communication link for transferring game-related information between the game board 102 and the terminals 104. The cables may be connected to the board and the terminal using quick-release magnetic connectors or other type of fastening mechanisms. Alternatively, game terminals 104 (or other devices used as game terminals) may be wirelessly coupled to the game board 102, as shown in FIG. 9.

Additional game-board display units can be optionally attached to the display unit 402. The units 402 may be identical to each other, or may be an extension game board display unit which is driven by a main game board display unit, which serves as the 'master'. An extension game board display unit may only have a subset of hardware components, such as an LCD display screen, a touch panel, and a video controller. For attaching one game board display unit 402 with another, one or more magnetic connectors 428a-b are provided on at least one side of the housing 450. Other types of connectors may be used too. Magnetic connectors 428a-b are designed for firm attachment with another similar unit 402. A power connector may be embedded within the magnetic connectors 428a-b or is otherwise formed (e.g., embedded within a multi-purpose connector 429) to enable power-sharing between display units 402, or to enable feeding power from a master unit to an extension game board display unit.

The multi-purpose connector 429 is located for establishing communication (and/or power) link between two or more display units 402. Inter-unit communication includes sharing touch panel input, multi-screen display sharing information, seamless game object movement, routing of terminal communication received by an extension game board display unit to the master unit's CPU, clock synchronization signal etc.

Figure 5:
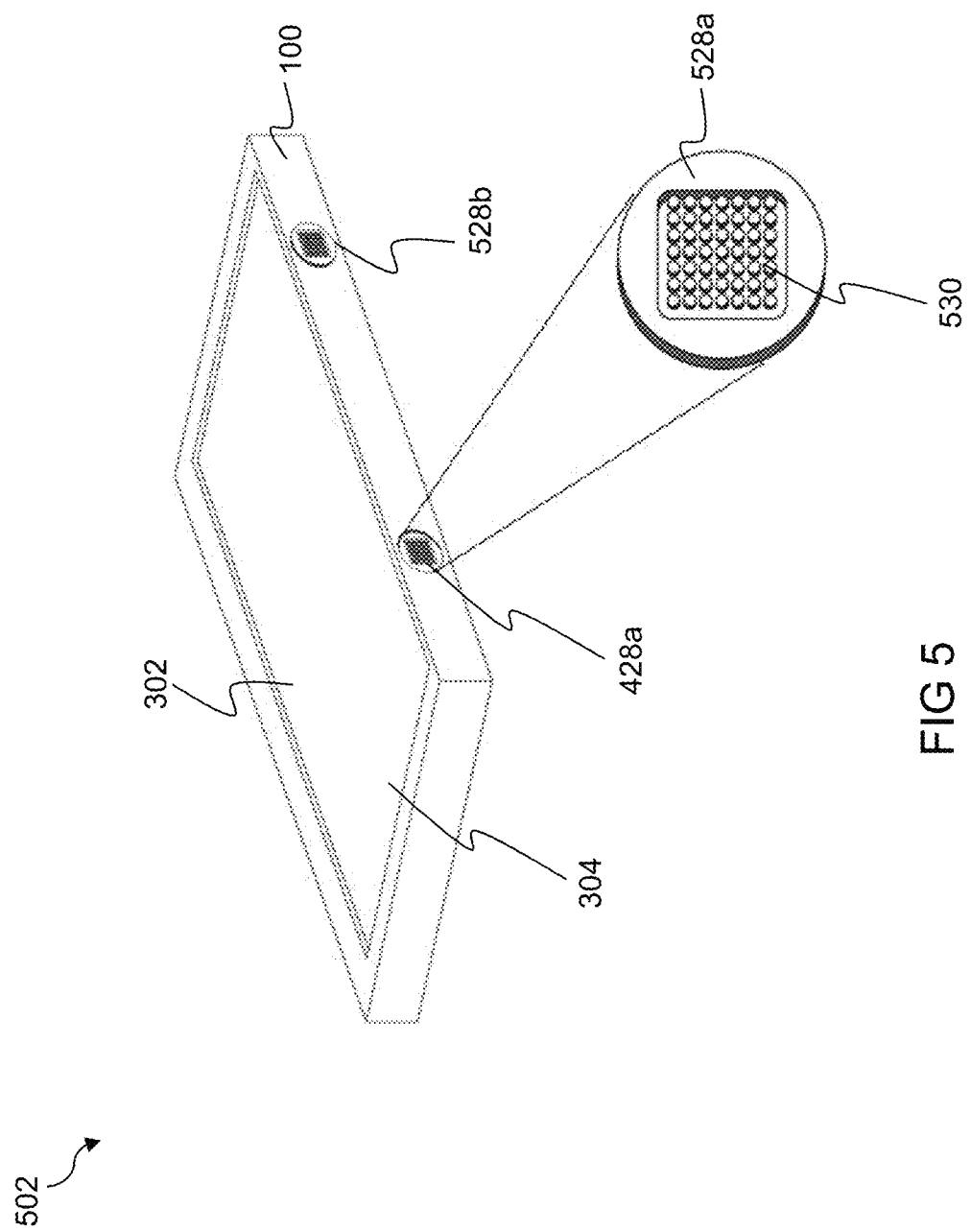

FIG. 5 shows an embodiment, where transfer of electronic signal between two game board display units 502 are carried out through a pin array 530 (magnified view shown in insert) embedded within the magnetic connectors 528*a-b*. Display unit 502 is very similar to display unit 402 with a few exceptions. The magnetic connectors 528*a-b* facilitate in establishing reliable contact between pin arrays 530 of two game board display units by securing proper alignment and firm attachment. In the embodiment shown in FIG. 5, multi-purpose connector 429 may be redundant. Also, display units 502 may have externally hidden wireless communication ports for communicating with game terminals.

FIG. 6A shows how two display units 502*a-b* are aligned side by side before attachment, and FIG. 6B shows how a unified dual-screen game board 602 is formed after the units 502*a-b* are combined.

FIG. 7A shows that players have the option to keep two display units 502*a* and 502*b* separate, each displaying the same game layout, symbolically indicated by the smiley faces. Another option is to spread the game layout between two screens, as shown in FIG. 7B. As the display units 502*a* and 502*b* are attached to each other, the system automatically spread the game layout among multiple screens.

Figure 7C:
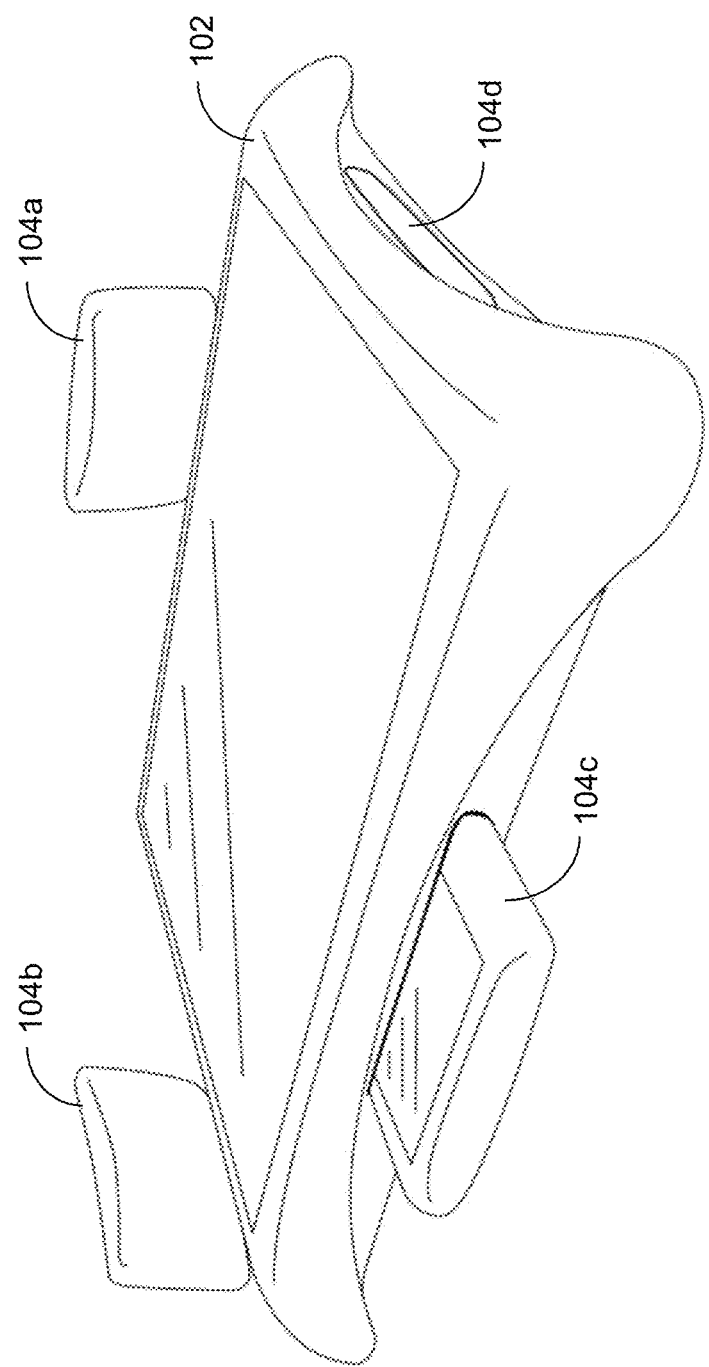
FIG. 7C illustrates an embodiment of the game wherein the main board includes facility to contain the terminals.

FIG. 7C illustrates an embodiment of the game wherein the main board 102 includes facility to contain the terminals 104*a*-104*d*. In FIG. 7C terminals 104*a* and 104*b* are illustrated fully deployed and positioned for playing. On the other hand, terminal 7*c* is illustrated partially deployed from the "docking" position in the main board, while terminal 104*d* is illustrated fully docked to the main board 102.

Figure 8:
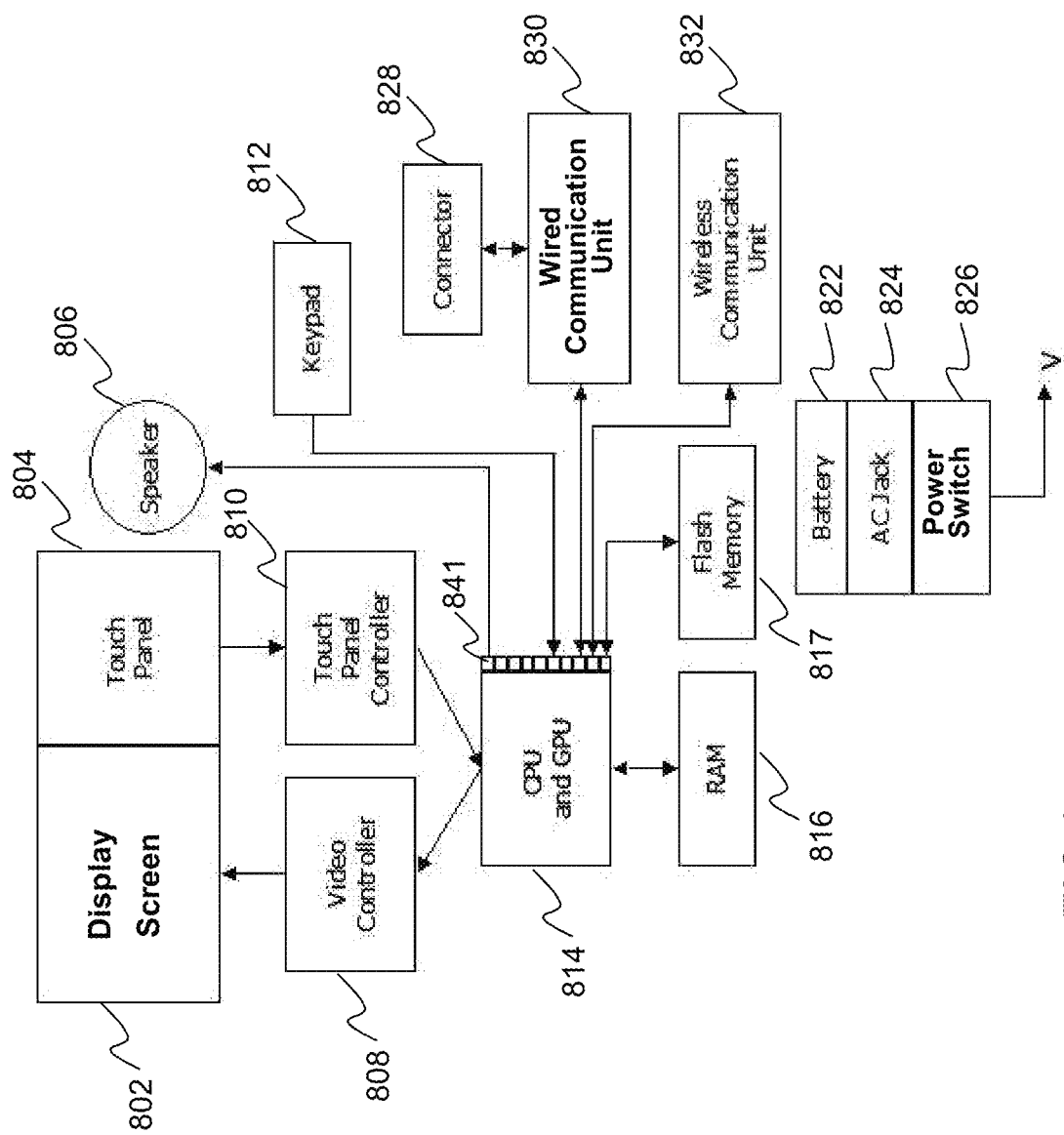
FIG. 8 illustrates a schematic diagram of some of the hardware components of a game terminal, according to an embodiment of the present invention.

The game terminal 104, shown in FIG. 8, may be a hand-held device, which acts as a player's personal playing zone with private personal information and/or public personal information in it. Game terminal 104 may comprise a display screen 802 (e.g., TFT-LCD panel, OLED display or electronic paper or any other type of flat-panel display) for displaying a terminal view layout, and different game objects and graphic elements. A touch panel 804 may cover all or most of the display screen 802's surface, providing input means to the players. Other components of the game terminal 104 include a keypad 812, a video controller unit 808, a touch panel controller 810, a central processing unit 814 (which may include a graphic processing unit GPU), random access memory (RAM) 816, flash memory 817, a battery pack 822, a power jack 824, a power switch 826, a wireless communication unit 832, a wired communication unit 830, one or more connectors/sockets 828 (to couple via cable to the game board 102), etc. Other optional/additional components not specifically shown in FIG. 8 may include a microphone (for voice recognition interface), a speaker, a vibrator for associating haptic feedback with the touch panel 804, an accelerometer to enable player input by movement detection, etc. Persons skilled in the art will recognize that not all of the above components are necessary in all embodiments, and there may be additional components in certain embodiments, but the scope of the invention is not limited by the cited example components. Terminal battery pack 822 may receive power from main board 102 through appropriate connectors/cables.

Figure 8A:
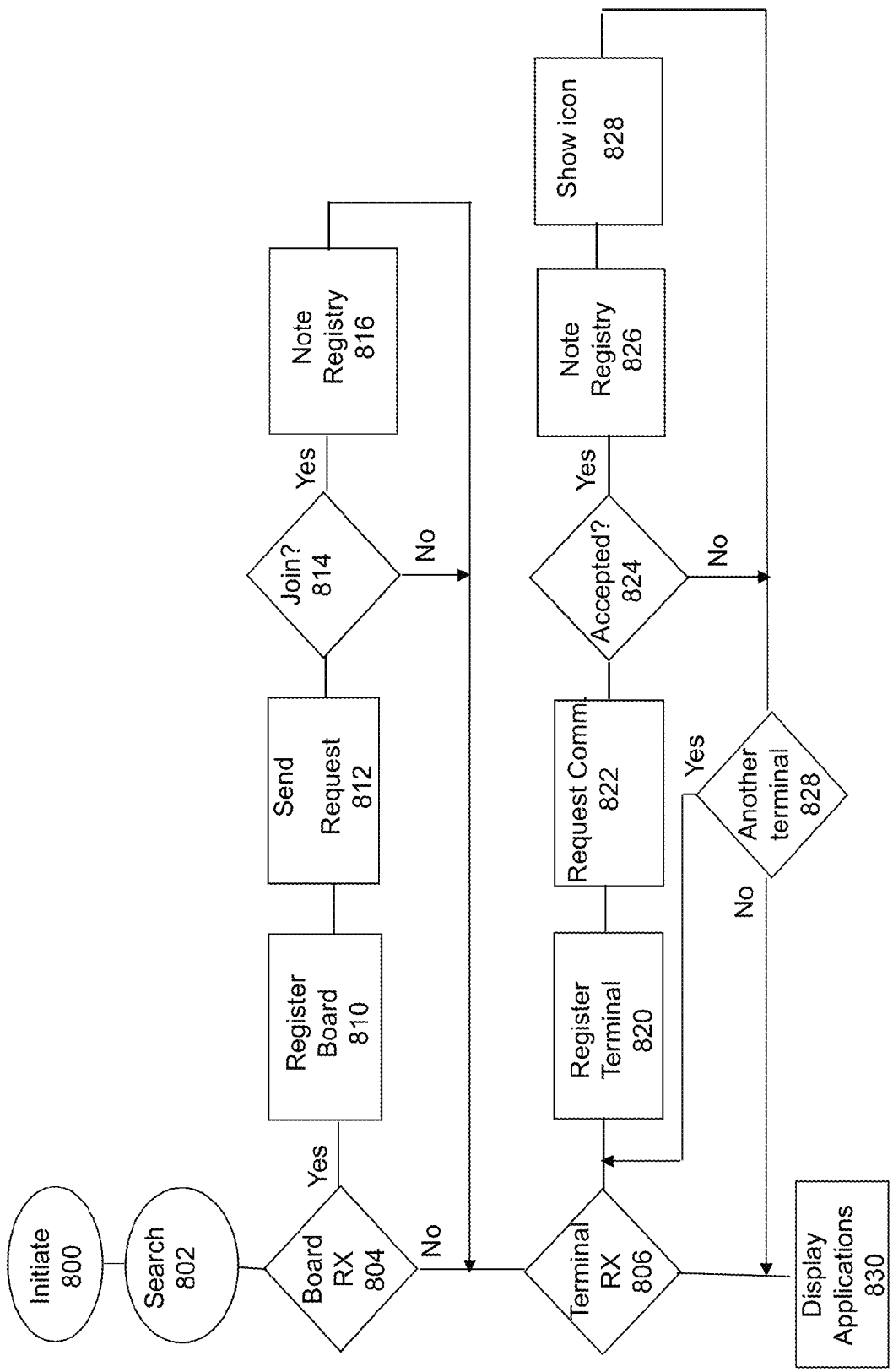
FIG. 8A illustrates an example of a process executed by the CPU for initiating a game session.

The game application runs on the CPU 814 via the OS and augmentation layer, so as to make the CPU 814 execute various operations in conjunction with the other elements of the terminal. The communication may be made over a bus 841, such that the CPU 814 can send or receive communication from connector 828, wireless and wired units 830 and 832, receive input from the keypad 812, and send sounds to the speaker 806, etc. FIG. 8A illustrates an example of a process executed by the CPU 814 for initiating a game session. The process initiates at Step 800 and at Step 802 the CPU searches for available boards by, for example, listening for a broadcasting signal received over the wireless unit 832. At Step 804 the terminal checks whether the wireless unit 832 received any communication from a board and, if so, it continues to sub-routine at Step 810 by registering the properties of the board in its memory, e.g., RAM 816. At Step 812 the terminal sends a request to the board to join the session. If at Step 814 the terminal receives a signal from the board that indicates that the terminal may join the session, the CPU 814 updates a registry at Step 816 to indicate that terminal has been accepted to participate in a session with that specific board. At Step 806, the terminal checks whether any other terminals are available to join the session. This information would generally be provided from the main board/console. If so, it executes a subroutine starting at Step 820 where the CPU registers the terminal's properties in its memory, e.g., RAM 816. At Step 822 the terminal sends a signal to the other terminal requesting to establish communication. This can be done by communicating via the main board. If at Step 824 the other terminal indicates that it accepts the invitation, the CPU updates a registry at Step 826 to indicate that the terminal may participate in the session. At Step 828 the CPU checks to see whether yet another terminal is available to join and, if so, reverts to Step 820. Otherwise, it continues to Step 830, wherein, if a user selects a game form the displayed application, the CPU 814 receives a signal from the board indicating the initial properties (available currency, cards, lives, turn in the game, etc.) of the terminal according to the game application.

Smart Mobile Device as Game Terminal

As discussed before, instead of a dedicated game terminal provided by the gaming system, smart mobile devices, such as, smart phones, smart media players, PDAs, etc. may be used as game terminals. FIG. 9 shows smart phones 904*a-b* interacting with a game board 602.

In case a smart mobile device is used as the terminal, an application software running on the mobile device will implement all the standard terminal protocols to communicate with the game board.

In addition, the application software running on the mobile device, upon registration, may report to the game board the device's physical properties (such as, screen size and resolution details) in order to allow the game board application software to tailor the relevant properties to the device' attributes.

Packaging of the System

The game board display units may be hingedly pre-attached to each other, and placed in an external casing device such as a folding plastic case to allow a convenient method of storing and deploying several units. For example, in a two-screen device, when the external casing is folded, the two units are vertically stacked against each other with the display screens facing each other.

Another packaging method is to include magnetic and/or mechanical contactors around the periphery of the display screen of each detached game board display unit, so that when two display units are stacked on top of each other, the corresponding display screens face each other and are held together by the contactors.

The game terminals may be placed on one of the game board display unit's back plane, and may be held securely by magnetic and/or mechanical contactors.

The scope of the invention is not limited by the packaging and storing method. However, in various embodiments of the present invention, game boards 102 and game terminals 104 are designed to facilitate easy storing and easy deployment.

Examples of Player Interaction

This section discusses various examples interaction methods used by the players, which the system interprets as appropriate commands. Most of these interactive methods are associated with finger gestures on a touch screen, but persons skilled in the art would understand that these illustrative examples are not limiting the scope of the invention.

Drag—When using a movable game object like a scrabble tile or chess piece, the player touches the piece and while touching it, moves the finger along the display area. The selected object will follow the finger as long as it touches the screen surface. Depending on the game specifics, the object will may stay (graphically) on the game surface (e.g., in a chess game), may be "lifted up" when moving around to avoid collision with other objects (e.g., in the Checkers game). In case multiple display units are involved, the moving game object may be moved from one display unit to the other by continuous "dragging" across the boards.

Spin—When using a spinning object like a roulette wheel or carousel, the player touches the object and while touching it, moves the finger in the spin direction and then lifts the finger up. The object will start spinning to the selected direction using the finger movement speed to determine the spinning speed.

Throw—When using a game piece that requires the player to throw it across the board, like a dice, the player touches the object, which will graphically "elevate". While touching the object, the player moves the finger in the throwing direction. The object will follow the finger moving velocity and direction, and the moment of release to determine the bouncing scheme. In case the object collides with other game objects, it will change its direction accordingly until it will come to a halt. If an accelerometer is incorporated into the handheld device, the user may simply shake the handheld device, e.g., to shake the dice, and then gesture as if to spill the dice out of the handheld device.

Object exchange between different modules—In order to move objects from the shared public zone to a personal public/private zone, and vice versa, one option is to graphically define a "gate" on the display area. Once the object is dragged into the players "gate", it will disappear and reappear onto another display screen. To move from the terminal to the board, the player will drag the object towards a physical boundary of the display screen, and once most of the object body will cross the border, it will disappear from the terminal and reappear at the player's "gate" on the main board. The gate may be located near the terminal's cable socket or location.

Page Flip—In case an game object resembling a page, a page flipping emulation can be done by touching the page corner and moving it to the opposite direction Collision—In case two objects are colliding, collision behavior may be emulated with visual, audio, or audio-visual effects.

Push—When a finger is moved gently touching a movable object, the object will be 'pushed' along with the finger movement.

Hit—Unlike the push gesture, in case the finger moves fast enough when touching a movable object, the impact will simulate a hit, where the object will bounce to the finger's movement direction.

Flip—In order to flip a card or tile, the finger will touch the object's center and while touching, will move fast toward one of the card edges and then will release the touch. The object will be flipped with animation effect.

Write—Using a stylus pen or finger on a predefined area, the player can write or draw, if required by the game.

Zoom out and in—Using finger pinching or expansion, a player may zoom out or in on certain portion of a game surface.

Rotate board—Special control on the board, on the user terminal, or gesture on the board layout enables to rotate the entire board and pieces to the user side. The same function may take place automatically when the user turn arrives as part of the game play.

Physical buttons or keypads, mouse, virtual keyboards, joysticks, trackballs, touch pads, etc. may be used instead of a touch screen to interact with graphical objects on a display screen.

Remote Displays Control System

Figure 10:
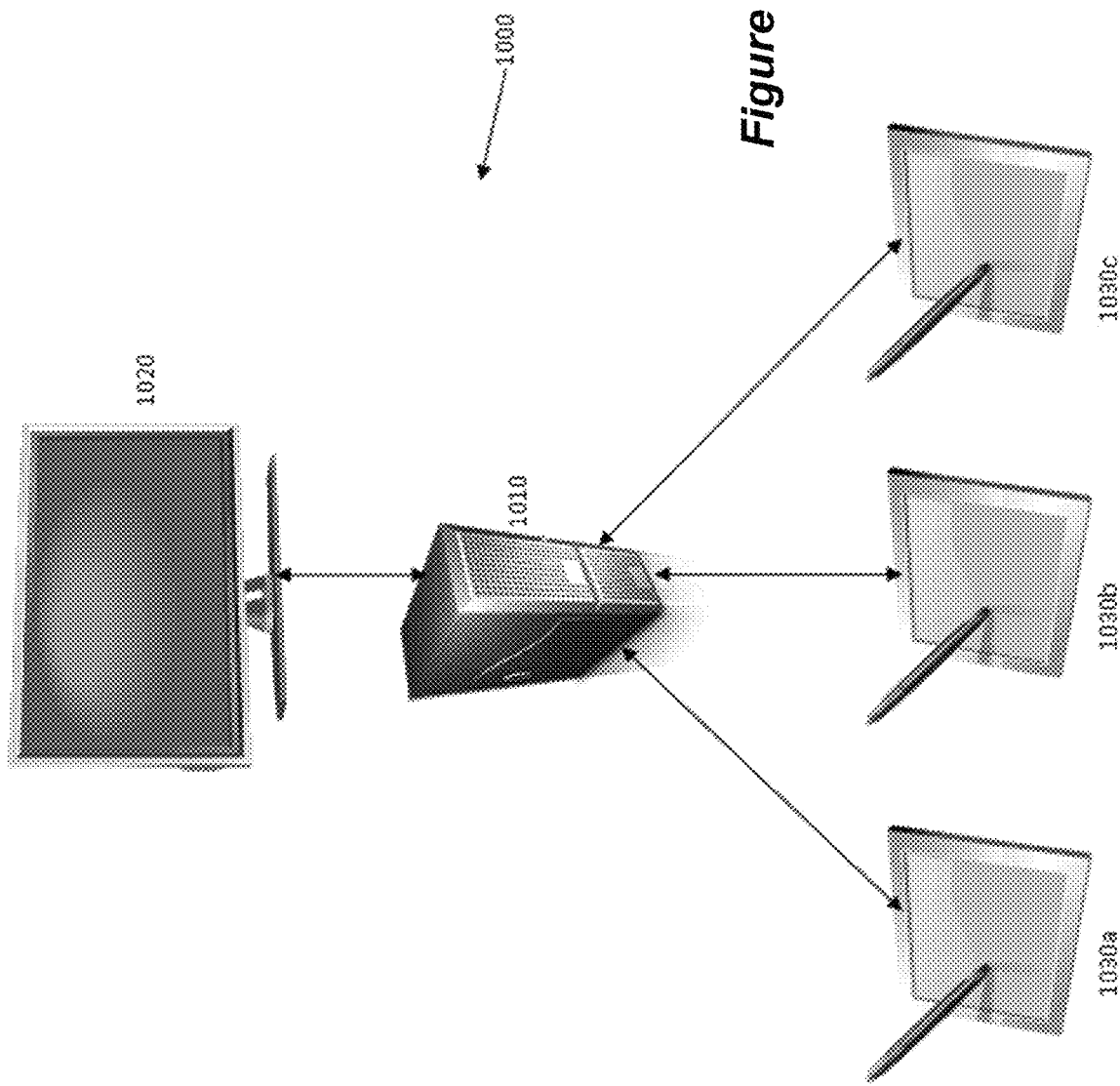
FIG. 10 illustrates components of an example game system with a main game board and multiple game terminals, according to an embodiment of the present invention.

FIG. 10 shows one example of a gaming system 1000, according to an embodiment of the present invention. This embodiment relates to systems and methods of using handheld devices with wireless communication and touch screen to fully control the scene on remote displays, such as televisions. This enables virtual multi-touch access to remote displays with built-in privacy, access control, and tracing.

Embodiments of the invention enable use of various systems for playing social board games, such as Scrabble or Monopoly, wherein shared boards are displayed on a main screen, e.g., TV screen, and players with personal game terminals (i.e., controllers), such as iPad, iPhone, and other mobile devices, to control the game pieces by navigating cloned views of the TV display on their handheld devices. For example, by zooming, dragging, and clicking on objects on the touch screen of the mobile devices, users may impact the same objects on the main board. The system identifies each user by its network ID, and therefore controls the access of users to objects on the screen, traces the actions of each user, enables simultaneous multiuser access to the board, and more, depending on the playing rules of each game.

In this embodiment, the system comprises a server 1010, at least one display 1020, and several personal game terminals, also referred to as "controllers"; here, four are shown, 1030a-c. Display 1020 and controllers 1030a-c require network connectivity (e.g., wired connectivity, WiFi, Bluetooth, etc.) to the server 1010. In one example, all of server 1010, display 1020, and controllers 1030a-c are tablets or pads, such as the Apple iPad, which are capable of running all of the individual functions of each of the devices. On the other hand, server 1010 may be a game console, a set-top box, a cloud service, etc.

Server 1010 can be deployed anywhere in the network at home or in the cloud so long as it is available for access to both display 1020 and controllers 1030a-c. Server 1010 has multiple functions. For example, server 1010 manages display 1020 and controllers 1030a-c and their function in the application being run. For example, both display 1020 and controllers 1030a-c can show the same Scrabble board. In another example, each of display 1020 and controllers 1030*a-c* may show a different part of the game, for example, a different island in the Settlers of Catan game. Server 1010 manages the list of controllers 1030*a-c* and associates a unique user ID with each controller 1030*a*, 1030*b* or 1030*c*. If the number of users is greater than the number of controllers 1030*a-c*, two or more users can share the same controller (e.g., controller 1030*a*), provided that an interface is applied to ensure that the private data of one user is not leaked to other users sharing the same controller.

Server 1010 accepts user inputs from controllers 1030*a-c* and routes them to the appropriate display (e.g., display 1020). Server 1010 further notifies all of the controllers 1030*a-c* of any display change. For example, if one user adds 2 tiles to the Scrabble board, it is displayed on display 1020 and on controllers 1030*a-c* before the next user needs to decide on his or her next move. Server 1010 knows to route personal data to the appropriate controller 1030*a*, 1030*b*, or 1030*c*, based on the unique user ID. Server 1010 manages the availability of display 1020 and controllers 1030*a-c* and notifies the application being run of any changes in availability. Server 1010 further communicates with the display 1020 and the controllers 1030*a-c* using pre-defined generic or proprietary protocol.

Display 1020 (or each of the displays, in the case or two or more main displays) is associated with a unique physical screen, e.g., a television or iPad. Display 1020 must be capable of running an application itself, or on a directly connected device (e.g., a game console, set-top box, or media center directly connected to a TV screen). Display 1020 may be, for example, a pad or tablet. Display 1020 has multiple functions. For example, display 1020 accepts display commands from server 1010 and updates the display accordingly.

In one embodiment, each of controllers 1030*a-c* are personal and represent the user that uses them. In one example, controllers 1030*a-c* are implemented on handheld devices (e.g., iPad, iPhone, iPod), and require a minimum size display (about 3.5") and touch controller. Controllers 1030*a-c* present visual clones of any shared display shown in display 1020 by, for example, having a tab for the shared display. Controllers 1030*a-c* accept user inputs on the shared display tab and notifies server 1010 accordingly. In one embodiment, controllers 1030*a-c* have a display screen smaller than that of display 1020; therefore, the cloned view shown on controllers 1030*a-c* is scaled down to show the entire view.

Controllers 1030*a-c* have multiple functions. Controllers 1030*a-c* support zooms in and out to any part of the view of an application, as well as select, drag, click, double click, and similar user inputs. Controllers 1030*a-c* support physical or virtual keyboard inputs, e.g., to type a user name into an application or game. Controllers 1030*a-c* transform local x and y coordinates to objects actions, e.g., double click on a card game deck. To increase efficiency, controllers 1030*a-c* handle generic and application specific rules locally before notifying server 1010. For example, in the case of drag and drop, controllers 1030*a-c* can exchange <Press>, <Move>, and <Release> actions with a <Move piece X from location A to location B> command. Controllers 1030*a-c* also support drag and drop by two clicks on the start and end of the drag operation. Otherwise, if the scene is very busy and requires zooming to specific areas, it is difficult to move objects between areas.

Controllers 1030*a-c* support objects collision detection before notifying the server. For example, controllers 1030*a-c* can avoid moving a black chess piece on top of another black chess piece, or moving a Monopoly piece on the jail zone. Controllers 1030*a-c* support the fit to grid function before notifying the server 1010. For example, controllers 1030*a-c* can automatically place a tile on its square by an approximation algorithm. Controllers 1030*a-c* handle turn indications and lock the user from any action if it's not his or her turn. Controllers 1030*a-c* handle logical objects properties, such as clickable and movable, and lock unauthorized commands accordingly.

Controllers 1030*a-c* can be used to handle user personal data or digital assets, for example, as an additional tab. User personal data may be private and not visible to other players (e.g., tiles in Scrabble, cards in a card game, private resources in strategy games) or public and visible to other players (e.g., cash in Monopoly, chips in poker). User personal data can include game play information (e.g., user color, turn indicator, user points), or on-demand resources (e.g., deck in poker can move between players). Controllers 1030*a-c* can transfer personal data objects back to the public area (e.g., "throwing" a card back to display 1020 and/or the shared display tab, buying a resource with personal cash). Server 1010 can reject the transfer and send the object back to the controller requesting the transfer. Controllers 1030*a-c* can be used to navigate information privately, such as accessing a dictionary during a word game, a calculator, or game rules. Controllers 1030*a-c* can support a private mode to simulate game actions privately, with or without server 1010 before notifying the opponents (e.g., to analyze the risks of a chess move). In one embodiment, two or more players can share the same controller (e.g., controller 1030*a*). In such a scenario, controller 1030*a* supports quick user context exchange that maintains the user privacy in case it is required, such as log-out by one player and log-in by another.

Display 1020 and/or controllers 1030*a-c* support all or part of the following commands from server 1010: display board background; rotate board; pre-defined grids to position objects by grid cells, e.g., C1 in chess; render object with specific image, color, and/or shape; position object at point either by absolute coordinates or 0,1 coordinates that are normalized in the screen level; position object by grid cell; position object relative to another object; position object on specific z-layer or on top of another object, e.g., user action tracing on top of other object, such as a mouse cursor; position object by pre-defined function, e.g., sort cards by their face value; apply object label; scale object; rotate object; highlight object; blink object; refresh view with a list of resources; update view with a list of changes; update specific object; remove object; view version to avoid redundant refresh; resource (e.g., images) version to support hot resource loading; move object from A to B with well-defined animation pattern; play/execute animated GIFs, video clips, voice on show; clip on show, roll dice; play voice on click; play video clip on click; flip on click (e.g., a flip card to expose value of card); scale on click (e.g., a card in a list of many cards); and show on click (e.g., a help dialog).

In addition, controllers 1030*a-c* support all or part of the following commands from server 1010: object display-id or object is personal; object is clickable, double-clickable, movable, and transferable to be handled locally; turn indication, to lock the user at out of turn period or otherwise; collision rules (e.g., black chess piece cannot move on another black chess piece); restricted board areas that objects cannot be moved to, to be handled locally; grids definition to implement fit-to-grid function locally, to ensure objects are centered in their grid position automatically (e.g., tile on a Scrabble board); simulation reply (i.e., reply back with new view to the controller only, which may include unique indications like what chess pieces can attack the user after the user moves); and undo (i.e., reject the last action).

Server 1010 supports all or part of the following commands from controllers 1030a-c: "mouse" click, double-click, press, drag, released without object assignment; object click, double-click, move from A to B; object move on grid from Cell1 to Cell2; user input text; rotate board, which can be implemented as button action or pre-defined support; transfer object to playing area (e.g., "throw" a card, use private tile in Scrabble, pay cash in Monopoly), although the command may be rejected by server 1010; and simulate click, move or transfer, replied back with the server 1010's private answer.

System 1000 may associate a unique visual indication for each user (e.g., a unique symbol or color), and use it to trace the user actions on display 1020. For example, server 1010 can trace that user A moved a piece, while user B clicked the deck. System 1000 can support multiple selections and bulk actions, for example, selecting multiple poker chips and dragging them to another zone. All actions, including drag and drop, multiple selections, etc., can be done simultaneously by multiple users, and yet maintain the access control and traceability behavior of the system. System 1000 can support full play back of the application from start to end, including which users performed what actions. The unique identification of remote users enables access control functions similar to a secured operating system.

Access control functions can be implemented according to one or more of the following examples. Access control can be implemented by turn, e.g., the user can access display 1020 and/or the shared display tab only on his or her turn. Access control can be implemented by object level or grouping, e.g., the user can move the white chess pieces, but not the black chess pieces. Access control can exclude access from specific players, e.g., confirmation of user action can be done only by other users. System 1000 can support a super user with extra control, e.g., a banker in poker. System 1000 can also assign any of these access control rules to groups as opposed to individuals.

Virtual Game Box and Social Games Hotspots

Virtual game box are collections of digital games that users own and share with others. This allows users to play games virtually anywhere, with or without Internet availability, and share them with others that play on other devices. When sharing games with others, the use's device may assume the role of a social games hotspot. That is, similar to the idea of a WiFi Hotspot, wherein users are gaining access to the Internet, a Social Game Hotspot enables users access to games that may be stored on someone else's device and/or may be a part of someone elses virtual game box.

Generally, when purchasing copyrighted material from download services, such as, e.g., iTunes, Amazon, etc., the downloaded product resides in a single device, or available on limited number of devices by the purchasing user login in to the cloud service of the seller. However, the user cannot provide other users access to the purchased product. To provide a concrete example, if one user purchases and downloads a game onto his/her own iPad, the user cannot transfer to or share that game with someone else's iPad. This can present problems when attempting to implement certain social games.

In the context of the following description, the term "social" refers to the "real" social activity, as opposed to virtual social, such as Facebook, etc. In fact, one important benefit of the described embodiments is that they actually bring people together physically, i.e., in the real world, so that the participants are encouraged to play together and interact socially in the same room or in physical close proximity. In that sense, "social games" refer to games that encourage players to assemble in the same room to play the game, rather than remotely over the Internet. Of course, as can be seen from the description, these games can also be played over the Internet, if the users so wish.

Consider one or more friends visiting a user's house. The user has certain social games that he/she purchased and downloaded onto his/her device, e.g., iPad, iPhone, Android Tablet, etc., They would all like to play one or more of these games but, while they have their own devices, they have not purchased these games. According to embodiments disclosed herein, the user's device authorizes the visitors' devices to play the game, whether or not any of them is connected to the Internet. However, once the visitors leave, the authorization expires and the games and digital assets are no longer available on the visitors' devices. Such an arrangement enables the users to play the games and interact socially, it maintains the copyrights of the game's author, and it provides users with the ability to enjoy a new game, thereby making them potential new buyers. In fact, after the authorization expires, a message can be left on the visitors' device with instructions and information as to how to purchase the game, potentially providing a time-limited coupon, etc.

The Virtual Game Box has several embodiments and features. One feature is the ability to play anywhere. Similar to other cloud services, the user's rights to games that the user has purchased are stored in a cloud service. The user's rights to the games are also stored locally on any device that he/she uses to run the games. In addition, the game state is stored locally and for backup on the cloud service. Optionally, the user can replicate the game state on any available device, e.g., by logging in to the cloud service, thereby synching the device with the states stored in the cloud. Using this feature, the user can login from any device, and play/continue his games from the last stored state. If the cloud service is not available, the device continues from the last saved state in that particular device, stores the changes locally, and updates the cloud service when it is available again. The game logic can run transparently either on the cloud or on any device that is used to start the games.

Another feature is the ability to participate in a multi-player game, wherein each player plays on his own device and only one of the players has purchased the game. According to disclosed embodiments, players' devices can discover the social game hotspot, either locally or through directory services, and may join the game without owning the games or downloading them in advance. In one example, the device of the user who owns the game or the Virtual Game Box can function as the Social Game Hotspot. According to disclosed embodiments, each users' device runs a client that will download from a virtual server the client implementation of the game, including all the necessary game assets. The virtual server can be the device of a user who purchased the game and has installed in on his/her device already, and is now functioning as the Social Game Hotspot.

Once another user's device discovers the authorized device having the game installed, that authorized device serves as the virtual server for providing the authorization and required game assets (currency, weapons, lives, etc.). Alternately, the virtual server may be provided by a cloud service. However, as explained above, once the other devices stop communication with the device running the game, the authorization expires and these users will not be able to play the game later without the hosting service. The available games directory can be provided by the Virtual Game Box itself or fetched from the cloud service. The game assets may be provided either by a cloud service or directly from the Virtual Game Box. If connecting remotely, through a Virtual Game Box directory service, a relay service will enable creating a tunneling connection from any location to the Virtual Game Box hosting device.

A user having a device installed with purchased games can invite others to his/her Virtual Game Box. According to this embodiment, the user device sends other users a link to install a generic Game Box player or a client. The link includes details about calling Game Box, that can be stored as cookies in any device that click the links. In this way, after installing the generic Game Box player, the other users can be redirected automatically to join a game on the calling Game Box. The authorization and game assets can be transferred directly from the calling Game Box or from the cloud.

A Remote Connection System can be employed to enable remote clients to join locally played game through relay services (e.g., ISP). Generally, when Virtual Game Boxes run, they register themselves in a cloud service. Remote clients can search for active Virtual Game Boxes and join a game play through cloud relay services.

Referring back to FIG. 1A, assume that main board 102 is a tablet device, such as an iPad®, Microsoft Surface®, Samsung Galaxy®, etc., and each of terminals 104a-104d is a mobile device, such as iPhone®, Android® phone, or other tablet devices. Assume that devices 104a-104d are devices of users who are visiting the user owning device 102. Each of these devices may have one or both apps: a Game App or a Player App. A Game App can run any of the games authored to be run on the Game App and serves as the brain running the game, keeping scores, and maintaining the game state. The Game App may generally be part of the Virtual Game Box. The Player App is a client that can interact with the Game App to advance the game that is being played on the Game App. In most situations, one device, e.g., device 102 would run the Game App, while the other devices would run the Player App.

When a Player App is activated on a device, it searches for any other devices in its vicinity that are running either Game App or Player App, and then displays to the user all discovered devices and games running on the devices (see the broken-line callout). The user can select to join a game, in which case an icon corresponding to his/her device will appear on the screen of the device running the Game App (as exemplified in FIG. 1B). Independently, each user is able to purchase a Game Box with a set of basic games that they can expand later, or by purchasing individual games and collecting them to the Game Box. The games will be installed first on a single device, and registered with a cloud service. Thereafter, when installing a Game Box on any device, the Game Box will find in the device registry or through the cloud service the available games on the device, and will add them to the Game Box game directory. After that, any Game that was originally a single device game, will be available from any device that the user is signed in to, and may host a game play of multiple devices.

For example, in FIG. 1A device 102 may belong to Joe, and have a Game Box installed therein and running a poker game. Thus, when device 104a runs a Player App, it finds device 102 and displays it as Joe's iPad with an icon showing that it runs a poker game. The user of device 104a may select to join this game, in which case his/her device would join the game and receive game assets (in this case, cards) so that it can play the poker game run by device 102. In this situation, device 102a would only show the secret hand of the user, while device 102 will show the open parts of the game, e.g., the cards deck, the money or chips of each player, the pot, etc.

So long as device 104a has network access to device 102, device 102 service device 104a and allows device 104a to participate in the game. However, once device 104a cannot connect to device 102, all of the assets of the game will no longer be available on device 104a and, unless the user of device 104a purchases and downloads the game, he/she would not be able to play the game.

Figure 11:
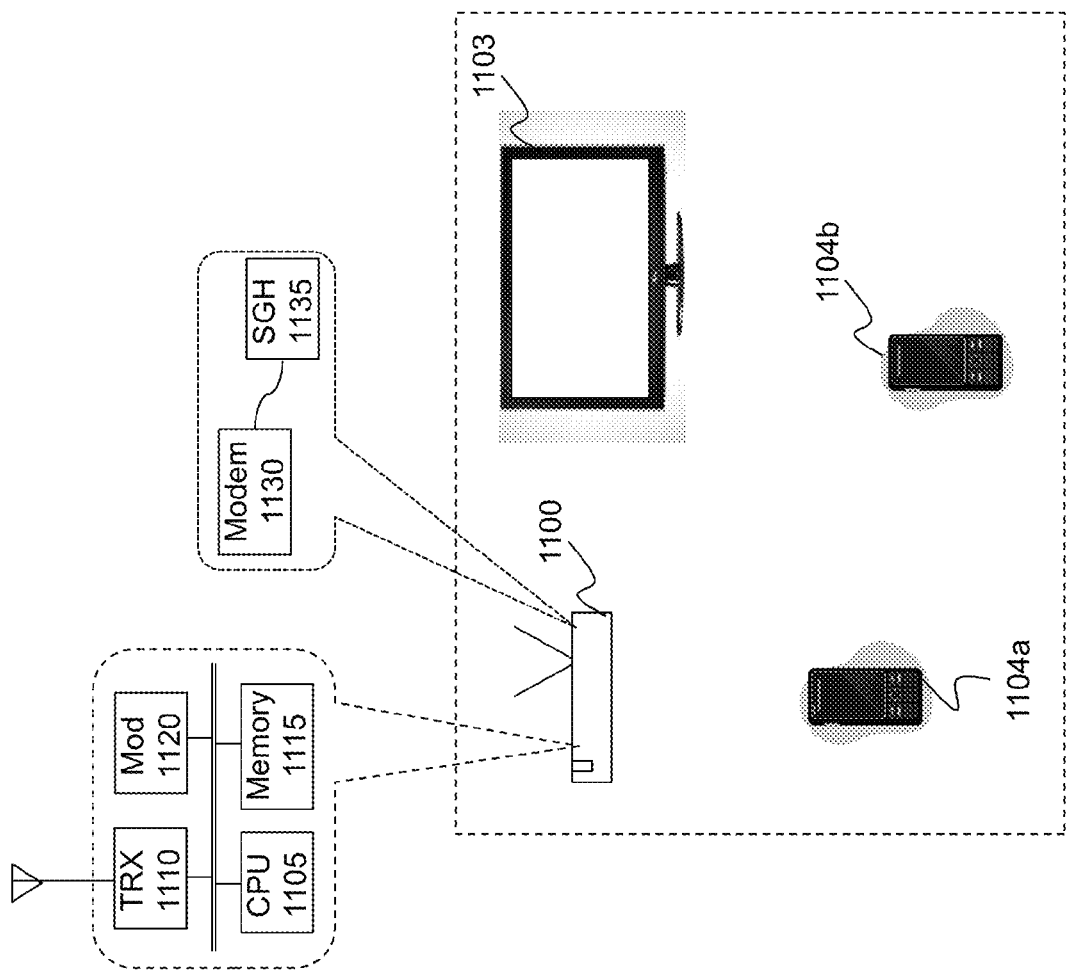
FIGS. 11 and 11A illustrate other embodiments of the Social Games Hotspot.

FIG. 11 illustrates another embodiment of the Social Game Hotspot. Consider a public place, say a coffee house, providing a WiFi connectivity as a service to the patrons. The WiFi service is enabled by a WiFi modem 1100, which also runs the Game App. To be sure, FIG. 11 and the following description refers to the modem 1100 as incorporating the Social Game Hotspot integrally; however, it should be appreciated that the Social Game Hotspot may be implemented in a separate device and connected to the modem 1100 via, e.g., USB, Firewire, Bluetooth, etc., as illustrated by the dotted-line callout. For simplicity, the description proceeds with respect to an integrated device, but the same would apply to a two-part device.

When patrons using their own mobile devices 1104a and 1104b run the Player App, each can discover the Game App of the modem 1100, and each can play any games that are run by the modem 1100. In this case, modem 1100 provide the authorization to play the game and also provides any necessary game assets to the devices 1104a and 1104b. Additionally, modem 1100 or any of devices 1104a and 1104b can instruct modem 1100 to display the common part of the game on a screen 1103. As can be appreciated, users of devices 1104a and 1104b need not even know each other—they are connected by discovering the modem 1100 and each other via the Player App. As before, once a user leaves the vicinity and is no longer connected to modem 1100, the device can no longer run the game. Alternatively, the authorization simply expires after a pre-designated time period.

As can be understood, this concept can be expanded to other digital assets. For example, the modem 1100 may also have digital assets such as music files, video files, etc. When a device connects to modem 1100, the modem 1100 may allow the device to receive and use, i.e., play, the digital assets. However, once the device is disconnected, all the downloaded digital assets are expunged and no longer available to the user. Alternatively, the assets simply expire after a pre-designated time period.

On the other hand, the system may enable a user to purchase any of the above described digital assets, i.e., games, game assets, music files, video files, etc. When the modem 1100 receive an acknowledgement that a purchase as been completed, the assets provided to the connected device are made permanent and do not expunge, regardless of whether the device is connected to the modem 1100.

Incidentally, as shown in the broken-line callout of FIG. 11, modem 1100 is constructed of a standard elements forming a modem, such as a CPU 1105, a transceiver 1110, storage facility 1115, and a modulator 1120, all interconnected via, e.g., a bus.

Figure 12:
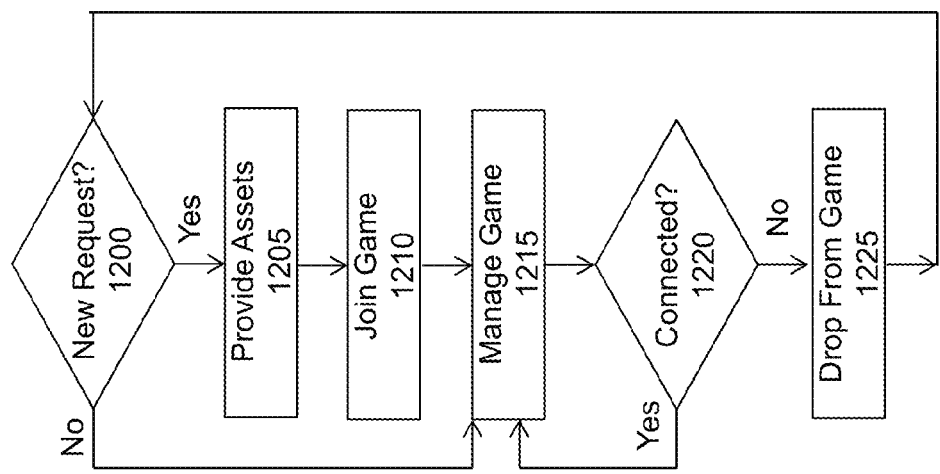
FIGS. 12 and 12A are flow charts providing examples for a processes that can be executed by the Social Games Hotspot.

FIG. 12 is a flow chart providing an example for a process that can be executed by a Social Games Hotspot (SGH), such as modem 1100. The SGH always publishes its properties and active game. When a new request to join a game is received at step 1200, the process may proceed to step 1205, wherein digital assets are sent to the requesting device. At step 1210 the process adds the requesting device to the game by, among others, adding an icon corresponding to the joint device, managing communication between the game, the game participants, and the joint device, including the joint device in any timing synchronization of the game, i.e., setting turns, managing exchange of digital assets between the game, the game participants, and the joint device (e.g., to account for bets, wins and losses), etc. Step 1215 is included to indicate that the process continuously manages the game, if a game is played. This includes setting turns, managing assets, declaring wins and losses, etc. At step 1220 it is checked whether the device is still connected and, if so, the process continues to manage the game and publish its properties. However, if at step 1220 the device is disconnected, the device is dropped from the game, and the digital assets are made unavailable to a user of the device. In this respect, it should be appreciated that the making the assets unavailable to the user may be done in various manners. For example, the assets can be expunged, i.e., deleted from the device. On the other hand, the assets may be maintained and stored on the device, but require a key to be active and available to the user. The key can be supplied by the Social Game Hotspot, such that so long as the device is connected to the Social Game Hotspot, the key is provided to make the assets available to the user. However, once the device is disconnected, the key is not provided and the user cannot access the assets. Conversely, if the user purchases the assets, a permanent key is provided to the device, such that the assets are available permanently. Another option is to provide a key that is valid so long as the player app can talk to the server. If the player app doesn't receive response from server, the key or license expires and the user can no longer use the game or the assets.

Figure 11A:
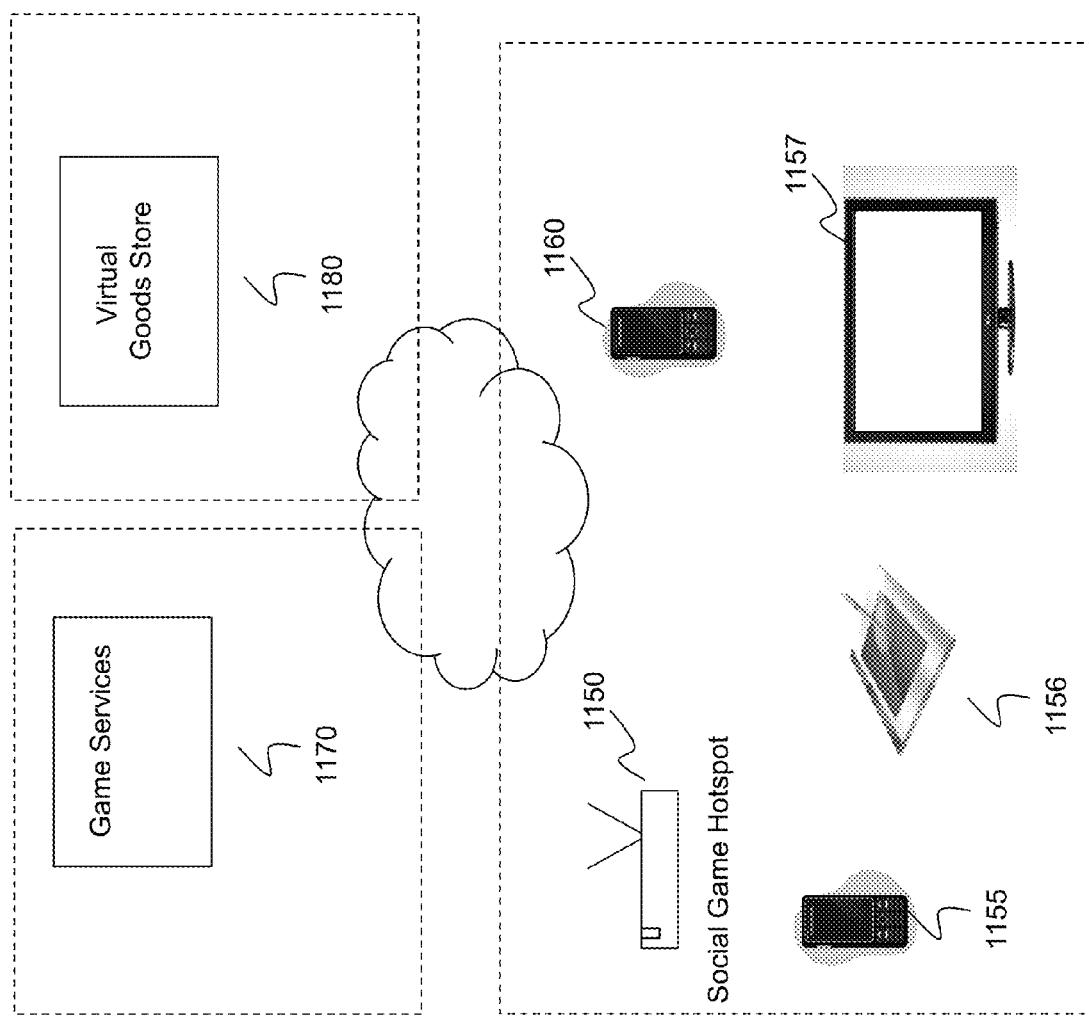

FIG. 11A illustrates another embodiment of the Social Games Hotspot (SGH). Unit 1150 represents the SGH hardware and software. Unit 1150 can be a proprietary hardware, standard router with SGH software component, standard mobile device with/without network hotspot service and SGH software component, or any other electronic device with multi task OS that can run the SGH software component. Units 1155, 1156, and 1157 represents mobile phone, tablet, and TV that can discover and connect to the games on the SGH in the local network. The above units are portable and do not have to be connected to the internet. Once the SGH unit is connected to the internet, it can download more games, save its state on the cloud to be used on other SGH, synchronize real money transactions and more. Unit 1160 represents a mobile device that purchased virtual goods to be used in the game.

Figure 12A:
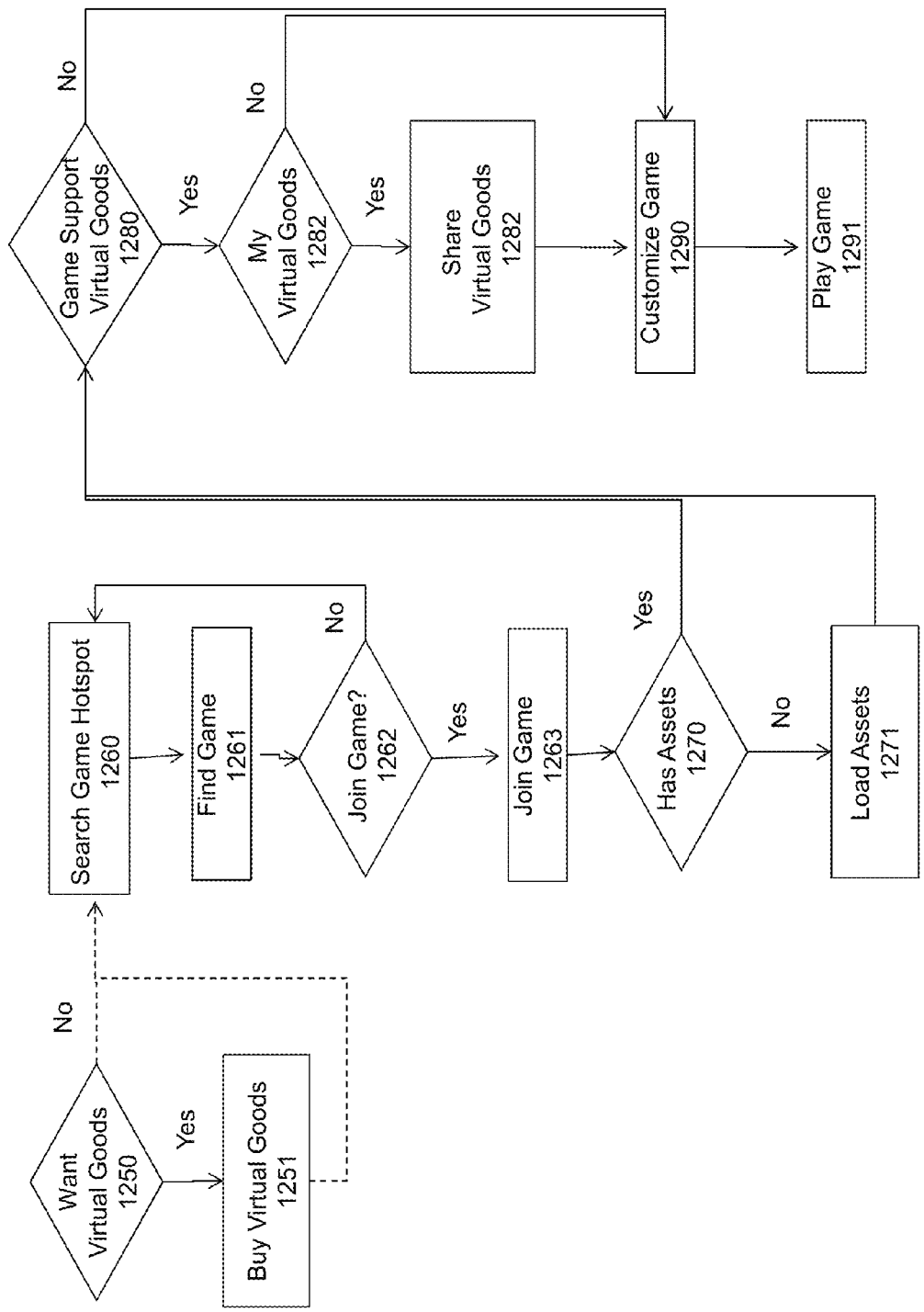

FIG. 12A is a flow chart providing another example for a process that can be executed by a Social Games Hotspot. As described, Unit 1160 owner may want to purchase virtual goods like Victory tune (see "Wintone" explanation) and purchase it in Step 1251. In different time, Unit 1160 owner may want to play a game and share his Wintone. In Step 1260, Unit 1160 search for SGH. One method to implement the search is by listening to SGH broadcast messages that the SGH publish, which includes the SGH version, package name, active game, number of connected devices, minimum required capabilities to join a game, dynamic network properties to join, and more. In Step 1261 Unit 1160 discovers the SGH and presents the active game to the user. If the User decides to join in Step 1262, Unit 1160 Joins the game in Step 1263, and checks whether it has the game assets in Step 1270. One method to implement the check is by asset package version. If required, Unit 1160 load the assets directly from the SGH or indirectly from Game Services layer 1170 in the Cloud. In Step 1280 Unit 1160 checks if the active game supports virtual goods, and in Step 1282 it compares the supported goods with its pre purchased elements. If the game supports one of its pre purchased goods, Unit 1160 send its specs to the SGH, that shares it with all other connected devices. E.g. Unit 1160 will send its unique victory sound file to the SGH, that will share it with all connected devices. The SGH or the other connected units will play the tune if Unit 1160 owner will win the game or a game round. Another example may be special dice that Unit 1160 owner purchased and everybody in the game will enjoy while playing with him/her. The dice example requires special customization in step 1290 to use the unique dice and not the standard game dice. In the above example, the special Wintone and dice that were pre purchased by Unit 1160 owner are the owner properties. Therefore he/she can login from any device to the virtual good store, download the assets, and validate their proprietary rights. If the store is not available, users can prove their rights by local authentication and cached certificate on the device. On the other hand, other participants in the game can use the special goods only while connected to the owners device and playing with them. Once Unit 1160 owner quit the game, its Wintone, special dice, and any other proprietary goods are removed and no longer available to other participants.

Figure 13:
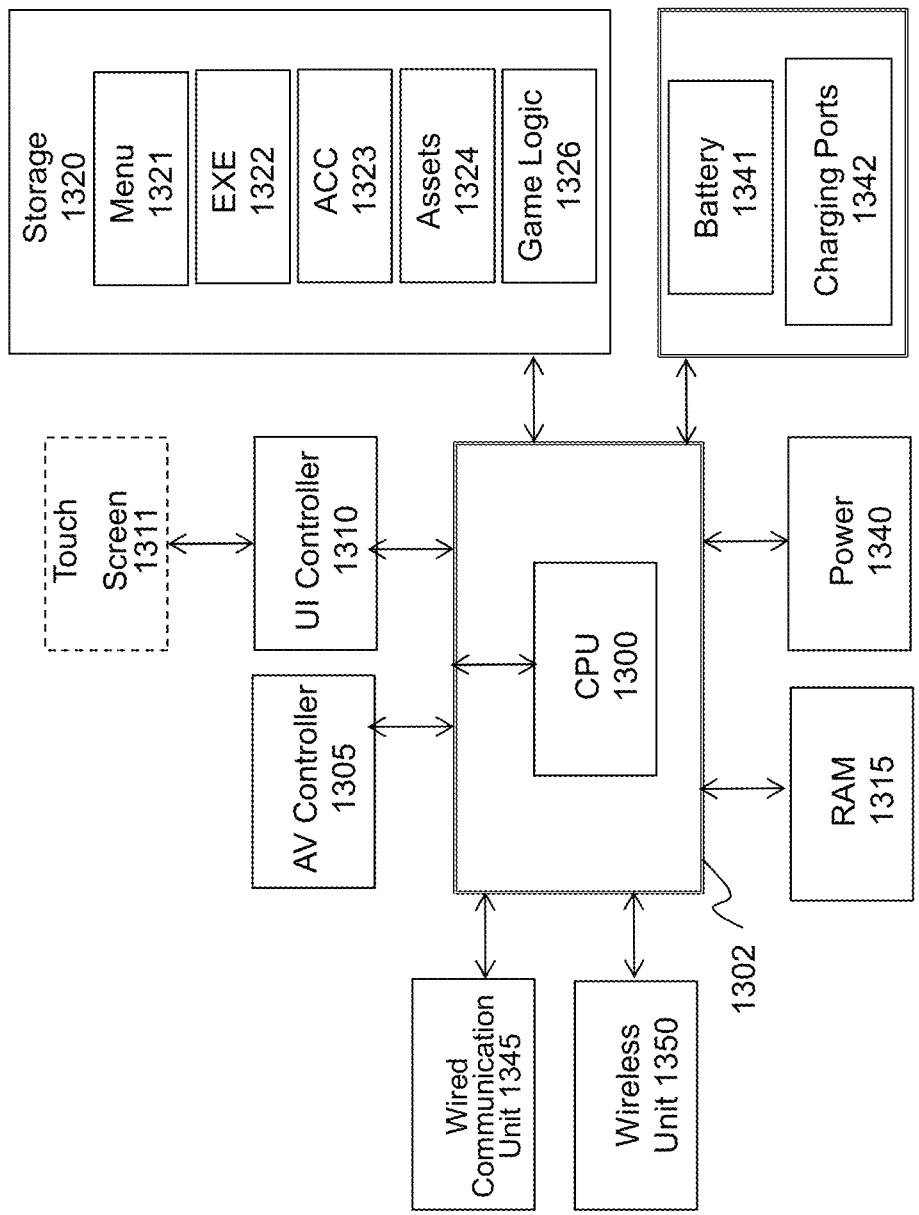
FIG. 13 illustrates an example of a stand-alone SGH unit according to one embodiment.

FIG. 13 illustrates an example of a stand-alone SGH unit, which can be connected by wire or wirelessly to a modem or to another device, such as a PC, a Tablet, a Smartphone, etc. A central processor communicates with other system elements via bus 1301. Power to the system is provided by power supplier 1340 or internal chargeable battery 1341. The Unit may support multiple charging ports 1342, e.g. USB, to charge mobile devices in the game. An audio/video controller 1305 controls audio and video output, if speakers and monitor are attached to the unit. A user interface controller 1310 controls interactions with the user and may be coupled to an input device, such as touch panel 1311. The unit communicates with other device via a wired connection 1345 or wireless connection 1300, or both. For example, the using may be connected to a wired input of a wireless modem or would communicated with the modem wirelessly. In addition to RAM 1315, storage facility 1320 stores the routines and data required for the CPU 1300 to execute its various gaming functions. The elements illustrated inside storage facility 1320 are one example and any collection of these, possibly in combination with other not-shown elements, may be used.

Storage facility 1300 may store a menu 1301 of available games, available assets, registered users, etc. Executable files in EXE module 1302 are the routines used to executing the gaming platform. As explained above, the gaming platform, or game rendering engine, runs on the OS and functions to provide gaming services to specific game applications. The specific games which provide the rules for each specific game are stored in the game logic module 1306. Various assets that may be used with the games are collected in the assets module 1304. The accounts module 1303 maintains users' information. In this embodiment the accounts module maintains user information relating only to users that are currently using the unit. When a user signs up to the unit, the CPU downloads from the cloud service the user information that is needed for this particular session and stores it in the account module 1303. Once the user logs out, the unit updates the user's account in the cloud service.

In summary, a gaming system is provided comprising of a game server (game app), game player (player app), and cloud service. The Game server hosts the game, manages the players connections, and runs the game logic. The Game Player discovers the server, connects to the game, displays the digital assets, and exchanges events with the Game server. The Cloud service enables personal game collections, persistency, and asset synchronization.

Game assets may include: Lobby assets, including Icons, Posters, Introduction clips, etc., Metadata, such as game version, license keys, and asset list, Art assets, like images and sound files, and Code assets, like dll files and scripts. If connection to the cloud is available, both the server and players can get the most updated version of the game assets from the cloud service. If connection to the cloud is not available, the Game players get the assets directly from the Game server. The Game players may already have the assets because the assets were bundled in the Game players' app or remained in the cache from previous game.

Generally, the Game player may be bundles in one of two modes: hybrid Game server and Game Player or just Game player. In case of Hybrid mode, the Game player can assume a client mode to play the game hosted by another Game server, or it can assume the Game server mode and host the game. In case of Game player only and in case of Hybrid that has no license to the active game, the Game player would not be able to host the game because of one of the following scenarios: it is a Game player that doesn't have hosting mode; it may not include the code assets; it may not include the Lobby assets to start the game; or, it has no license to host the game. If the Game player received assets from another Game server or the cloud, the actual assets may remain stored on the device for future play when a key is provided (e.g., by purchasing the game or by reconnecting to the hosting Game server) or they may be cached out and would be downloaded when purchasing the game or connecting to a hosting server.

According to a simplified implementation, the transferred assets have preset shelf life, after which they are no longer available to the user, although they may still reside in the user's device. For example, when a user joins a game and receives assets to play the game, but has not purchased the game, the downloaded assets are received with a time limit, e.g., they may expire after one day, where it is assumed that the game would not last beyond one day. For games that may last for more than one day, the assets may last longer. On the other hand, the assets may be renewed by rejoining the same game with the same gamer server. However, once expired, the assets would no longer be available to the user.

The concept of discoverability is well known in the Bluetooth and other piconet and personal area network (PAN) technologies. A piconet is an ad-hoc computer network linking a wireless user group of devices that are in physical close proximity, e.g., within the same room or same building. A wireless personal area network (WPAN) is a PAN carried over wireless network technologies such as IrDA, Wireless USB, Bluetooth, Z-Wave, ZigBee, or Body Area Network. The reach of a WPAN varies from a few centimeters to a few meters. A PAN may also be carried over wired computer buses such as USB and FireWire. In the example of a Bluetooth, a Service discovery protocol (SDP) is used to allow devices to discover what services each other support, and what parameters to use to connect to them. For example, when connecting a mobile phone to a Social Game Hotspot, SDP will be used to determine which Bluetooth profiles are supported by the Social Game Hotspot and the protocol multiplexer settings needed to connect to each of them. Each service is identified by a Universally Unique Identifier (UUID).

Depending on the implementation and the particular situation, discovery and pairing may be done in one of several ways. For example, a particular Game Hotspot may have the ability to discover and pair using wifi or Bluetooth. Depending on the capability and/or of the particular user, the discovery and pairing may be done using either the wifi or the Bluetooth, or any other method. For example, a Game Hotspot performing local wifi discovery and pairing may utilize the following process. The Game Hotspot publishes itself by IP broadcast on a known IP port, over local wifi network. Meanwhile, the Player App, running on a user's device, e.g., iPad, listens for IP broadcast on the same IP port. The broadcast message includes the name of the server, the game collection, the active game, versions, required capabilities, etc., that the Player App shows to the user on the user's device. The broadcast message includes the source IP address, and may include a dynamic game port that the Game Player should connect to participate in the game. A single Hotspot may host multiple games on different IP ports. If not provided, the game is played on a preset IP port.

Other methods for discovery and pairing may include: Bluetooth pairing, Network search, search for personal collection of games owned by specified user name, search for games by location, e.g., using the device's internal GPS or using the routing proxy. Some public networks block local connections. The Hotspot server can be discovered by its routing trail that is similar to the Game player app. This method requires network connection and relay service to connect back to the Hotspot.

As explained so far, the Social Games Hotspots (SGH) are virtual software servers that run on physical hosting devices like smart phones, tablets, PC, TV, media centers, DVR, or any other device that has the minimum required CPU and memory and is connected to a local network (wifi, Bluetooth, etc.). The hosting device is not required to have display unit, and can be hosted in the cloud if all the game players have network access to the Internet (e.g. using 3G, 4G, or Edge networks).

SGH may be installed on a single device or float between devices as needed using unique ID and password. The SGH authentication may be available through the cloud service or against local, secured configuration file to allow offline authentication and play. The SGH network controls the discovery, authentication, persistency, floating, synchronization, monetization, etc. of the SGH's.

SGH can be used by businesses and enterprises to attract or monetize customers. The business will buy games or subscribe to collection of themed games and monetize its customers by game or time. Consumers can own a virtual SGH on their mobile devices, buy games or subscribe to collection of themed games.

The SGH can differentiate between local to remote devices and use it to automatically control which background music and sound effects are sent to which device. The best practice should be to send shared effects only to single device per location, otherwise the game experience is too noisy and unsynchronized. The sound control of remote devices should group devices by IP NAT address if provided by the relay service, or by GPS proximity. Automatic sound control in local networks is a proposed function of this invention and is not limited to SGH architecture.

Another advantage of local multi device games in SGH architecture is ad space. In comparison to single device games or social network games that utilize the entire screen for the game play, the player device in multi device games is used primary on the player's turn, and therefore is available for friendly ads otherwise. In other players' turn, the player not having a turn can decide if he/she watch the shared scene on the shared boards and enjoy the social experience, watch the shared scene on his/her shared view, or take a look at attractive, maybe related ad. Furthermore, the architecture supports ad view that is dedicated for context related ads.

Similarly, the SGH architecture can implement help view for full screen context help to be viewed while playing, in comparison to standard context switching to browse the game help.

Also, the SGH architecture can implement any other full screen context view that add another dimension to the game.

To summarize, the SGH architecture can support multiple shared views, group views, private views, consolidation of all shared views, control view of all shared and private views, help view, ad view, or any other special view. Views are available for players by their role in the game. Players can toggle between views on their devices. Shared devices like tablets or TV can be used to show the special views and enrich the game experience.

Offline Login, Authentication, and Money Transactions

There are many situations in which users do not have access to the Internet, but would like to use their devices to play games. For example, playing games would be a good pastime during flight. However, few flights offer Internet connection and those that offer Internet access, offer it at rather expensive price. Similarly, during car travel passengers may wish to play games on smart phones or tablet devices. The following embodiments enable authentication, purchase, and transaction security and settlement during offline operation. According to these embodiments, anytime a user is authenticating online, a replication of his login information is saved to the device and is being used for future offline login. As explained previously, the user can establish an account on the cloud, and establish credit on his account by, e.g., linking a credit card or PayPal account to his/her game account. After the user logs in, including offline, the user's credit line is revealed and, if authorized, the user could purchase and/or unlock game functions that will be paid later if the user is offline. That is, when the replication of user's login information includes a credit account, the user may purchase games and/or assets offline using the credit. Then, the next time the user logs in, the device would upload the purchasing information to the cloud for settlement.

One benefit of the offline authentication feature is for playing games that require exchange of real money. Various games, such as gambling, require secured real money transactions (RMT) that are typically verified with online sources. Leveraging the SGH network and offline authentication, a secured RMT can be performed even in an offline mode. This feature may be best understood with reference to a specific example. The following is a step by step explanation of a Poker game with an example of a secured RMT.

Users A, B, C, and D are registered users in the SGH network. User A owns the Poker game, e.g., purchased the game from the cloud service, and the game is installed on his/her iPad. User A logs in offline to his/her iPad. The login process responds with User A's credit in the SGH network, both actual in case of pre-paid and credit limit. The credit information was stored on the iPad together with the authentication information during the last online session. User A runs the Poker game on the iPad. Users B, C, and D log in offline to their devices. Users B, C, and D run the SGH client app that discovers the Poker on A's iPad. Users B, C, and D connects to the Poker game, such that A's iPad servers as the Game server and each of the devices of B, C and D run the Game player. Using the established inter-device connections, the devices of all of the users exchange an RMT file, which may include their ID, their SGH ID, device names, and the credit established in the SGH network. All the users buy-in to start the game and update the distributed RMT files. The game starts and any bet/raise/fold is recorded with its Chip/dollar value in the RMT file and is exchanged, i.e., synchronized, with all devices. When players buy-in again or cash-out, their RMT files are updated again, and exchanged (synchronized) with all devices. When any of the devices is connected online to the network, it pushes the game transactions, i.e., the RMT files to the cloud service so that the cloud service can realizes the outcome, e.g., by making appropriate cash transfers between the accounts of users A, B, C, and D according to their wins and losses. The update can be done in the middle of the game by any device, e.g., a single iPhone client can realize a game with many other devices. However, it is more secured to wait for all or the majority of the players to upload prior to realizing the transactions. The uploaded RMT file may include User ID, Pre Paid Value, Credit Line, SGH ID, Game Instance, game data and/or statistics, Debit/Credit amount and to/from whom, etc.

Personalized Digital Assets

As explained throughout this specification, various games require different digital assets and the Game App and Player App would call upon, execute, and manage the assets. Digital assets can include die, deck of cards, audio or video clip, clock, avatar, special game pieces, background music, game effects, etc. According to the following embodiment, users are able to personalize specific assets and utilize and share the personalized assets during a game with others. As with the Game Hotspot, the personalized asset may be programmed such that once the other users are disconnected, the personalized asset is no longer available to them.

For example, player A may purchase or own a unique marble dice or a special deck of cards, and whenever he/she plays a dice or card game with other players, even if they own the same game, all will be able to use player A's assets in a standard way during the game. If so selected, the dice or deck of card will be removed from the other devices at the end of the session. According to another example, assuming all players have the same card game, but each have a different deck of cards, the winner of each round can dictate which deck will be used for the next round. This will add some interest to the game, as in various rounds different decks will be used.

Similarly, the winning user may be able to dictate other functions of the game, for example, what background music will be played, what would be the appearance of the board game, what would be the appearance of avatars, etc. In one specific implementation, referred to herein as Wintone, the winning user can select the victory clip or sound upon his winning a round or a game. Victory sounds or video clips are the payoff and climax of most digital games. Usually they are embedded within the game and in most cases are predefined. According to this embodiment, any player will be able to define his/her own sound and/or video clip, optionally even decoupled from any specific game. When several players join to play a game using their own devices, the user who wins a round or the game, will be able to dictate which clip will be played by all devices or the main device controlling the game. Thus, all players will listen to or view the winning player's clip. This embodiment can work on both social games and local multi device games. Also, this embodiment is applicable to single device games as well, which The "Wintone", as referred to herein, will be the player's expression in the game and may be re-used in a standard way in other device/player setups and games. According to these embodiments, that may be implemented in a multi-player, multi device gaming system, either local or distributed, synchronous or asynchronous, players will be able to purchase/own/use/define personalized audio tunes and/or video clips that will be played whenever they win the game or achieve a milestone. The clips may be played on everybody else's devices or by the main device, e.g., TV, controlling the game.

As an example, the process to implement the Winetone may be as follows. Player A "purchases" a unique victory tune and keeps it stored on his iPhone. Player A then plays a distributed game with B & C or plays a local game with B & C and a shared device D (e.g. Pad or TV). When player A wins the game or round in the game either the devices of B and C play A's victory tune or shared device D plays A's victory tune. The iPhone of A may also play the victory tune. The "Wintone" can be either proprietary to player A or personalized by the game to player A. If it is proprietary, it is expected to be pushed to the other devices in a standard way (e.g., streaming wirelessly), used while playing the game together, and removed after that.

Figure 14:
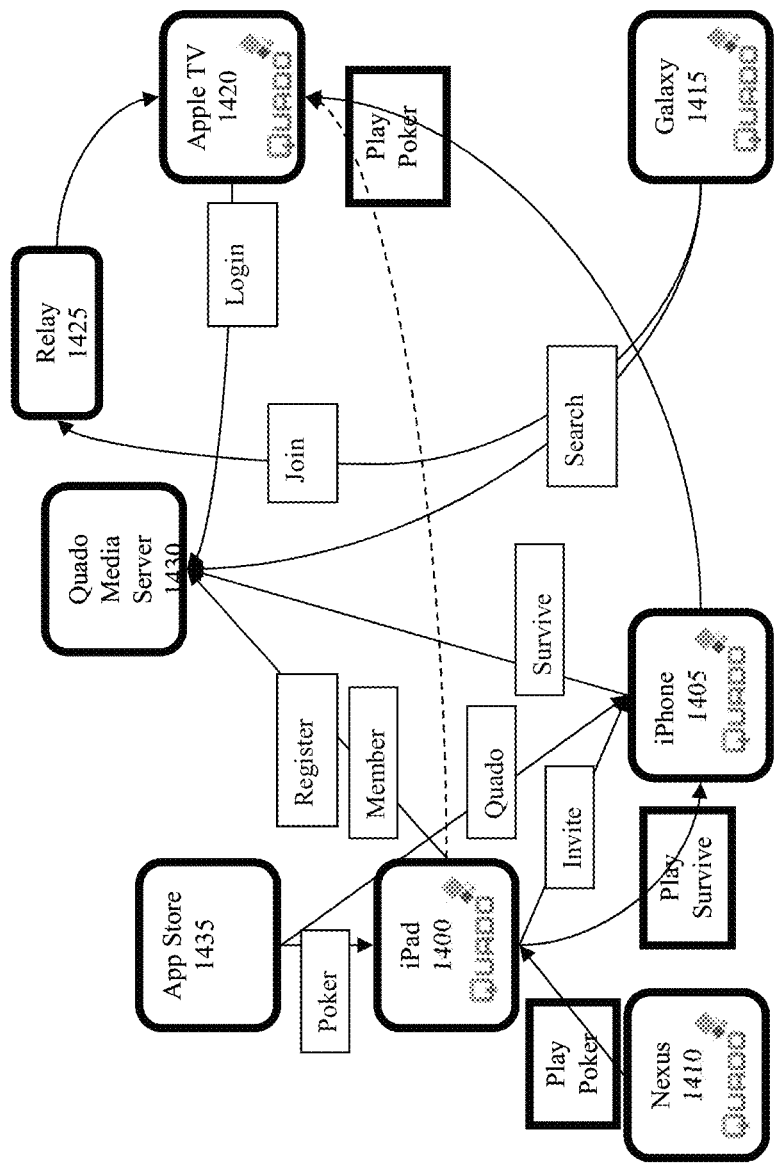
FIG. 14 illustrates an example of an environment for playing games using embodiments of the invention.

FIG. 14 illustrates an example of an environment for playing games using embodiments of the invention. In the example of FIG. 14, iPad 1400 downloads a Poker game from App Store 1435, e.g., iTunes, Play Store Google Play, etc. The iPad 1400 is registered in Quado Media server 1430 as having authorization to play the Poker (i.e., user has purchased the game). If a virtual gamebox is implemented, the virtual gamebox of the user is updated on the server 1430, such that the user may play Poker from any device that the user authenticates to the server 1430. This is done in the background and is transparent to the user of iPad 1400. When the App is launched on iPad 1400, iPad 1400 publishes itself. In this example, the user of iPad 1400 invites the user of iPhone 1405 to play Poker. iPhone 1405 then downloads the Game player, i.e., the game client. Meanwhile, Nexus 1410, which already has a game client, discovers iPad 1400 and requests to join the Poker game. When iPad 1400 authorizes Nexus 1410 and iPhone 1405 to join the Poker game, iPad 1400 serves as the SGH providing assets (e.g., cards) to the iPhone 1405 and Nexus 1410, while each of iPhone 1405 and Nexus 1410 simple runs a client that receives game instructions and assets from the iPad 1400.

Meanwhile, iPhone 1405 downloads from Quado Media the game Survive and invites iPad 1400 to play Survive. In one embodiment, since iPad 1400 already downloaded the Poker game, the player, or client, was also downloaded and installed on the iPad 1400. Otherwise, when iPad 1400 receives the invitation to play Survive, iPad 1400 downloads from App Store the Quado player. Now, as iPad 1400 joins the game Survive on iPhone 1405, the iPhone 1405 serves as the Server and iPad 1400 simply runs the client and receives assets from iPhone 1405.

As explained above, when iPad 1400 downloads the Poker game from the App Store 1435, this purchase may be automatically registered with the cloud server 1430. According to another embodiment, the user may purchase a game, e.g., the poker game from the app store 1435 without having an account with the game cloud service. The game would still be installed on iPad 1400 and available for the user to play and share as explained above. However, according to this embodiment, when the user of iPad 1400 creates a member account with the game cloud server, the poker game is automatically registered with the user's account, thus enabling the user access to the game from any device and enabling the user to utilize all of the cloud services.

For example, assumes that the same user logs in from Apple TV 1420. Then Galaxy 1415 searches for user and connects to Apple TV 1420 through the web relay 1425. That is, in this example, Apple TV 1420 and Galaxy 1415 are remote from each other, i.e., not in physical close proximity. The iPhone 1405 joins too and all play a new Poker game, using the game purchased via the iPad 1400. That is, since the user of iPad 1400 registered an account with the cloud server, the authorization to play poker was registered in his account. Thus, when the user logged in to his account from the Apple TV 1420, his account was recognized as having authorization to play the poker game. When Galaxy 1415 and iPhone 1405 joined the game, Apple TV 1420 became the game server while Galaxy 1415 and iPhone 1405 ran a client and received the assets and game instructions from Apple TV 1420. Once all of the connections have terminated, the user of the iPad 1400 has ownership and access to the poker game from any device, the iPhone had ownership and access to the Survive game, and all other devices have no access or ownership to any of the games, unless they purchase them.

According to another embodiment, users can invite other users to a game without first discovering their devices. For example, a user may invite remote users by sending an invitation to their email. When the other party gets the email he/she can follow the link to download the Game player or client. While downloading, the system keeps the original invitation meta data in the device browser. When the user launches the Game player, it queries the local browser, and connects automatically to the active game play. Thus, no pre-registration is needed.

Example

Multi-Device Games

Various embodiments disclosed herein enable playing games with multiple devices using wireless communication (e.g., BlueTooth, Piconet, etc.) to transfer data and game pieces among the devices. Any device adds another dimension to the game, like privacy (e.g. smart phones), more space (e.g. multiple iPads), or consolidate view (e.g. connected TV). This concept applies to many existing board, table, and card games, and to other games, that are possible only on multi device setup.

Example

Multi-Player Jigsaw Puzzle Game

Embodiments of the disclosed game system can be used to play a multi-player jigsaw puzzle game. One embodiment is illustrated in FIG. 15, wherein the game includes one or more displays 1500, e.g., iPad, which may be with or without touch control, and which is visible to all users in the game, and two or more controllers 1505*a-b*, e.g., iPhones or iPads, that present private puzzle pieces, and optionally hints, to each individual player. The puzzle can be any size, can spread on multiple boards, and can take from seconds to days to assemble. The application may also support the remote display control function to use controllers 1505*a-b* to manipulate puzzle pieces on display 1500.

FIG. 16 illustrates an example of a puzzle game main board display, e.g., on a TV screen 1600. When a device, such as an iPad, is used in a controller mode, the display shown in FIG. 16 can be duplicated on the controller. As shown, in this example the screen is divided to at least three sections. In one section, indicated as 1605, all the available and unused puzzle pieces are displayed. In another section, indicated as 1610, the currently constructed puzzle picture is displayed. In another section, indicated as 1615, the current scoring is displayed. Also, as shown in FIG. 16, when the game is played using timing, a clock can be displayed to indicate time left for next move.

In one example, when the mobile device is used as a controller, the image of FIG. 16 is replicated on the user's device, such that when the user moves a puzzle piece on his private mobile device, the corresponding piece is moved on the TV screen. When the mobile device is not used as a remote controller, as illustrated in FIG. 17, the user can select a small section of the puzzle (i.e., zoom in), and as the user builds that area, the corresponding area on the TV screen displays the same actions. The user's mobile device may also display a clock and a scoring status.

In one example, two or more players can compete to see who can connect more puzzle pieces. In this example, each player gets N-number of pieces, either randomly or by his or her selection. Turn by turn, players try to add pieces to the shared puzzle. Once their respective pieces are added, the players get more pieces for the next turn. Players get points for any contribution to the puzzle, and turns are time-limited. As can be appreciated, the pieces can be moved from the controllers 1505*a-b* to the main board 1500 using the game piece transfer embodiments described above employing, e.g., hand gesture like a finger swipe on the touch screen. Similarly, users can pick up pieces from the main board using the same technique by, e.g., finger swipe on the main board or the mobile device's touchscreen.

In another example, four or more players compete in groups to see which group can connect more puzzle pieces. The groups can be assembled by linking several controllers together, such that either they get turns or an action on any one of them is actionable on the main board. This version of the game adds the social experience of assembling the puzzle together. In one embodiment of this game, group players get private pieces and can work together on the board level, even when each player in the group uses his or her own individual controller. In such an embodiment, the game server designates teams and assigns groups of devices to their respective teams. Thus, when a transmission from any device belonging to a team is received, the game server assign the received transmission and its corresponding action to the designated team.

In another embodiment of this game, group players can share their pieces with their group colleagues, for example, by getting private access to their colleague's controller view or by exchanging pieces with their colleagues. In still another embodiment, group players get either private pieces or pictures of the puzzle (i.e., hints) that they can't show to their colleagues. This embodiment enhances the verbal communication between players. In a fourth embodiment, all groups work on the same board and complete on connected pieces, or all groups assemble the same picture start to end, and compete on time and efficiency.

In a third example of the multiplayer puzzle game, two or more players team together to assemble the puzzle. This embodiment dispenses with the competition, and keeps the social experience of assembling a puzzle together. Each player receives private pieces or pictures of the puzzle. The group goal is to assemble the puzzle as quickly as possible.

Figure 19:
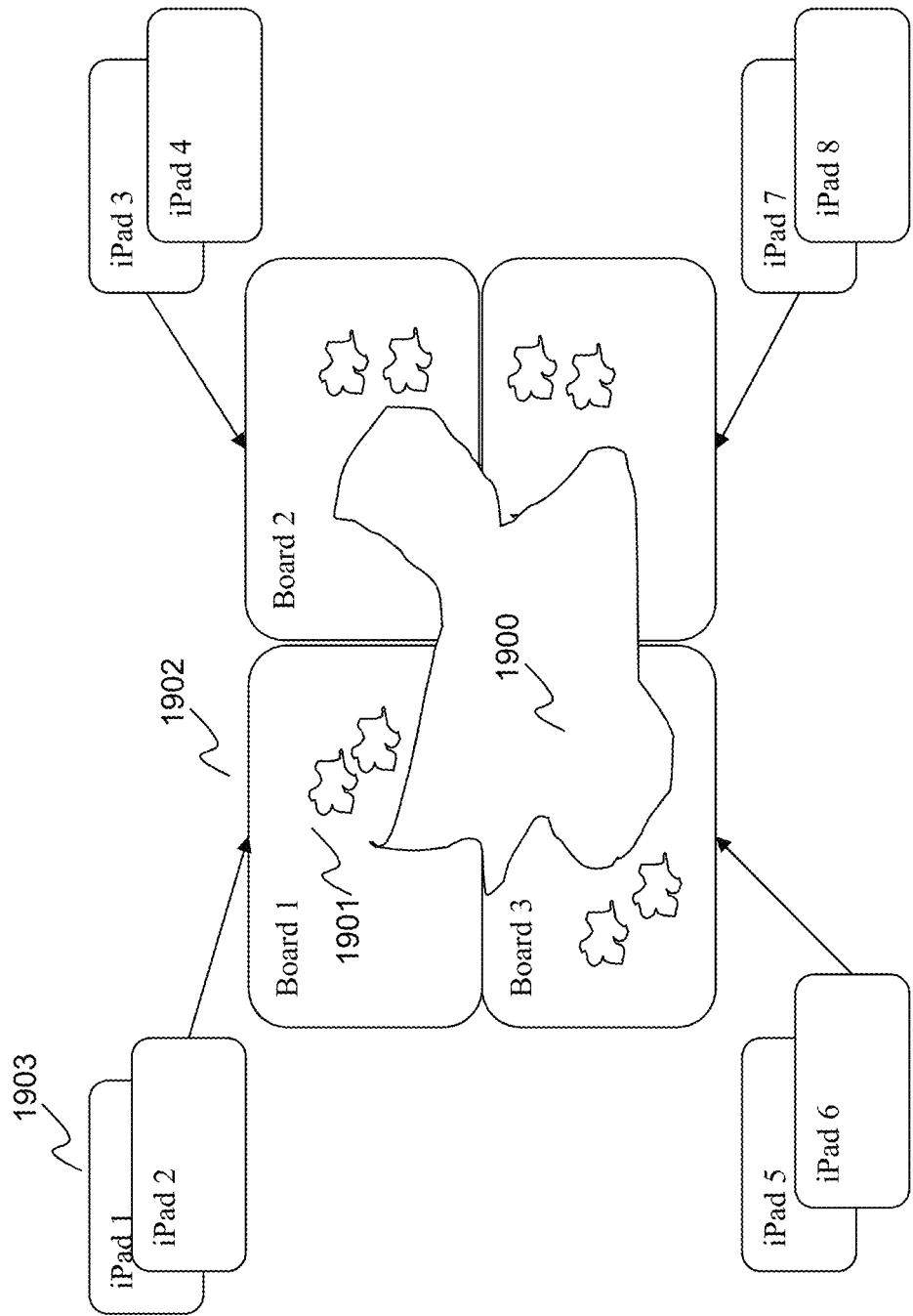
FIG. 19 illustrates an embodiment of multiplayer, multi device jigsaw puzzle game.

FIG. 19 illustrates logical and physical relations in the jigsaw puzzle example similarly to any other game with multiple logical views and number of participating devices. The goal of a jigsaw puzzle is to assemble the picture 1900 from many pieces 1901. According to this embodiment, the big picture is split to multiple logical views 1902 that may overlap; e.g. sky and buildings. The basic mechanic of the game is to assemble pieces in the narrowed context and flip pieces between the views. The game should support at least 2 consolidate views, all connected pieces, and all logical views side by side. The players should be able to reorder the logical views, but in case of overlapped, it will be different then the all connected view. As described, like in word games, the game may define private player views and game play rules to use the private pieces. Units 1903 are physical devices that display the logical views, e.g. sky, buildings, red zone, all connected, all logical, Unit player private view. Units 1903 enable to toggle between views, e.g. by swipe gesture. Units 1903 enable to move pieces on any view, connect pieces, and exchange pieces between views, e.g. by unique gate from the current view to any other view. All operations may be restricted by the game play rules.

As can be seen, according to this example, a computing implemented method is provided, wherein, when executing by a computing device, the method causes the computing device to manage a puzzle game by displaying on a main screen pieces of the puzzle, receive from at least one mobile device a transmission indicating a user's input to move selected piece of the puzzle, and perform moving of the selected piece of the puzzle according to the user's input. The method may further causes the computing device to transmit a signal to the mobile device with instructions for displaying at least part of the puzzle game. The display on the main screen may include three section: a first section for displaying unused pieces of the puzzle, a second part for displaying assembled pieces of the puzzle, and a third part displaying users' data.

According to another feature, the method may further causes the computing device to receive a digital image from a user, apply a puzzle algorithm to divide the digital image into the plurality of puzzle pieces, to thereby generate the puzzle game. According to one example, the puzzle algorithm is configured to generate plurality of groups of pixels from the digital image, each group forming a geometrical shape corresponding to a set puzzle piece shape.

According to another example, the method may further causes the mobile device to receive an input from the user to alternately display either a carbon copy of the image displayed on the main screen or a private view that includes only a portion of the image displayed on the main screen.

According to another feature, the method may further causes the computing device to, upon initiation of the puzzle game, distribute to each player a number of pieces that is a subset of the plurality of puzzle pieces, either randomly or by the user's selection. Providing an opportunity to each player to add pieces to the shared puzzle according to prescribed turns, wherein each turn may be time-limited. Receiving an input from the user for adding respective pieces to the puzzle and distributing more pieces to the player for use during the next turn. Assigning points to a user for any contribution to the puzzle.

According to another feature, the method may further causes the computing device to communicate with a plurality of mobile devices and assign the plurality of mobile devices to at least two competing groups. The method receive communications from the mobile devices and either assigns turns to each group or accept an action from any group as actionable on the main screen. In one embodiment of this game, the method causes the computing device to assign to each of the competing groups private pieces of the puzzle and enables users assigned to the same group to work together, even when each player in the group uses separate individual mobile device. When a transmission from any device belonging to a team is received by the computing device, the method causes the computing device to assign the received transmission and its corresponding action to the designated team. The method may further enable two mobile devices to exchange puzzle pieces by sending and receiving transmission directly between two mobile devices or by relaying the transmission through the computing device.

Example

Piece of Pie Trivia Game

FIG. 18 illustrates a screenshot of a device showing a trivia game according to one embodiment. In the basic game, a pie is displayed and upon initiation of the game each player gets an equal piece of the pie. Each piece can be color coded to the respective player. The names and/or avatars of each player can also be displayed, with coordinated color coding. In the example of FIG. 18, the background of each avatar corresponds to the color of the assigned piece of the pie.

A randomizer is provided to select a player who gets a turn to answer a trivia question. The randomizer may take an input from a player, akin to a randomizer of a slot machine. For example, the randomizer may utilize a vector, such as force, speed, pressure, etc., as an input to modify the randomization. In the particular example of FIG. 18, a spinable arrow is provided as the randomizer, enabling players to spin the arrow to decide who plays next. The force exerted by the user, e.g., the speed in which the user swipes his finger on the tough screen, is taken as an input to the randomizer.

When a player gets a turn, the player is asked to answer a trivia question. If the player's response is correct, the share of the player's assigned piece of the pie increases, thereby decreasing the share of the other players (there are always only 360 degrees in the Pie). After the player answers the question, the arrow is spun again, to determine who will get the next turn. As a player answers more of the questions correctly, the player's share of the pie increases, and therefore the player's chance to have another turn increases.

There are variances to handling reducing shares. For example, when a player answers the question incorrectly, another player gets to answer the same question. This can be done by, for example, spinning the arrow again. When the next player answers the question correctly, his share can be increased by reducing a corresponding share only from the player who answered the question incorrectly. According to another variance, when a player answers the question incorrectly, his share is reduced and is distributed equally to all other players. According to another variance, when a player answers the question correctly, his share is increased and a corresponding share is reduced from an opponent designated by the winning player. Another variance is implemented on a multi-device implementation of the game. Multiple devices add more dimensions to the game. According to one example, any player can hold a private device. When a question is shown, any player can answer on his device privately; however, the "chosen" player, i.e., the player on who's share of the pie the arrow lands, gets the priority to answer in a limited time window. Any player may answer or pass, and the answer is sent to the main device running the game. If the chosen player answer correctly, the system can either ignore other answers, or penalize opponent players that provided wrong answers (otherwise everyone will just guess). If the chosen player is wrong, the first player to answer correctly, or all other players that answered correctly, get credit, and all that tried but answered wrong are penalized. This simple setup of multiple devices can detect who answered what question, who was first to answer, etc.

As can be seen, according to this example, a computing implemented method is provided, wherein, when executing by a computing device, the method causes the computing device to display on a monitor screen a geometrical image and divide the geometrical image to multiple parts; register plurality of players and assign to each player an assigned part from the multiple parts; operate a randomizer to select one of the plurality of player as a selected player; present a task to the selected player; receive a response from the selected player and, when the response is correct, increase size of assigned part assigned to the selected player and reduce size of assigned part assigned to at least one of the plurality of players. The reduced size may be applied to an opponent chosen by the selected user.

The method may further be configured to operate on multiple mobile devices and enable each of the plurality of player to answer the task privately, undisclosed to any of the other players. The method may further be configured to operate the randomizer by receiving an input vector from one of the plurality of players. The input vector may include a speed of user's swipe of finger on a touchscreen. The method may further be configured to provide the selected user a specified period of time to answer the task, and also to accept private answers from other users and tag timing of each answer received from each user. The task may be a trivia question, the geometrical image may be a pie shape, each part may be displayed as a piece of the pie, and the randomizer may be displayed as a rotating arrow.

Other Use Cases

Another embodiment of SGH is the implementation of speed games. Speed games require real time recognition of the first player that complete a game action like pattern recognition while preserving the players social responses to the action. Both are possible with local multiple devices architecture. Similarly, the SGH can be used for local trivia games that detect the first to answer a trivia question. Using multiple devices, the game can track all the answers and credit/debit players accordingly.

FIG. 20 shows a snapshot of a Poker bank view. This implementation is different than the standard numerical implementation of players cash and bets. The bank view is equivalent to physical chips. Players bet by throwing chips to the table. Players change chips by holding a chip and drag it to higher or lower chi value slot. Furthermore, we propose hybrid implementation of physical chips that players throw to designated area, their value is pre-defined or customized and can read automatically by the game server. E.g. the value is available as RFID feed and can be read by mediation device, or the value is reported by NFC or Bluetooth.

Another embodiment of SGH is multiple logical boards games in which each board may be presented on a single device and the consolidation of all boards can be presented on consolidated device like TV. Examples of such games are multiple boards Monopoly, multiple Catan islands, Multiple boards Risk, or multiple armies Stratego. In Stratego, each player will start with a single logical island with entry points to all other islands. Each player will see only his people on all islands. A shared view will show all islands with non ranked people, and a control view will show all ranked people.

Common Poker implementations define the player bet by a standard input dialog or quantity slider. In the following embodiment an object oriented approach is used, in which the player holds digital representations of physical chips and just throw them to the table to bet. E.g. to bet $15 one may throw to the table $10 & $5 chips.

Furthermore, As noted above, the embodiment implements a change function, in which the player throws a big chip to smaller chip slot in order to change $100 to $25 for example, or by dragging $25 chips to $100 slot to exchange his/her $25 chips with $100 chip. The concept of digital representation of physical chips may be implemented in different ways that all realize the betting process for the user. The same bet mechanics can be applied to any other gambling game.

Example A has: 3×1+2×5+1×10+1×25+1×50+1×100 to represent $198, as illustrated in the left side of FIG. 20. To bet 12, the user could use 2×1+2×5, or 2×1+1×10. But how could one bet 30? Dragging the 1×50 to the 10 slot, automatically changes it to 5 chips of value 10 each. Now the player can throw 3×10 to bet 30.

Some features disclosed herein include tha the Hotspot is a Gaming Program that can run on any Computing platform. The Hotspot can be disconnected from the internet. The Hotspot publishes its properties and games in the local network. If connected to the internet, the Hotspot publishes it properties and games to directory services. Devices with Game client discover the Hotspot locally or remote. Game clients connect to the Hotspot directly or remotely through relay server. The Hotspot synchronizes the game assets with the Game clients for the game play. The assets cannot be used by the Game clients outside the Hotspot. The Hotspot supports multi player multi device games. The games consist of multiple shared views, private views, and special views. Special views include consolidate view, control view, help view, ad view, etc. Game clients are used as player controllers or shared views. Players can access and move parts on multiple views from single device. Users can purchase special virtual goods to be used in the game. Users can share the special virtual goods with the Hotspot devices through the Hotspot. The special virtual goods cannot be used by any device without the owner participation. Users can own "Wintones" and force all devices to play them on their victory. Players' credentials are stored in the Hotspot for offline authentication. The Hotspot supports real money games offline. The real money transactions are stored in the Hotspot and realized with online service when the Hotspot reconnected. The transactions are shared with all devices. Any device can realize the transactions on connection. In sensitive scenarios, majority of the game devices are required to report the transactions that are reconciled. In sensitive scenarios, majority of the game devices are required to report the transactions that are reconciled.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of functional elements will be suitable for practicing the present invention. Moreover, other implementations of the invention will be apparent to those skilled in the art from consideration of the specification and practice of the invention disclosed herein. Various aspects and/or components of the described embodiments may be used singly or in any combination in the relevant arts. It is intended that the specification and examples be considered as exemplary only, with a true scope and spirit of the invention being indicated by the following claims.

The invention claimed is:

1. A non-transitory computer readable recording medium which stores a gaming program instructions that, when executed by a computing platform, causes the computing platform to perform the operations comprising:
   hosting multiple digital games;
   continuously publishing the computer platform's properties and active games;
   whenever a request is received from a device to join the game, joining the device to the game and sending to the device game assets required for playing the game, wherein the game assets are available for a user of the device for a limited duration;
   when receiving instructions from a connected user, executing and managing progress of a game;
   wherein the limited duration consists of so long as the device is connected to the computing platform, but ceases to be available to the user when the device is disconnected from the computing platform.

2. The non-transitory computer readable recording medium of claim 1, wherein the gaming program further causes the computing platform to perform the operations comprising: generating a published view of the game for displaying on a monitor screen.

3. The non-transitory computer readable recording medium of claim 2, wherein the gaming program further causes the computing platform to perform the operations comprising: sending instructions to the connected device to display on a monitor a private view of the game.

4. The non-transitory computer readable recording medium of claim 3, wherein the private view of the game is different from the published view of the game.

5. The non-transitory computer readable recording medium of claim 1, wherein the gaming program further causes the computing platform to perform the operations comprising: adding an icon corresponding to the connected device for display on the monitor screen.

6. The non-transitory computer readable recording medium of claim 1, wherein the gaming program further causes the computing platform to perform the operations comprising: sending to the connected device instructions for purchasing the assets and, if an acknowledgment of purchase is received, making the assets available to the user at all times regardless of whether the connected device is connected to the computing platform.

7. The non-transitory computer readable recording medium of claim 1, wherein the gaming program further causes the computing platform to perform the operations comprising: managing transfer of assets among connected devices.

8. The non-transitory computer readable recording medium of claim 1, wherein the gaming program further causes the computing platform to perform the operations comprising: maintaining users accounts and, when an authorized connected device logs off, sending to the authorized connected device an account status file, including game state data.

9. The non-transitory computer readable recording medium of claim 1, wherein the gaming program further causes the computing platform to perform the operations comprising: maintaining users credit accounts and, when an authorized connected device logs in, receiving from the authorized connected device account settlement file and executing financial transactions indicated in the account settlement file.

10. The non-transitory computer readable recording medium of claim 1, wherein the gaming program further causes the computing platform to perform the operations comprising: determining a winner of a game round and executing an audio file selected by the winner.

11. The non-transitory computer readable recording medium of claim 1, wherein the gaming program further causes the computing platform to perform the operations comprising: determining a winner of a game round and executing a graphics file selected by the winner.

12. The non-transitory computer readable recording medium of claim 1, wherein the gaming program further causes the computing platform to perform the operations comprising: receive a request to join a game from a remote user via a relay service, joining the remote user to the game, and sending the remote user game assets via the relay service.

13. The non-transitory computer readable recording medium of claim 1, wherein the gaming program further causes the computing platform to perform the operations comprising: designating a team and grouping transmissions received from plurality of devices as belonging to the team.

14. A non-transitory computer readable recording medium which stores a gaming program instructions that, when executed by a computing platform, causes the computing platform to perform the operations comprising:
hosting multiple digital games;
continuously publishing the computer platform's properties and active games;
whenever a request is received from a device to join the game, joining the device to the game as a connected device and sending to the connected device game assets required for playing the game, wherein the assets are available to the connected device so long is a key is provided to the connected device and wherein the gaming program further causes the computing platform to perform the operations comprising: sending the key to the connected device.

15. The non-transitory computer readable recording medium of claim 14, wherein the assets are available to the connected device so long as the connected device is connected to the computing platform, but ceases to be available to the user when the connected device is disconnected from the computing platform.

16. The non-transitory computer readable recording medium of claim 14, wherein the gaming program further causes the computing platform to perform the operations comprising: sending to the connected device instructions for purchasing the assets and, if an acknowledgment of purchase is received, making the assets available to the user of the connected device at all times regardless of whether the connected device is connected to the computing platform.

17. The non-transitory computer readable recording medium of claim 14, wherein the gaming program further causes the computing platform to perform the operations comprising: maintaining users accounts and, when an authorized connected device logs off, sending to the authorized connected device an account status file, including game state data.

18. The non-transitory computer readable recording medium of claim 14, wherein the gaming program further causes the computing platform to perform the operations comprising: maintaining users credit accounts and, when an authorized connected device logs in, receiving from the authorized connected device account settlement file and executing financial transactions indicated in the account settlement file.

19. The non-transitory computer readable recording medium of claim 14, wherein the gaming program further causes the computing platform to perform the operations comprising: determining a winner of a game round and executing an audio or graphic file selected by the winner.

20. The non-transitory computer readable recording medium of claim 14, wherein the gaming program further causes the computing platform to perform the operations comprising: receive a request to join a game from a remote user via a relay service, joining the remote user to the game, and sending the remote user game assets via the relay service.

* * * * *